United States Patent
Ahlfeld et al.

(10) Patent No.: US 9,190,177 B2
(45) Date of Patent: Nov. 17, 2015

(54) SYSTEMS AND METHODS FOR CONTROLLING REACTIVITY IN A NUCLEAR FISSION REACTOR

(75) Inventors: Charles E. Ahlfeld, La Jolla, CA (US); Ehud Greenspan, Emeryville, CA (US); Roderick A. Hyde, Redmond, WA (US); Nathan P. Myhrvold, Bellevue, WA (US); Joshua C. Walter, Kirkland, WA (US); Kevan D. Weaver, Redmond, WA (US); Thomas Allan Weaver, San Mateo, CA (US); Lowell L. Wood, Jr., Bellevue, WA (US); George B. Zimmerman, Lafayette, CA (US)

(73) Assignee: TerraPower, LLC, Bellevue, WA (US)

( * ) Notice: Subject to any disclaimer, the term of this patent is extended or adjusted under 35 U.S.C. 154(b) by 1644 days.

(21) Appl. No.: 12/590,447

(22) Filed: Nov. 6, 2009

(65) Prior Publication Data

US 2011/0110477 A1 May 12, 2011

(51) Int. Cl.
| | |
|---|---|
| *G21C 7/30* | (2006.01) |
| *G21C 7/08* | (2006.01) |
| *G21C 1/02* | (2006.01) |
| *G21C 7/103* | (2006.01) |

(Continued)

(52) U.S. Cl.
CPC *G21C 7/08* (2013.01); *G21C 1/026* (2013.01); *G21C 7/103* (2013.01); *G21C 7/30* (2013.01); *G21C 17/035* (2013.01); *G21C 7/06* (2013.01); *Y02E 30/34* (2013.01); *Y02E 30/39* (2013.01)

(58) Field of Classification Search
CPC ............ G21C 1/103; G21C 7/06; G21C 7/08; G21C 7/103; G21C 7/30; G21C 17/035

USPC .......................................................... 376/213
See application file for complete search history.

(56) References Cited

U.S. PATENT DOCUMENTS

| | | | |
|---|---|---|---|
| 2,852,458 | A | 9/1958 | Dietrich et al. |
| 2,952,600 | A | 9/1960 | Newson |
| 3,141,827 | A | 7/1964 | Iskenderian |

(Continued)

FOREIGN PATENT DOCUMENTS

| | | | |
|---|---|---|---|
| CN | 86108810 | A | 8/1987 |
| CN | 1352797 | A | 6/2002 |

(Continued)

OTHER PUBLICATIONS

PCT International Search Report; International App. No. PCT/US2010/002904; Aug. 18, 2011; pp. 1-2.

(Continued)

*Primary Examiner* — Frank J McGue

(57) ABSTRACT

Illustrative embodiments provide a reactivity control assembly for a nuclear fission reactor, a reactivity control system for a nuclear fission reactor having a fast neutron spectrum, a nuclear fission traveling wave reactor having a fast neutron spectrum, a method of controlling reactivity in a nuclear fission reactor having a fast neutron spectrum, methods of operating a nuclear fission traveling wave reactor having a fast neutron spectrum, a system for controlling reactivity in a nuclear fission reactor having a fast neutron spectrum, a method of determining an application of a controllably movable rod, a system for determining an application of a controllably movable rod, and a computer program product for determining an application of a controllably movable rod.

35 Claims, 97 Drawing Sheets

(51) Int. Cl.
*G21C 17/035* (2006.01)
*G21C 7/06* (2006.01)

(56) References Cited

U.S. PATENT DOCUMENTS

| | | | |
|---|---|---|---|
| 3,156,625 A | 11/1964 | Harty et al. | |
| 3,205,139 A | 9/1965 | Stewart et al. | |
| 3,219,535 A | 11/1965 | Robbins | |
| 3,238,105 A | 3/1966 | McNelly | |
| 3,322,644 A | 5/1967 | Benson | |
| 3,382,153 A | 5/1968 | Bigge et al. | |
| 3,849,248 A | 11/1974 | Channon et al. | |
| 3,959,902 A | 6/1976 | Suzuki | |
| 4,056,437 A * | 11/1977 | Giacometti et al. | 376/173 |
| 4,076,586 A * | 2/1978 | Bideau et al. | 376/364 |
| 4,110,159 A * | 8/1978 | Lee | 376/419 |
| 4,229,654 A | 10/1980 | Arya et al. | |
| 4,451,428 A | 5/1984 | Nishimura et al. | |
| 4,481,164 A | 11/1984 | Bollinger | |
| 4,587,090 A * | 5/1986 | Mochida et al. | 376/428 |
| 4,609,522 A | 9/1986 | Davidson et al. | |
| 4,668,468 A * | 5/1987 | Santucci | 376/419 |
| 4,711,753 A | 12/1987 | Miller et al. | |
| 4,716,006 A | 12/1987 | Impink, Jr. | |
| 4,717,528 A | 1/1988 | Meyer et al. | |
| 4,762,672 A | 8/1988 | Kurihara et al. | |
| 4,770,840 A | 9/1988 | Leroy et al. | |
| 4,879,086 A | 11/1989 | Luce et al. | |
| 4,935,197 A | 6/1990 | Gillespie et al. | |
| 4,941,158 A | 7/1990 | Bingham | |
| 5,008,070 A * | 4/1991 | Aoyama et al. | 376/419 |
| 5,011,649 A | 4/1991 | Ginsberg et al. | |
| 5,034,185 A * | 7/1991 | Ueda et al. | 376/333 |
| 5,100,608 A | 3/1992 | Konomura et al. | |
| 5,112,565 A | 5/1992 | Ball et al. | |
| 5,136,619 A | 8/1992 | Capossela et al. | |
| 5,349,541 A | 9/1994 | Alexandro, Jr. et al. | |
| 5,818,892 A | 10/1998 | Rauch et al. | |
| 6,047,037 A | 4/2000 | Wivagg | |
| 6,925,138 B2 | 8/2005 | Nakamaru et al. | |
| 7,139,352 B2 * | 11/2006 | Nishiguchi et al. | 376/220 |
| 2004/0114703 A1 | 6/2004 | Bolton et al. | |
| 2004/0151274 A1 | 8/2004 | Kropaczek et al. | |
| 2006/0226668 A1 | 10/2006 | Smith et al. | |
| 2008/0123794 A1 | 5/2008 | Mertyurek et al. | |
| 2008/0123795 A1 | 5/2008 | Hyde et al. | |
| 2008/0123796 A1 | 5/2008 | Hyde et al. | |
| 2008/0123797 A1 | 5/2008 | Hyde et al. | |
| 2008/0144762 A1 | 6/2008 | Holden et al. | |
| 2009/0034674 A1 | 2/2009 | Burger et al. | |
| 2009/0252273 A1 | 10/2009 | Gilleland et al. | |
| 2009/0252283 A1 | 10/2009 | Ahlfeld et al. | |

FOREIGN PATENT DOCUMENTS

| | | | |
|---|---|---|---|
| CN | 1367928 A | | 9/2002 |
| CN | 1500238 A | | 5/2004 |
| JP | 41-021399 A | | 11/1963 |
| JP | 49-007440 U | | 7/1969 |
| JP | 49-027913 A | | 8/1969 |
| JP | 75029229 B | * | 9/1975 |
| JP | 50-034191 A | | 11/1975 |
| JP | 51-141302 | | 12/1976 |
| JP | 52-047196 A | | 4/1977 |
| JP | 53-056495 | | 5/1978 |
| JP | 60-003585 | | 1/1985 |
| JP | 62-200290 | | 9/1987 |
| JP | 62-277599 | | 12/1987 |
| JP | 01-129192 | | 5/1989 |
| JP | 04-254791 | | 9/1992 |
| JP | 10-288688 A | | 10/1998 |
| JP | 11-337678 A | | 12/1999 |
| JP | 2000-019282 A | | 1/2000 |
| JP | 2000-162374 | | 6/2000 |
| JP | 2001-033578 A | | 2/2001 |
| JP | 01-263591 A | | 9/2001 |
| JP | 04-264292 A | | 9/2004 |
| JP | 2005-061951 | | 3/2005 |
| JP | 2007-064635 A | | 3/2007 |
| RU | 555740 | | 11/1984 |
| RU | 2101788 | | 1/1998 |
| RU | 2202131 | | 4/2003 |
| RU | 2330338 | | 7/2008 |
| WO | WO93-16477 | | 8/1993 |
| WO | WO2008097298 A2 | | 8/2008 |

OTHER PUBLICATIONS

PCT International Search Report; International App. No. PCT/US2010/002908; Aug. 22, 2011; pp. 1-2.

PCT International Search Report; International App. No. PCT/US2010/002910; Aug. 22, 2011; pp. 1-2.

Nikolaenko, V. A.; Zaritskii, S. M.; Bachuchin, I. V.; "Fast-Neutron Fluence Determination with Diamond Sensors"; Atomic Energy; Feb. 2005; p. 110; vol. 98, No. 2; Springer Science+Business Media, Inc.

European Supplementary Search Report for EP Application No. 10844850.7.

* cited by examiner

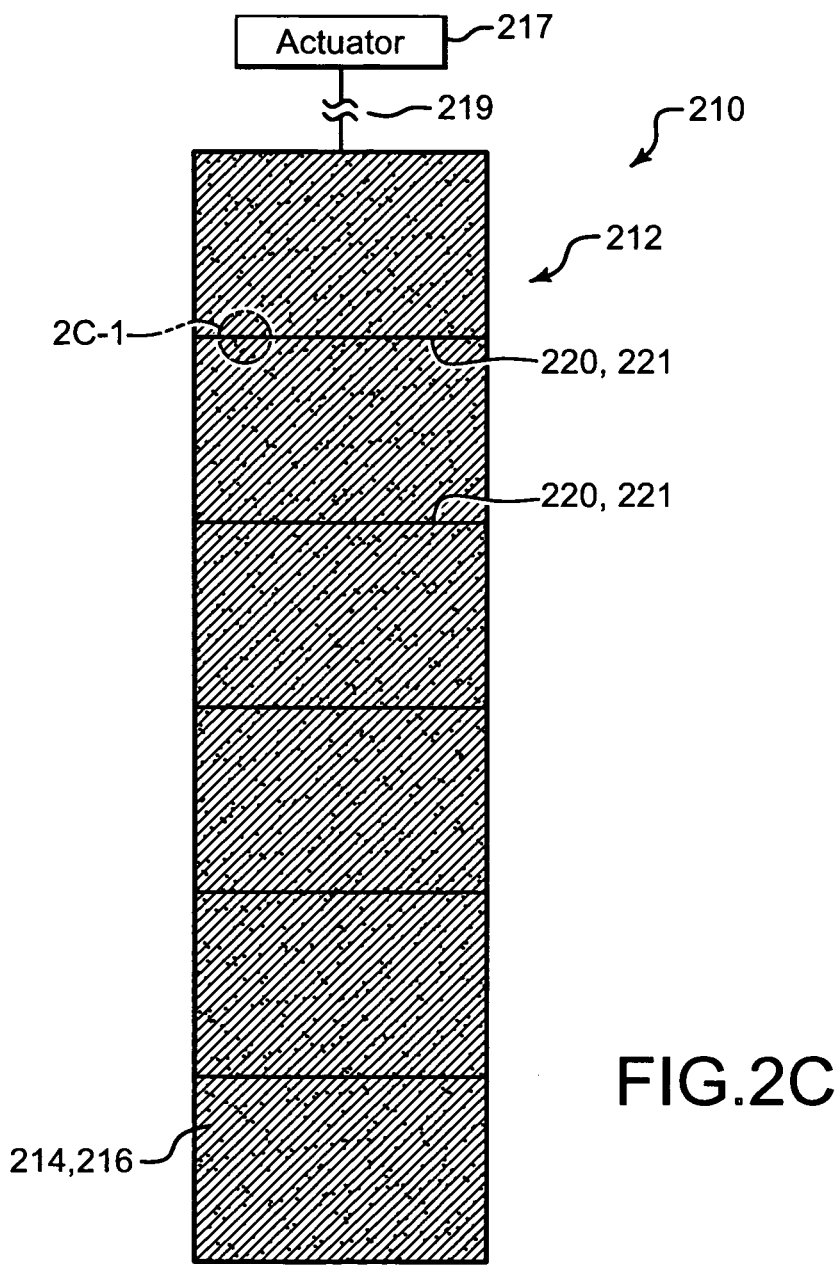
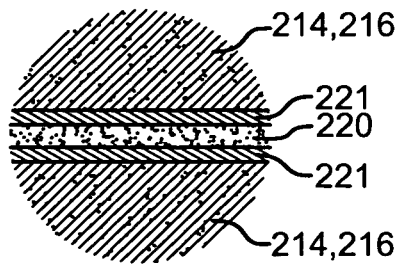
FIG.2C
FIG.2C-1

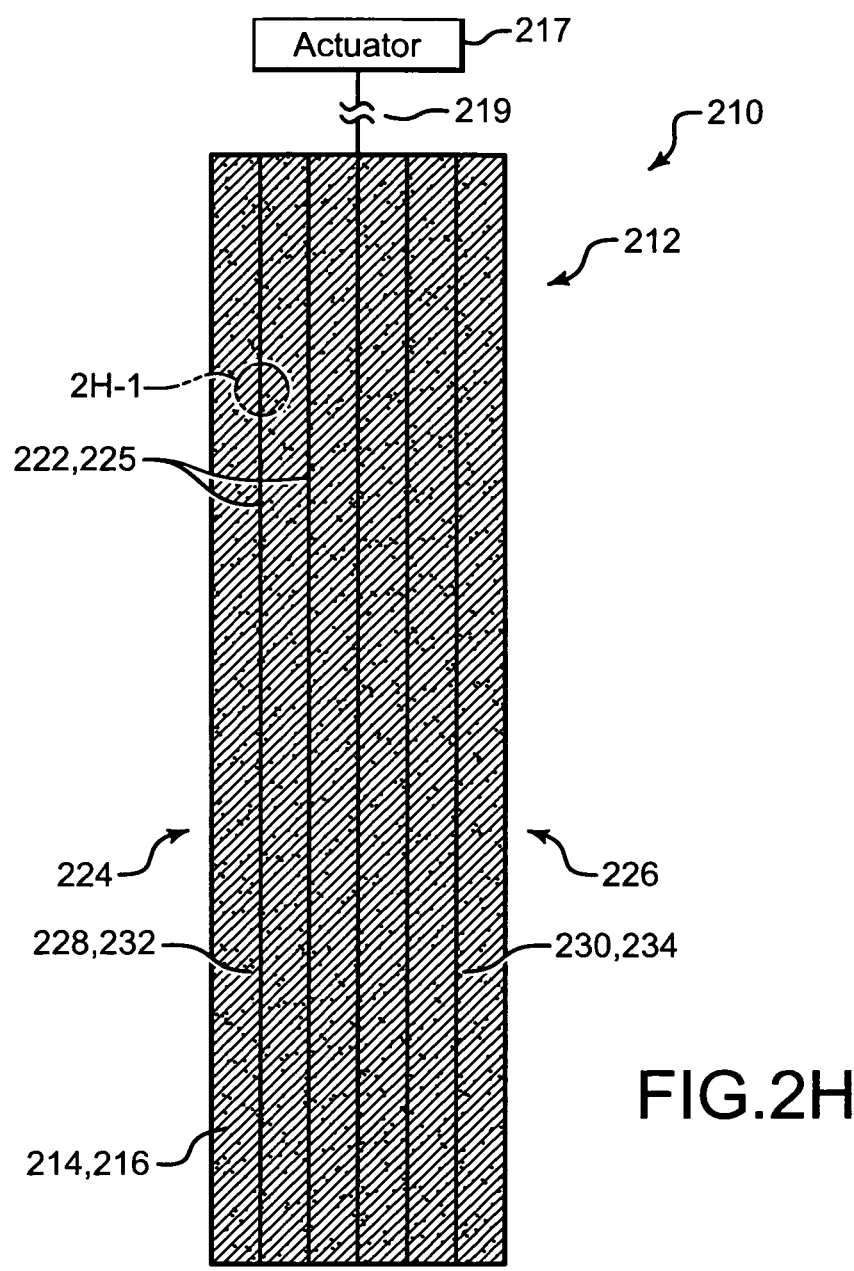
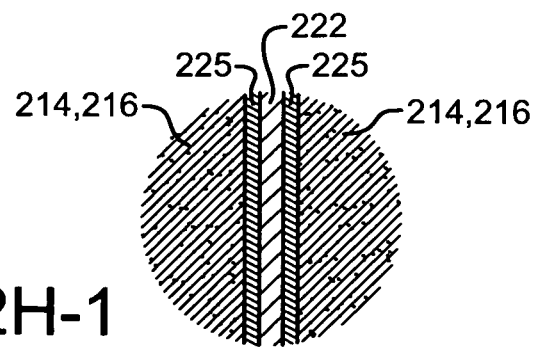
FIG.2H
FIG.2H-1

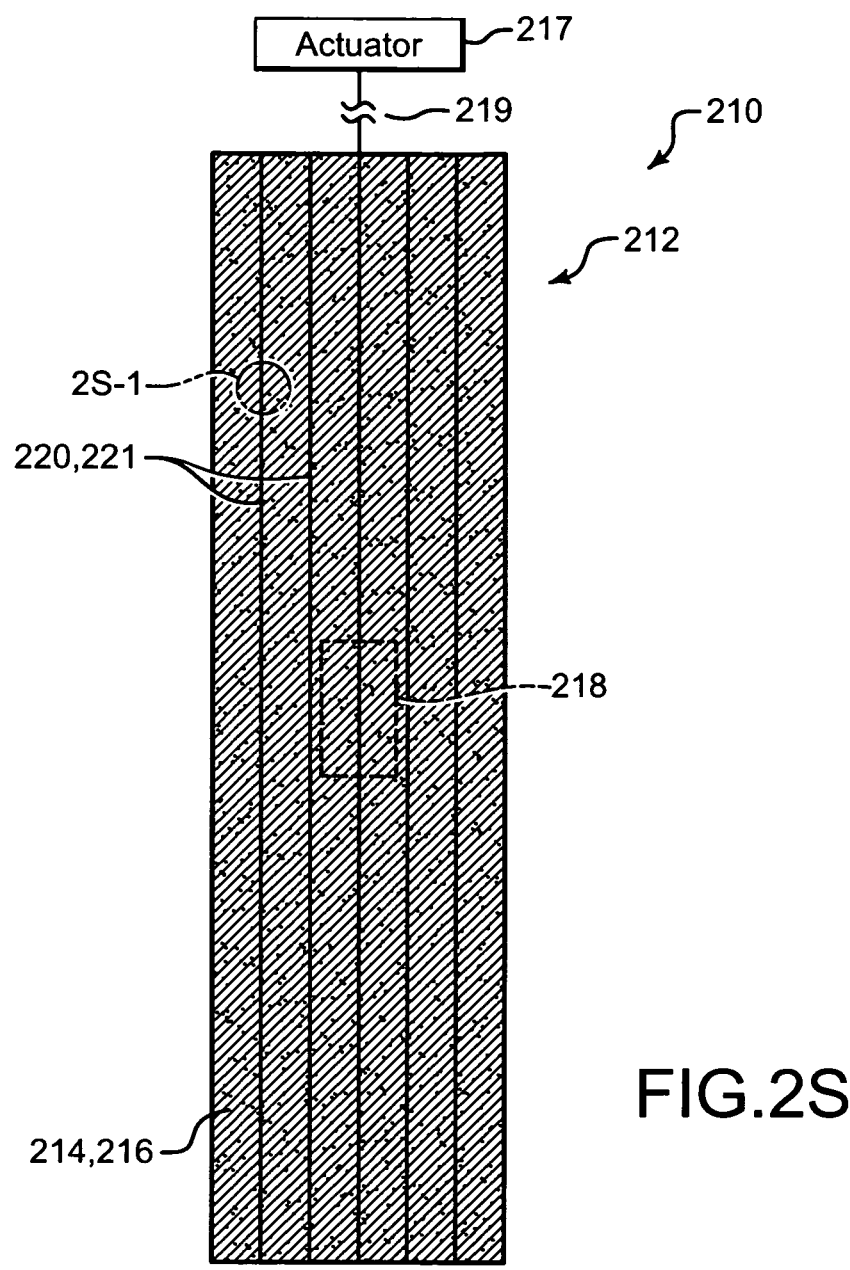
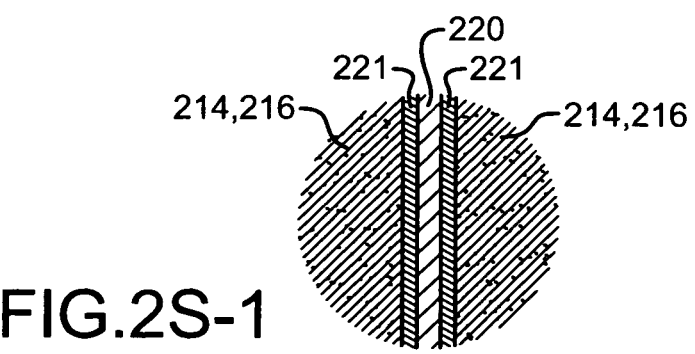
FIG.2S
FIG.2S-1

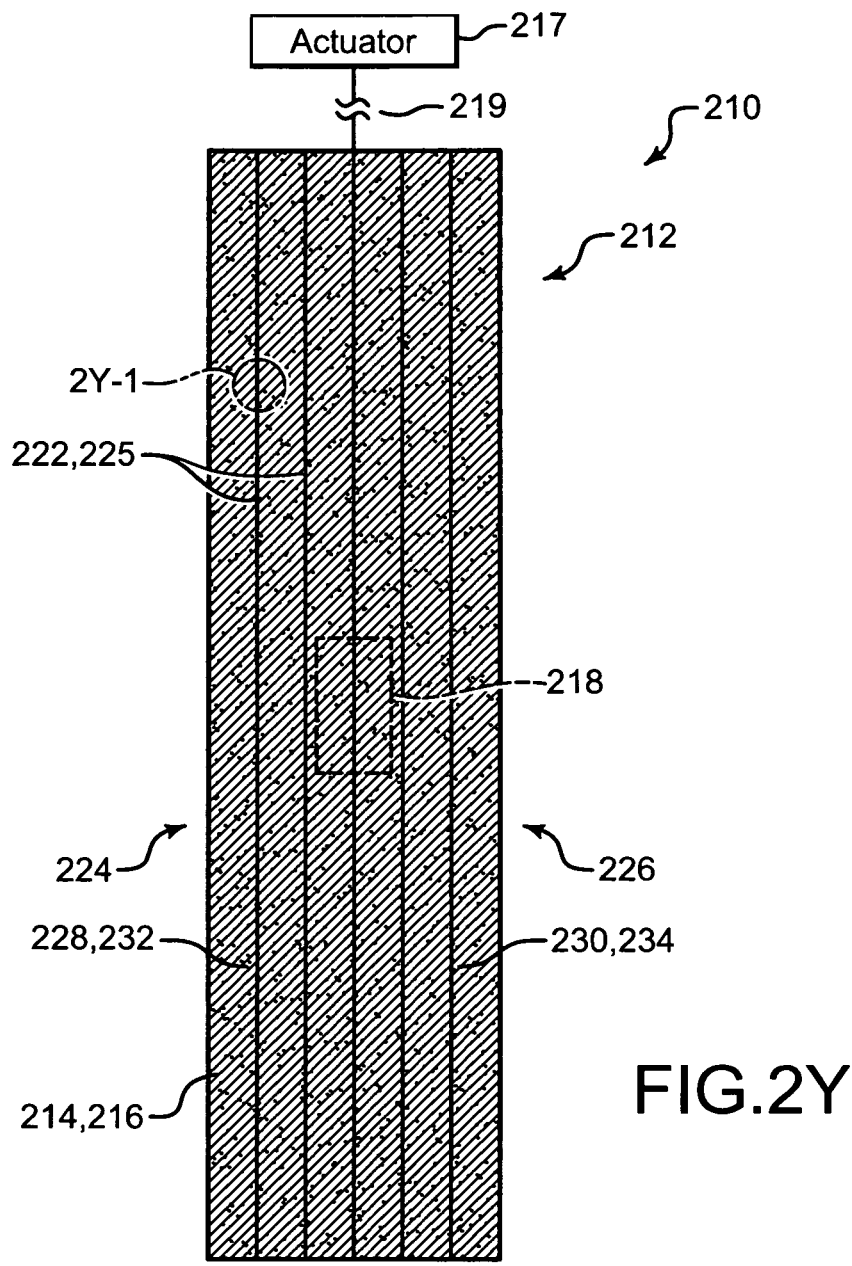
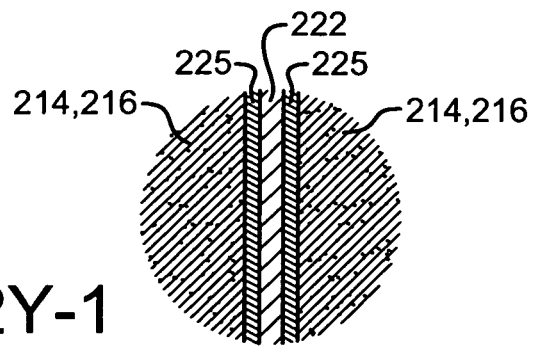
FIG. 2Y
FIG. 2Y-1

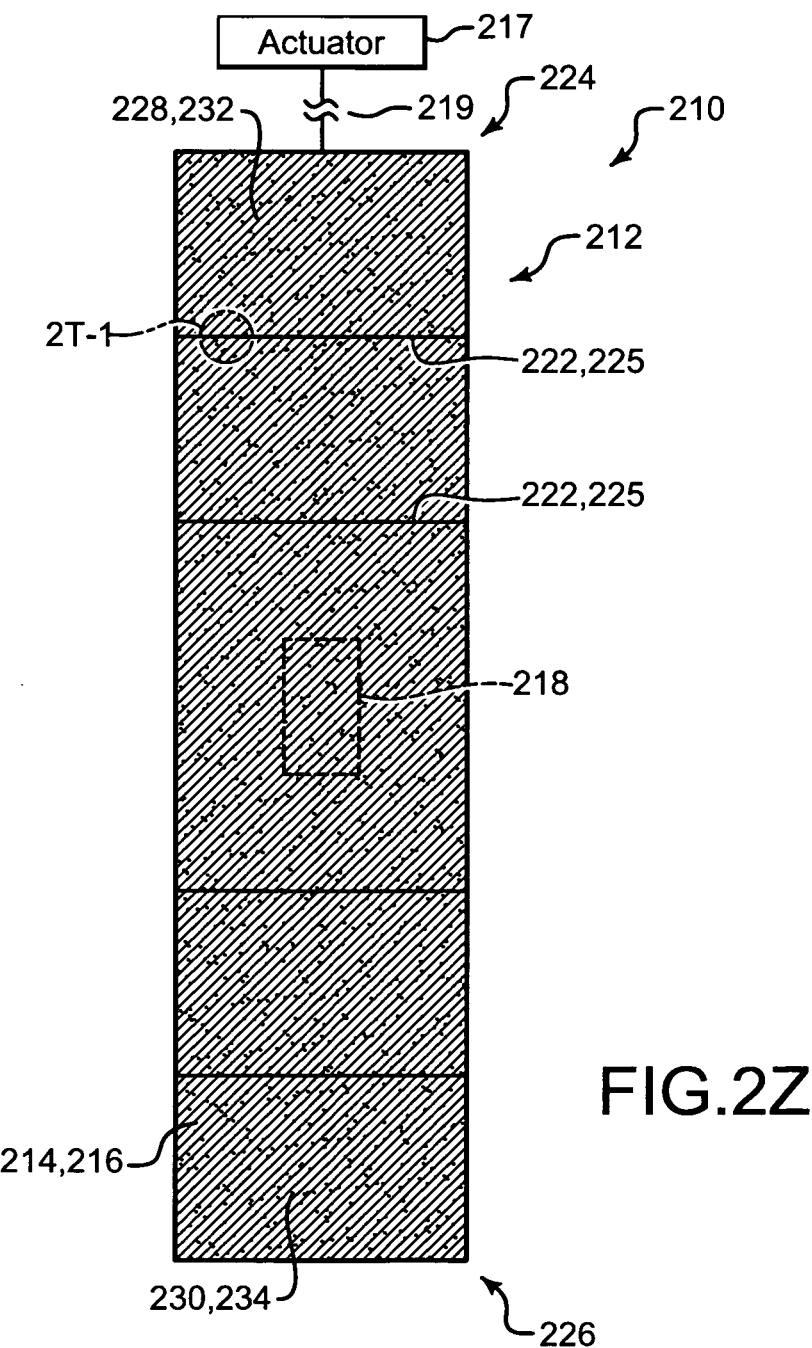
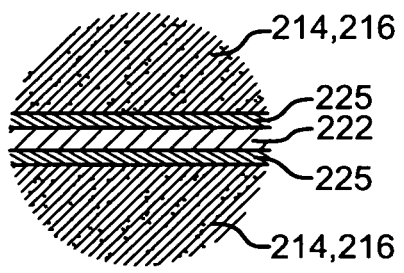
FIG.2Z
FIG.2Z-1

SYSTEMS AND METHODS FOR CONTROLLING REACTIVITY IN A NUCLEAR FISSION REACTOR

BACKGROUND

The present application is related to controlling reactivity in a nuclear fission reactor.

SUMMARY

Illustrative embodiments provide a reactivity control assembly for a nuclear fission reactor, a reactivity control system for a nuclear fission reactor having a fast neutron spectrum, a nuclear fission traveling wave reactor having a fast neutron spectrum, a method of controlling reactivity in a nuclear fission reactor having a fast neutron spectrum, methods of operating a nuclear fission traveling wave reactor having a fast neutron spectrum, a system for controlling reactivity in a nuclear fission reactor having a fast neutron spectrum, a method of determining an application of a controllably movable rod, a system for determining an application of a controllably movable rod, and a computer program product for determining an application of a controllably movable rod.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
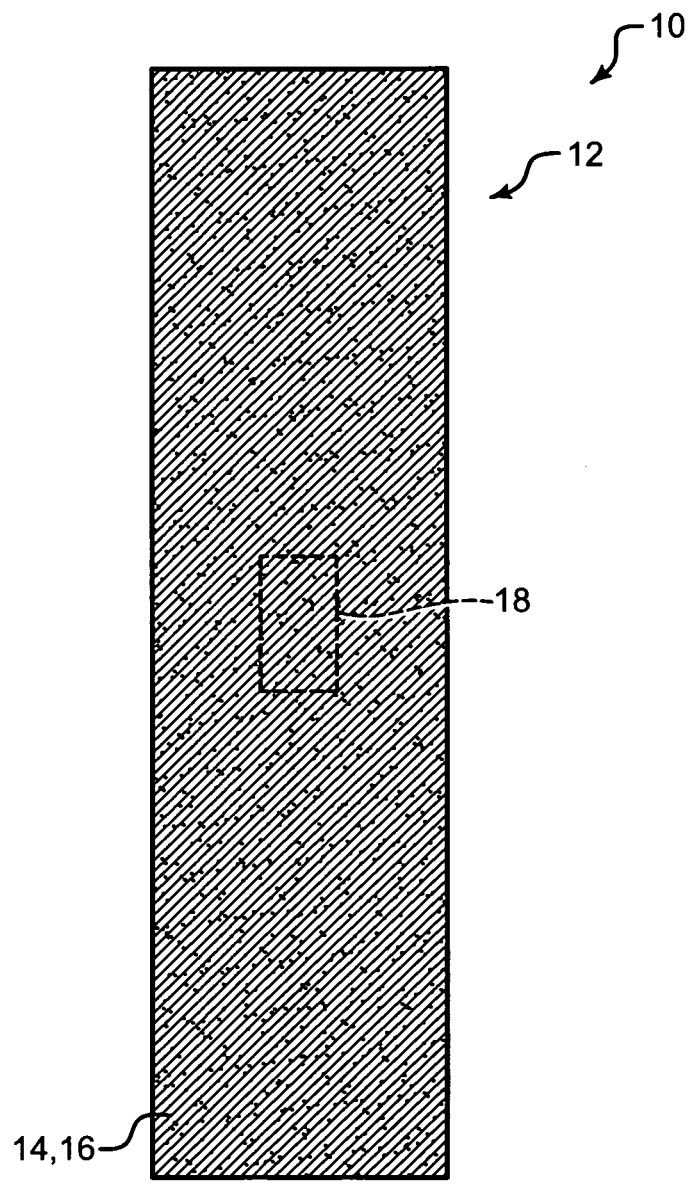
FIGS. 1A-1U are illustrations in partial schematic form of illustrative reactivity control assemblies for a nuclear fission reactor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Illustrative Reactivity Control Assembly

Referring now to FIG. 1A and given by way of overview, an illustrative reactivity control assembly 10 for a nuclear fission reactor (not shown) is shown. A reactivity control rod 12 includes neutron absorbing material 14 configured to absorb neutrons (not shown). At least a portion of the neutron absorbing material 14 includes fertile nuclear fission fuel material 16. At least one sensor 18 is physically associated with the reactivity control rod 12. The sensor 18 is configured to sense status of at least one reactivity parameter associated with the reactivity control rod 12. Illustrative details will be set forth below by way of non-limiting examples.

It will be appreciated that the reactivity control rod 12 may be any type of suitable reactivity control rod. In some embodiments the reactivity control rod 12 may be a stand-alone reactivity control rod. That is, in such an arrangement the reactivity control rod 12 is not grouped into an assembly with other rods, such as nuclear fission fuel rods and/or other reactivity control rods. In some other embodiments, the reactivity control rod 12 may be part of an assembly that includes nuclear fission fuel rods and/or other reactivity control rods.

It will also be appreciated that the reactivity control rod 12 may have any physical shape as desired for a particular application. Given by way of non-limiting examples, in various embodiments the reactivity control rod 12 may have a cross-sectional shape that is square, rectangular, circular, ovoid, or any shape as desired. In various embodiments the reactivity control rod 12 may be embodied as a blade, and may have any cross-sectional shape as desired, such as a rectangle, an "X", a "+", or any other shape. The reactivity control rod 12 may have any shape that is suited for the nuclear fission reactor in which the reactivity control rod 12 is to be used. No limitation regarding shape of the reactivity control rod 12 is implied, and none should be inferred.

In some embodiments the neutron absorbing material 14 may be configured to absorb fast spectrum neutrons. For example, the neutron absorbing material 14 may have an absorption cross-section that permits absorption of fast spectrum neutrons—that is, neutrons having an energy level on the order of at least around 0.11 MeV. Given by way of non-limiting example, the neutron absorbing material 14 may have an absorption cross-section on the order of around 10 barns or less. In some embodiments the fertile nuclear fission fuel material 16 may serve as the component of the neutron absorbing material 14 that absorbs the fast neutrons. In some other embodiments, other component(s) of the neutron absorbing material 14 may also serve as additional component(s) of the neutron absorbing material 14 (in addition to the fertile nuclear fission fuel material 16) that absorbs the fast neutrons. Illustrative details regarding fertile nuclear fission fuel material 16 and other components of the neutron absorbing material 14 will be set forth below.

In some applications, it may be desirable to maintain the neutron spectrum of a nuclear fission reactor within the fast neutron spectrum. Given by way of non-limiting examples, the reactivity control assembly 10 may be used to help control reactivity in a fast nuclear fission reactor, such as without limitation a traveling wave reactor or a fast breeder reactor, like a liquid metal fast breeder reactor or a gas-cooled fast breeder reactor, or the like. To that end, in some other embodiments the neutron absorbing material 14 may be configured to reduce moderation of neutrons. For example, the neutron absorbing material 14 may have a suitably large atomic mass that can help reduce the amount of slowing down of fast spectrum neutrons. As such, a reduction may be made in softening of the neutron spectrum from the fast neutron spectrum toward neutron spectrums having neutron energy levels less than around 0.1 MeV, such as an epi-thermal neutron spectrum or a thermal neutron spectrum. It will be appreciated that, given by way of non-limiting examples, elements of the actinide series, such as without limitation uranium and thorium, present a sufficiently large atomic mass to help reduce moderation of neutrons.

In some embodiments the fast spectrum neutrons may be part of a nuclear fission traveling wave. A nuclear fission traveling wave may also be referred to as a nuclear fission deflagration wave. Non-limiting examples of initiation and propagation of a nuclear fission traveling wave is described in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, and LOWELL L. WOOD, JR. as inventors, filed 28 Nov. 2006; U.S. patent application Ser. No. 11/605,848, entitled METHOD AND SYSTEM FOR PROVIDING FUEL IN A NUCLEAR REACTOR, naming RODERICK A. HYDE, MURIEL Y. ISHIKAWA, NATHAN P. MYHRVOLD, and LOWELL L. WOOD, JR. as inventors, filed 28 Nov. 2006; and U.S. patent application Ser. No. 11/605,933, entitled CONTROLLABLE LONG TERM OPERATION OF A NUCLEAR REACTOR, naming RODERICK A. HYDE, MURIEL Y. ISHIKAWA, NATHAN P. MYHRVOLD, and LOWELL L. WOOD, JR. as inventors, filed 28 Nov. 2006, the entire contents of which are hereby incorporated by reference.

The fertile nuclear fission fuel material 16, that is included in the neutron absorbing material 14, can include any type of fertile nuclear fission fuel material as desired for a particular application. For example, in some embodiments the fertile nuclear fission fuel material 16 may include uranium, such as $^{238}$U. It will be appreciated that the absorption cross-spectrum for fast neutrons of $^{238}$U is on the order of around 0.2 barns. In some other embodiments the fertile nuclear fission fuel material 16 may include thorium, such as $^{232}$Th. It will be appreciated that the absorption cross-spectrum for fast neutrons of $^{232}$Th is on the order of around 0.2 barns. The fertile nuclear fission fuel material 16 may be provided in any suitable form as desired, such as without limitation powdered form, discrete particle form like beads or pellets, or any other form as desired.

In some applications it may be desirable to soften the neutron spectrum from the fast neutron spectrum toward neutron spectrums having neutron energy levels less than around 0.1 MeV, such as an epi-thermal neutron spectrum or a thermal neutron spectrum. For example, in such applications the reactivity control assembly 10 may be used to help control reactivity in a thermal nuclear fission reactor, such as without limitation a pressurized water reactor. As another example, in some other applications the reactivity control assembly 10 may be used to help control reactivity in a fast nuclear fission reactor in which it is desired to soften the neutron spectrum to reduce irradiation damage. To that end and referring now to FIGS. 1B-1G, in some embodiments the reactivity control rod 12 may also include neutron moderating material 20 in addition to the fertile nuclear fission fuel material 16. The neutron moderating material 20 may include any suitable neutron moderating material as desired for a particular application. Given by way of non-limiting example, the neutron moderating material 20 may include any one or more of hydrogen, deuterium, helium, lithium, boron, carbon, graphite, sodium, lead, and the like.

Figure 1B:
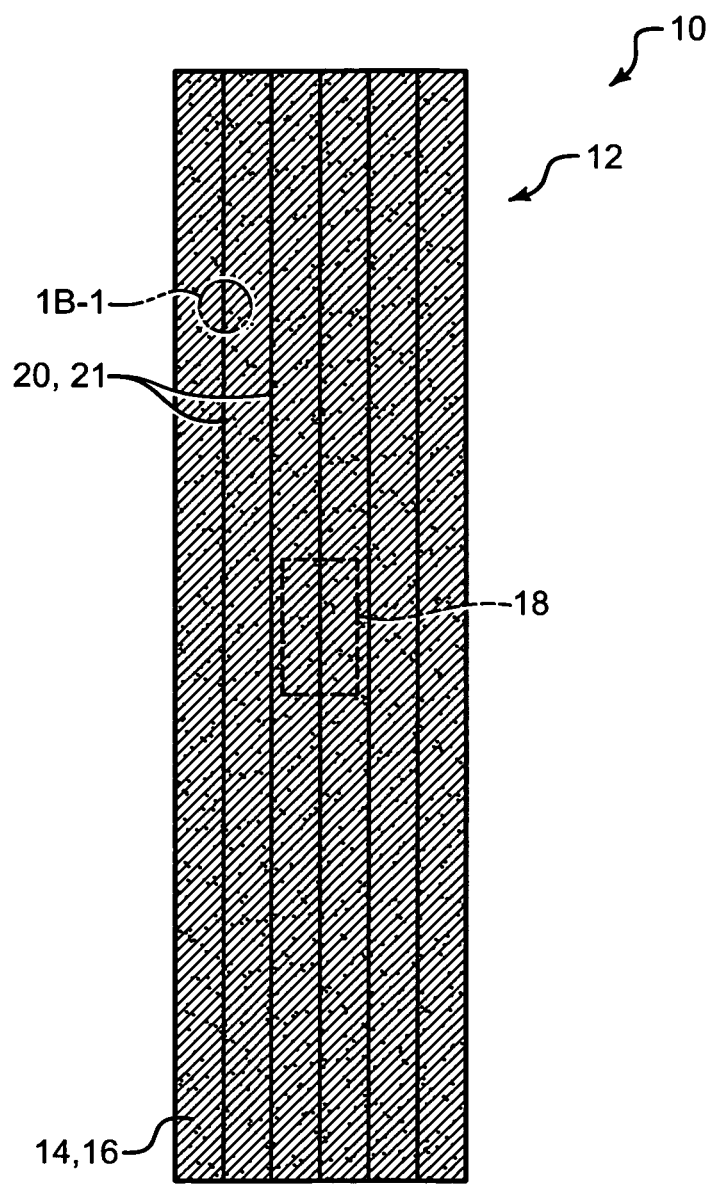
Figures 1, 1B:
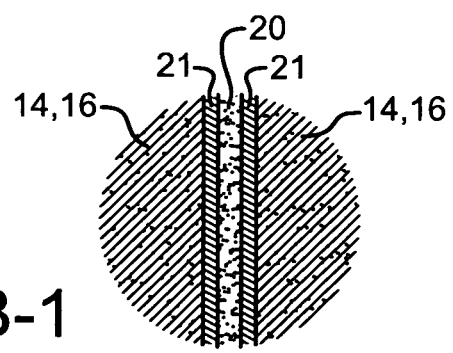
Figure 1C:
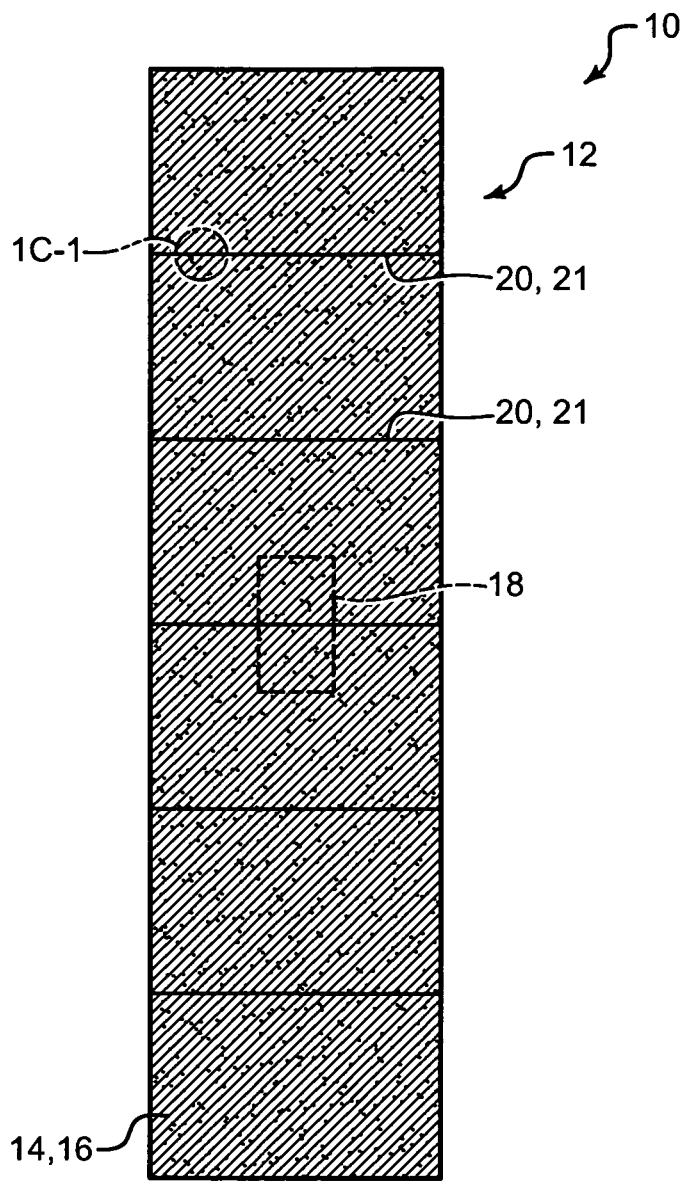
Figures 1, 1C:
Figure 1D:
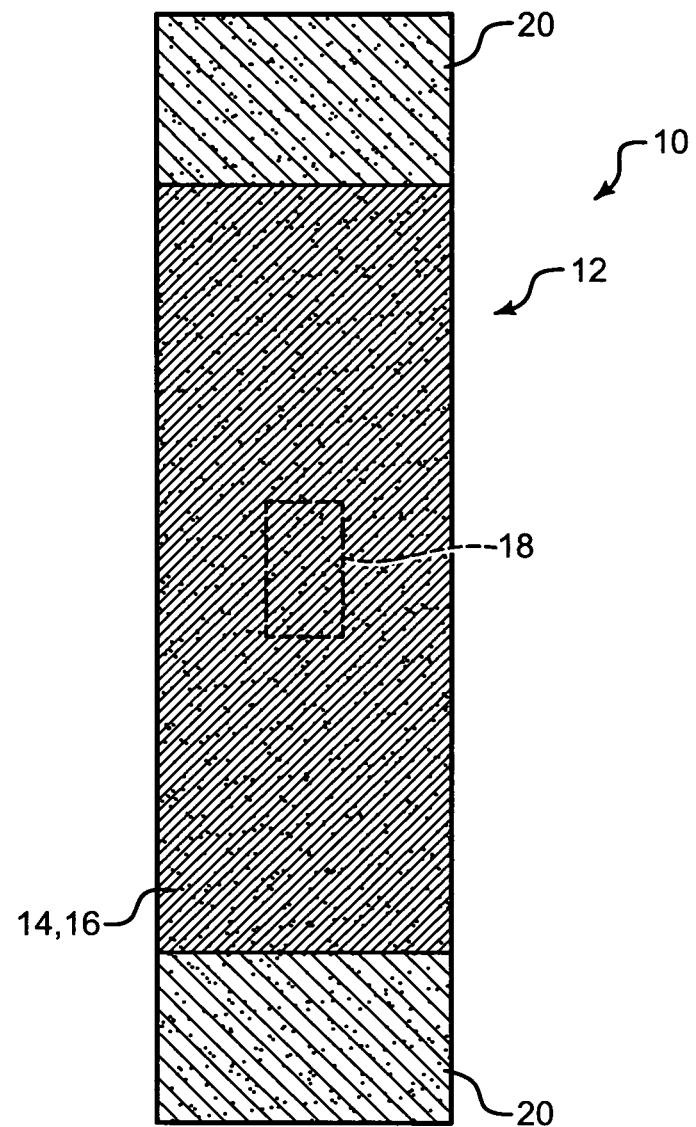
Figure 1E:
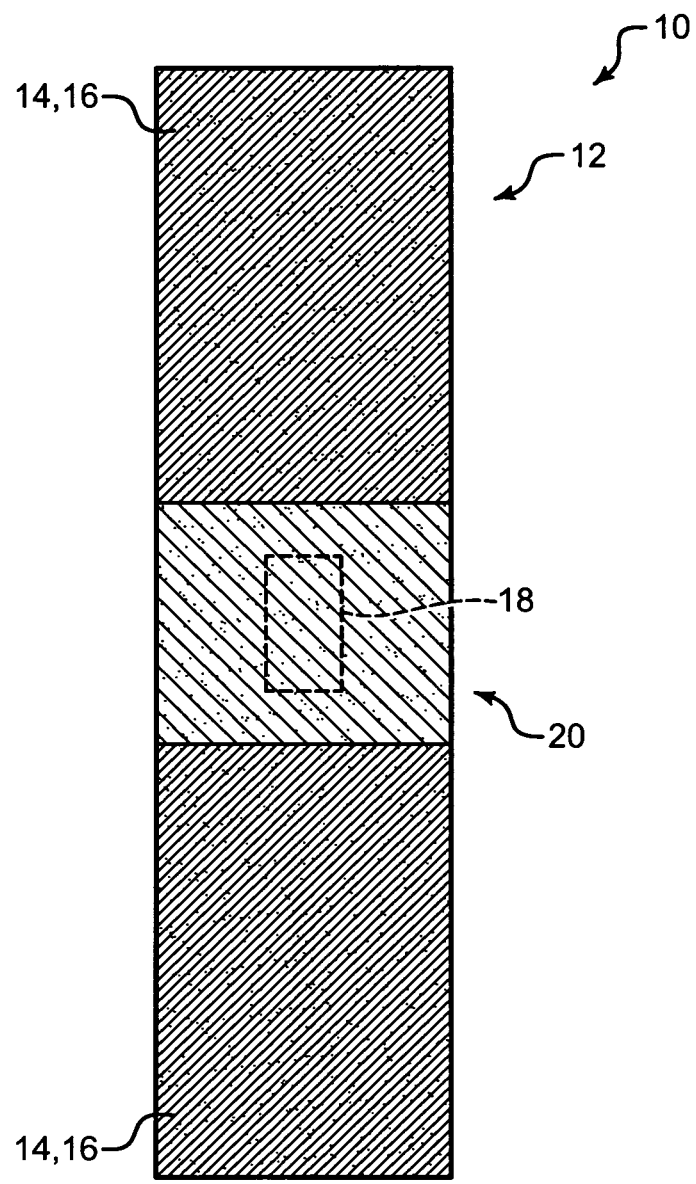
Figure 1F:
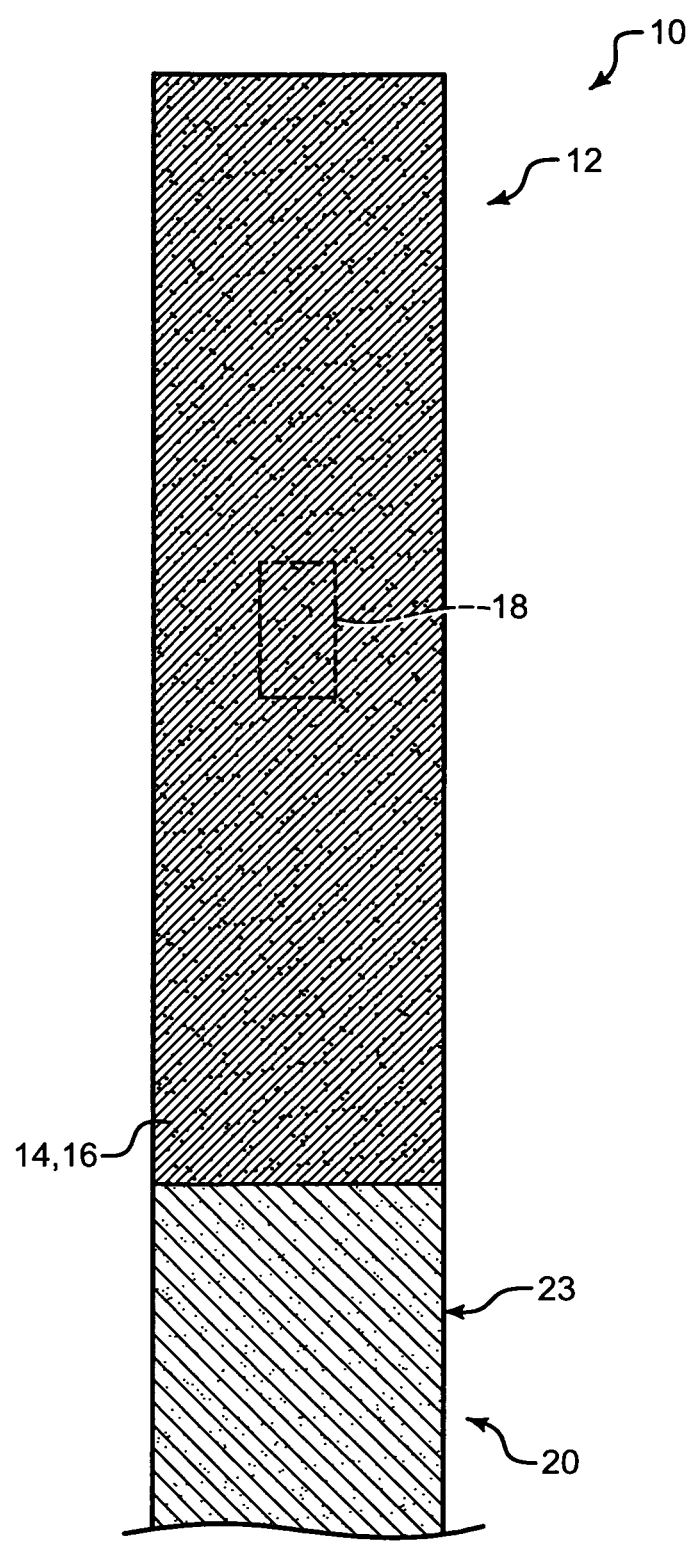
Figure 1G:
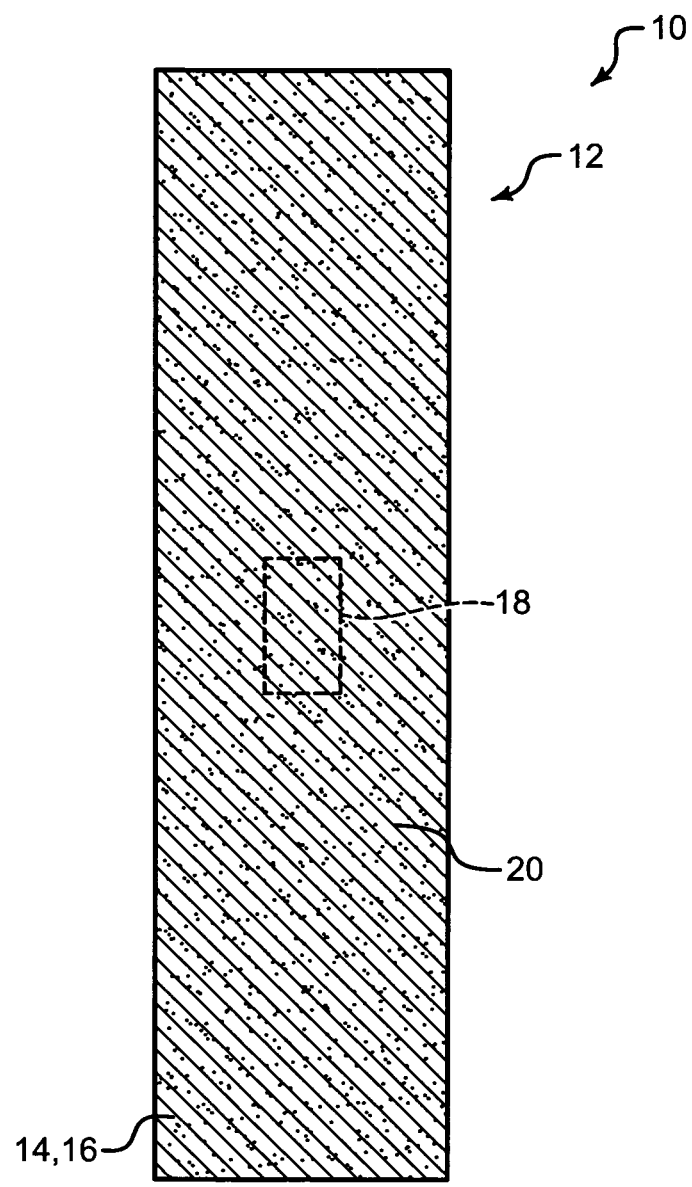

When the neutron moderating material 20 is provided, the neutron moderating material 20 may be distributed within the reactivity control rod 12 in any manner as desired for a particular application. For example and as shown in FIGS. 1B-1F by way of illustration and not of limitation, in some embodiments the neutron moderating material 20 may be substantially heterogeneously distributed within the reactivity control rod 12. Given by way of non-limiting examples, the neutron moderating material 20 may be heterogeneously distributed in disks 21 (FIGS. 1B and 1C). The disks 21 may be oriented substantially coaxially with an axial orientation of the reactivity control rod 12 (as shown in FIG. 1B) or substantially transverse to the axial orientation of the reactivity control rod 12 (as shown in FIG. 1C). Given by way of further non-limiting examples, the neutron moderating material 20 may be heterogeneously distributed toward ends of the reactivity control rod 12 (as shown in FIG. 1D) or toward a middle of the reactivity control rod 12 (as shown in FIG. 1E). Given by way of a further non-limiting example, the neutron moderating material 20 may be provided as a rod follower 23 (as shown in FIG. 1F). It will be appreciated that any heterogeneous distribution may be used as desired. No particular heterogeneous distribution is intended to be implied by way of illustration and none should be inferred. In some other embodiments and as shown in FIG. 1G, the neutron moderating material 20 may be substantially homogeneously distributed within the reactivity control rod 12.

Referring now to FIGS. 1H-1M, in some embodiments the neutron absorbing material 14 may also include neutron absorbing poison 22 in addition to the fertile nuclear fission fuel material 16. The neutron absorbing poison 22 may include any suitable neutron absorbing poison as desired. For example and given by way of non-limiting examples, the neutron absorbing poison 22 may include any one or more of silver, indium, cadmium, gadolinium, hafnium, lithium, $^{3}$He, fission products, protactinium, neptunium, boron, and the like. The neutron absorbing poison 22 may be provided in any suitable form as desired, such as without limitation powdered form, discrete particle form like beads or pellets, or any other form as desired.

Figure 1H:
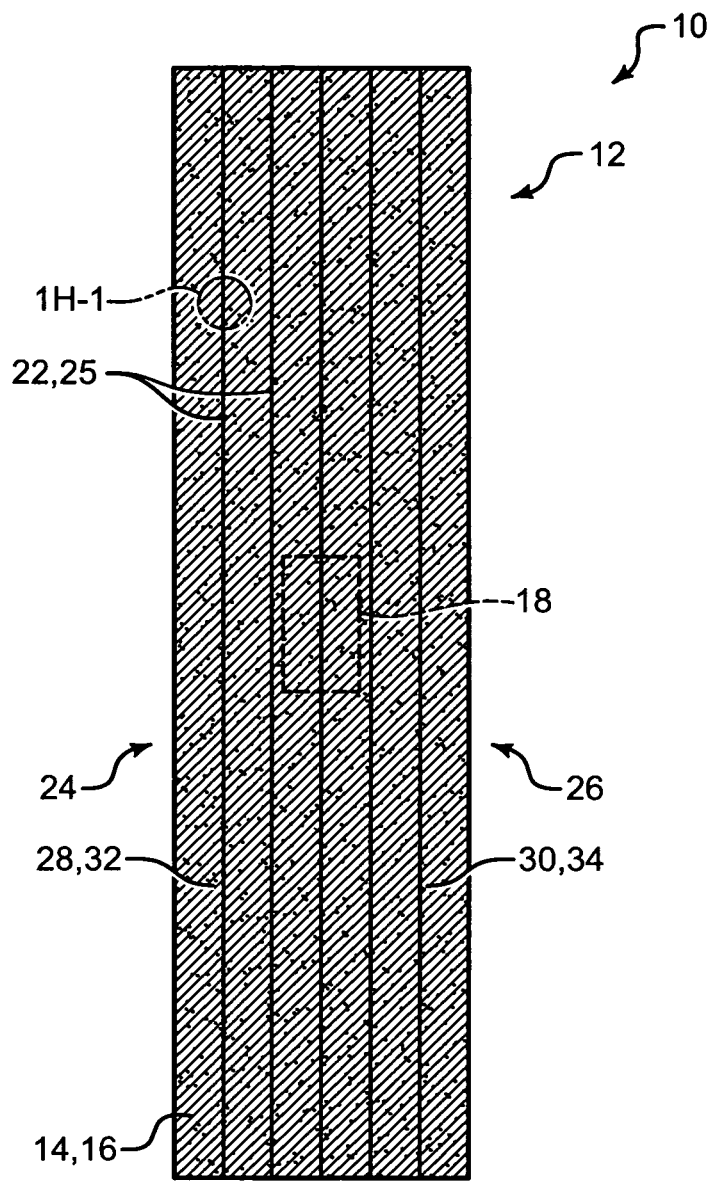
Figures 1, 1H:
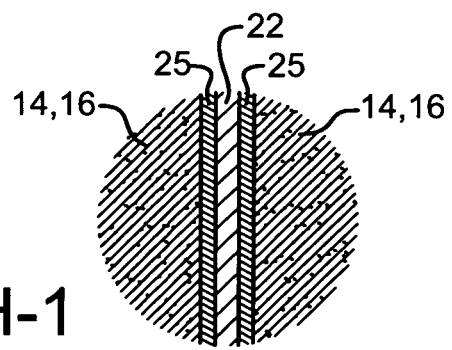
Figure 1I:
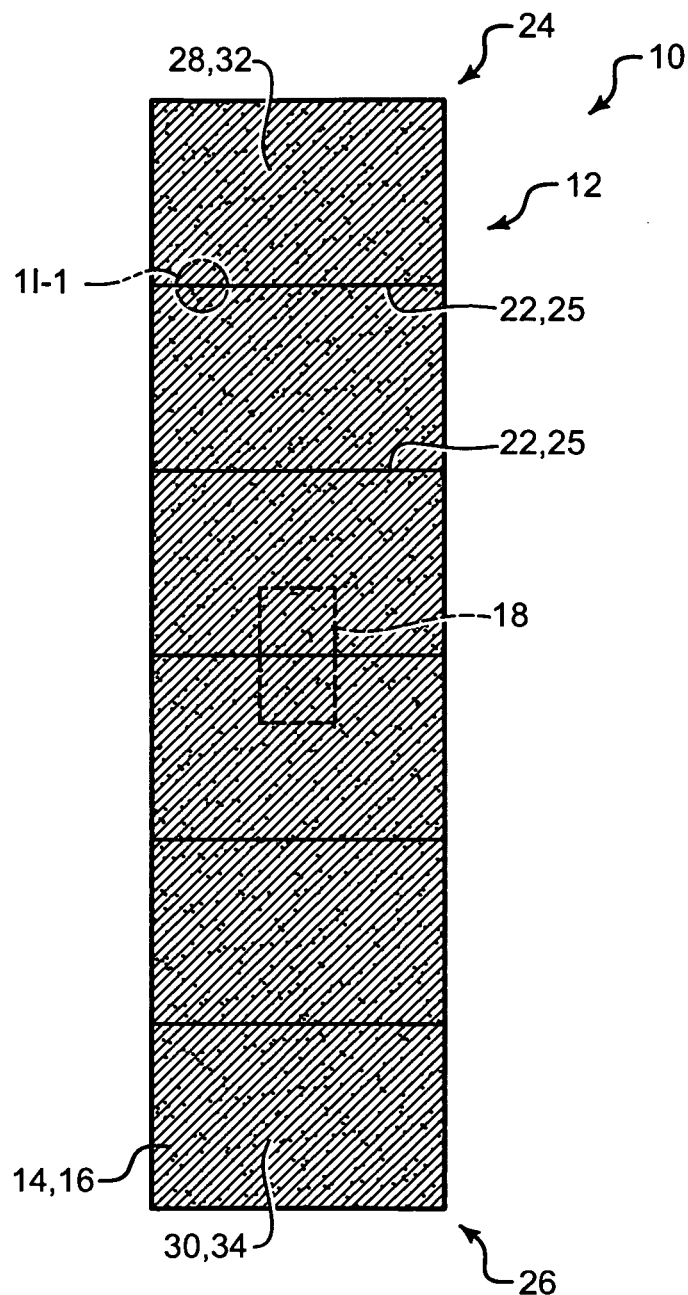
Figures 1, 1I:
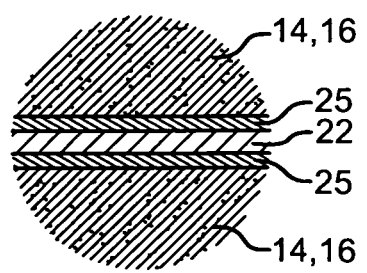
Figure 1J:
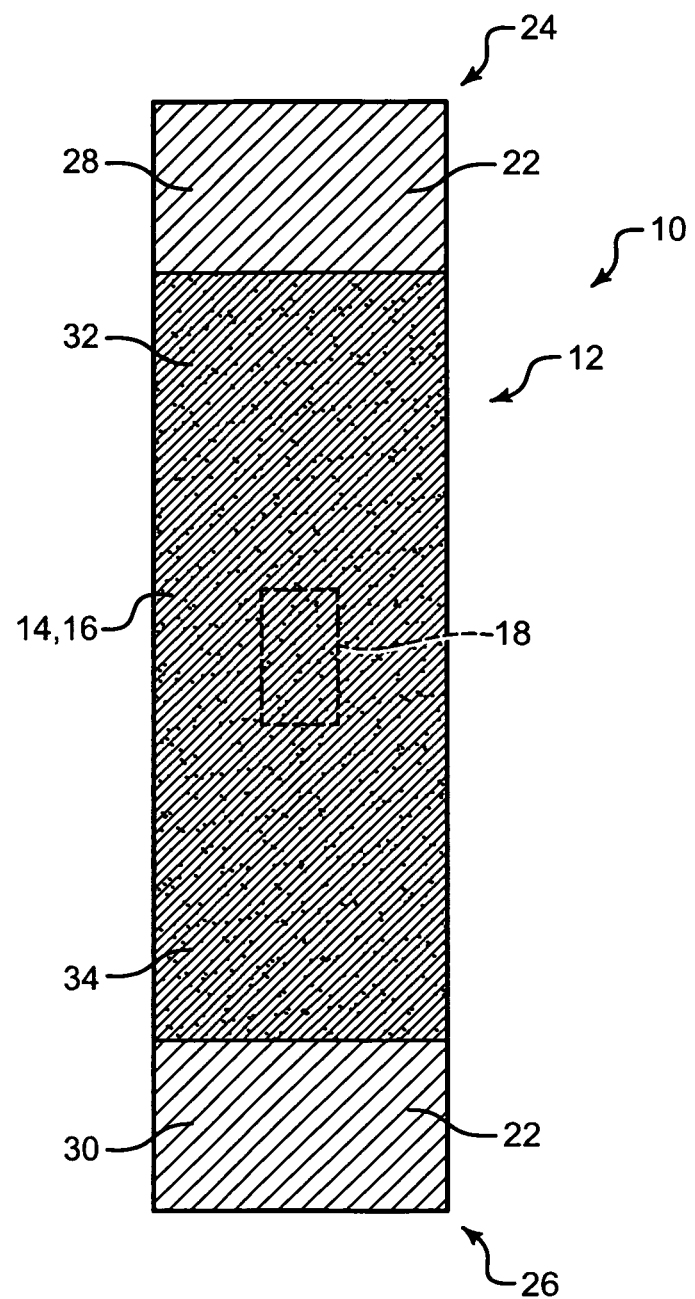
Figure 1K:
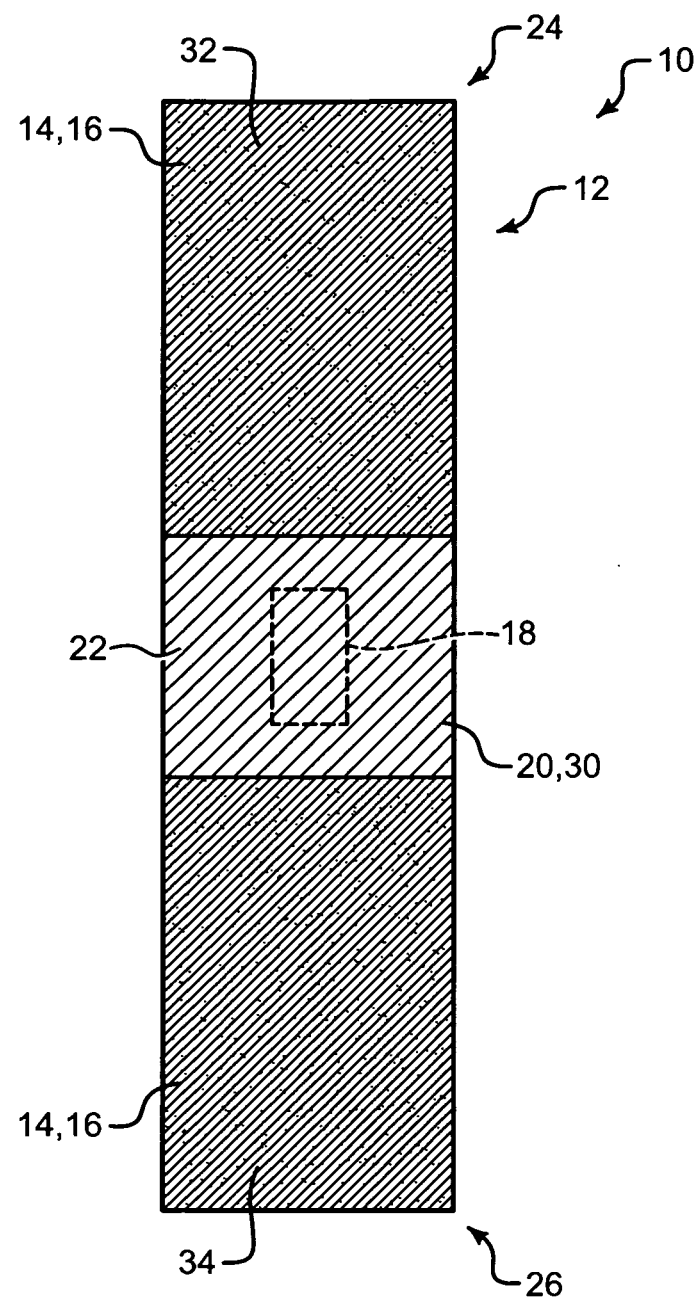
Figure 1L:
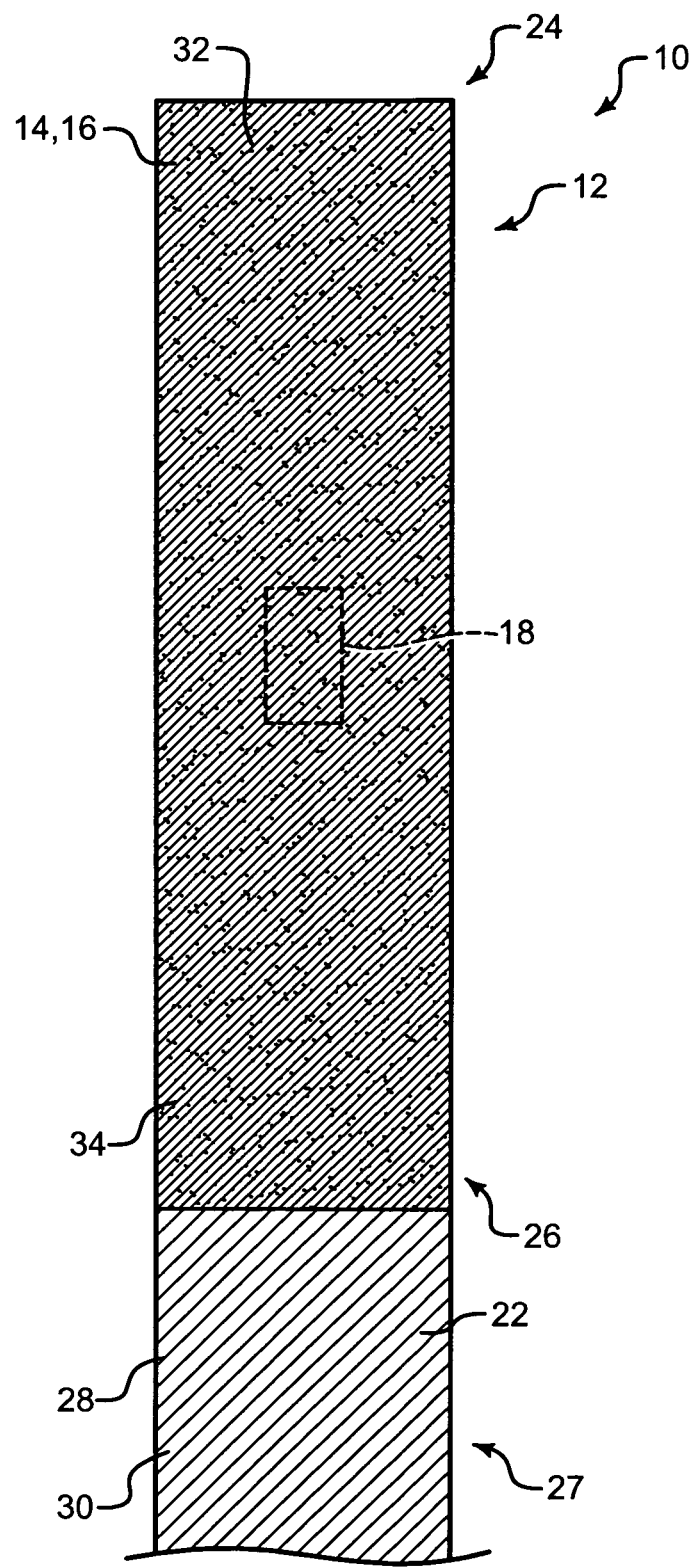

When the neutron absorbing poison 22 is provided, the neutron absorbing poison 22 may be distributed within the reactivity control rod 12 in any manner as desired for a particular application. For example and as shown in FIGS. 1H-1L by way of illustration and not of limitation, in some embodiments the neutron absorbing poison 22 may be substantially heterogeneously distributed within the reactivity control rod 12. Given by way of non-limiting examples, the neutron absorbing poison 22 may be heterogeneously distributed in disks 25 (FIGS. 1H and 1I). The disks 25 may be oriented substantially coaxially with an axial orientation of the reactivity control rod 12 (as shown in FIG. 1H) or substantially transverse to the axial orientation of the reactivity control rod 12 (as shown in FIG. 1I). Given by way of further non-limiting examples, the neutron absorbing poison 22 may be heterogeneously distributed toward ends of the reactivity control rod 12 (as shown in FIG. 1J) or toward a middle of the reactivity control rod 12 (as shown in FIG. 1K). Given by way of a further non-limiting example, the neutron absorbing poison 22 may be provided as a rod follower 27 (as shown in FIG. 1L). It will be appreciated that any heterogeneous distribution may be used as desired. No particular heterogeneous distribution is intended to be implied by way of illustration and none should be inferred. In some other embodiments and as shown in FIG. 1M, the neutron absorbing poison 22 may be substantially homogeneously distributed within the reactivity control rod 12.

Figure 1M:
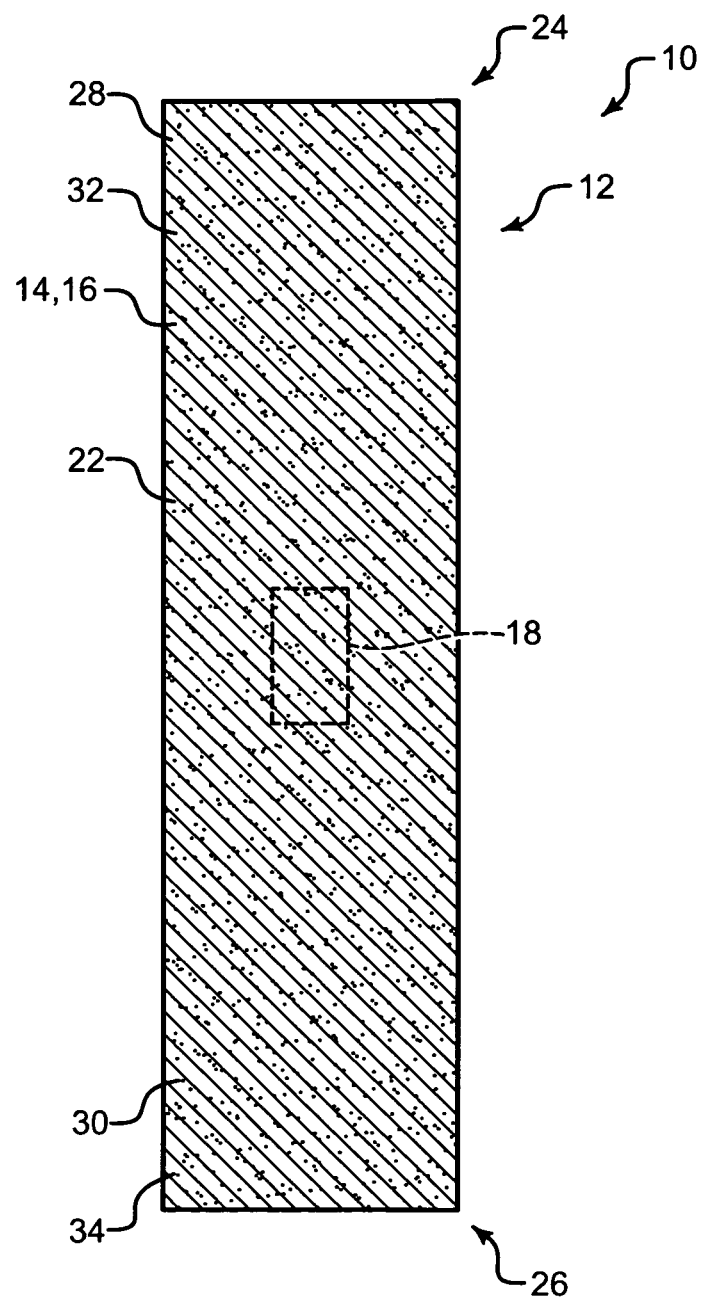
Figure 1N:
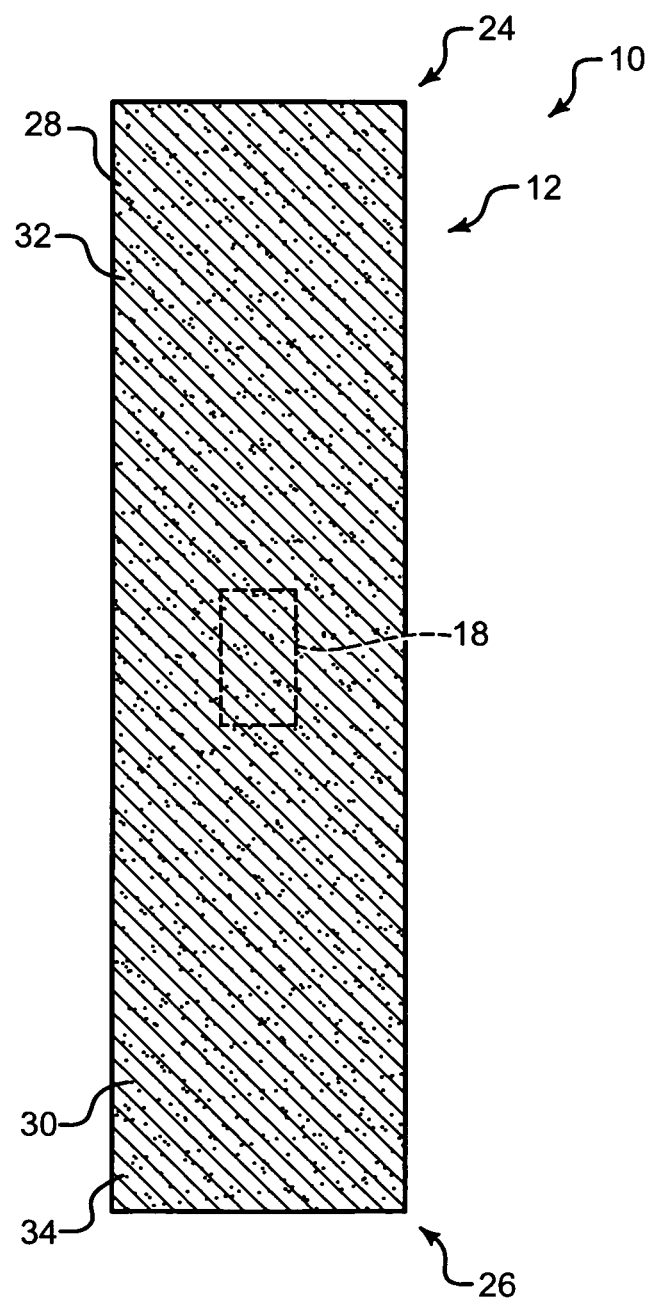

In some embodiments and referring now to FIGS. 1H-1P, an effect on reactivity achievable by the fertile nuclear fission fuel material 16 may equalized toward an effect on reactivity achievable by portions of the neutron absorbing poison 22. For example, such equalization may be desirable to mitigate localized flux peaking. It will be appreciated that such equalization may be effected regardless of whether the fertile nuclear fission fuel material 16 is distributed heterogeneously or homogeneously and regardless of whether the neutron absorbing poison 22 is distributed heterogeneously (FIGS. 1H-1L and FIGS. 1O-1P) or homogeneously (FIG. 1M).

In some other embodiments and still referring to FIGS. 1H-1P, reactivity effect of the fertile nuclear fission fuel material 16 and reactivity effect of the neutron absorbing poison 22 may be locally tailored as desired for a particular application. For example, in some embodiments and as shown generally in FIG. 1N the reactivity control rod 12 has a region 24 and a region 26. It will be appreciated that the regions 24 and 26 may be located anywhere within the reactivity control rod 12 as desired. No limitation is implied, and is not to be inferred, by virtue of appearance in the drawings which are provided for illustration purposes only. A concentration 28 of the neutron absorbing poison 22 is disposed in the region 24 and a concentration 30 of the neutron absorbing poison 22 is disposed in the region 26. A concentration 32 of the fertile nuclear fission fuel material 16 is disposed in the region 24 and a concentration 34 of the fertile nuclear fission fuel material 16 is disposed in the region 26. It will be appreciated that concentration may be determined per volume basis, per area basis, or per length basis, as desired.

It will be appreciated that reactivity effects of the concentrations 28 and 30 of the neutron absorbing poison 22 and reactivity effects of the concentrations 32 and 34 of the fertile nuclear fission fuel material 16 may be tailored as desired for a particular application. For example, in some embodiments and as shown in FIGS. 1H-1P a reactivity effect of the concentration 30 of the neutron absorbing poison 22 may be substantially equalized with a reactivity effect of the concentration 32 of the fertile nuclear fission fuel material 16. In some other embodiments and as also shown in FIGS. 1H-1P a reactivity effect of the concentration 28 of the neutron absorbing poison 22 may be substantially equalized with a reactivity effect of the concentration 34 of the fertile nuclear fission fuel material 16.

In some other embodiments and as shown in FIGS. 1H-1P a reactivity effect of the concentration 30 of the neutron absorbing poison 22 may be different from a reactivity effect of the concentration 32 of the fertile nuclear fission fuel material 16. In other embodiments a reactivity effect of the concentration 28 of the neutron absorbing poison 22 may be different from a reactivity effect of the concentration 34 of the fertile nuclear fission fuel material 16.

Other reactivity effects may be effected as desired. For example and as shown in FIGS. 1H-1P, in some embodiments a sum of reactivity effects of the concentration 28 of the neutron absorbing poison 22 and the concentration 32 of the fertile nuclear fission fuel material 16 may be substantially equalized toward a sum of reactivity effects of the concentration 30 of the neutron absorbing poison 22 and the concentration 34 of the fertile nuclear fission fuel material 16. In some other embodiments, reactivity effect is substantially constant between the region 24 and the region 26.

Figure 1O:
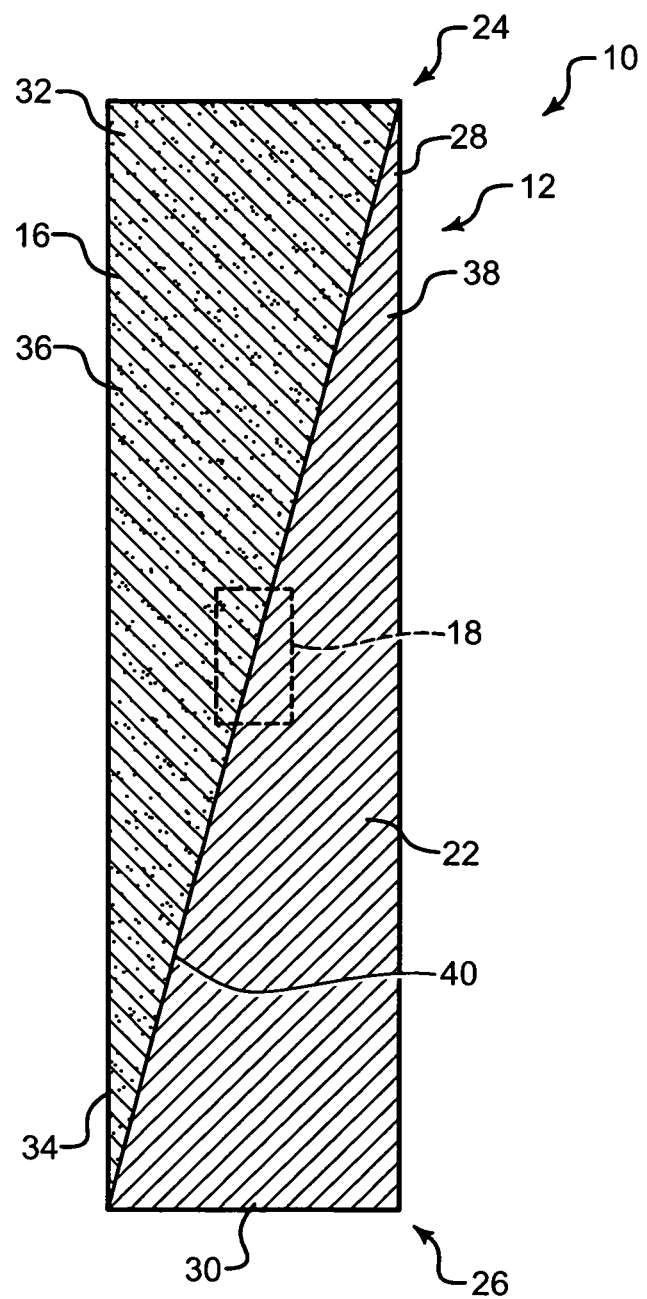
Figure 1P:
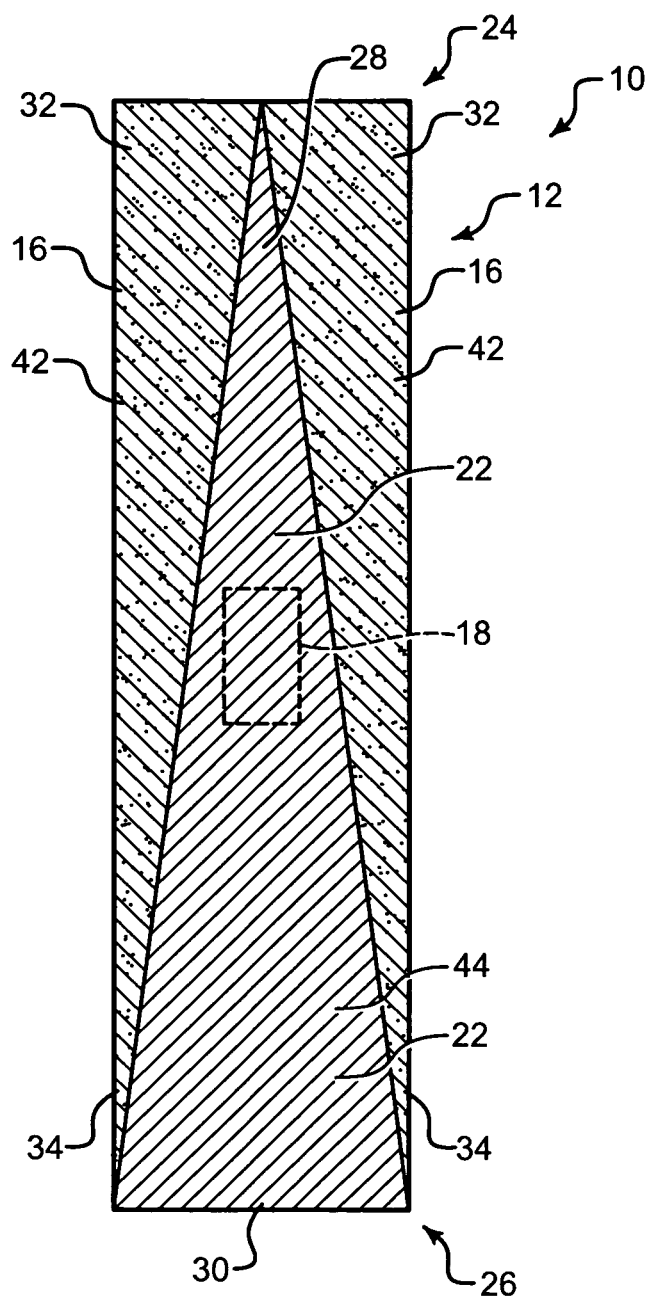

If desired, concentration of the fertile nuclear fission fuel material 16 and/or the neutron absorbing poison 22 may vary. For example and as shown in FIGS. 1O and 1P, in some embodiments concentration the fertile nuclear fission fuel material 16 and/or the neutron absorbing poison 22 may change along a continuous gradient. Given by way of non-limiting example, as shown in FIG. 1O the fertile nuclear fission fuel material 16 and the neutron absorbing poison 22 may be provided in wedges 36 and 38, respectively, that abut each other along their hypotenuse 40. Given by way of another non-limiting example, as shown in FIG. 1P the fertile nuclear fission fuel material 16 and the neutron absorbing poison 22 may be provided in mated frustoconical sections 42 and 44, respectively. It will be appreciated that the fertile nuclear fission fuel material 16 and the neutron absorbing poison 22 may be provided in other suitable arrangements in which their concentrations change along a continuous gradient, and arrangements are not to be limited to those shown in FIGS. 1G and 1H by way of illustration and not of limitation.

In some other embodiments, concentration of the fertile nuclear fission fuel material 16 and/or the neutron absorbing poison 22 may change along a non-continuous gradient. For example, concentration of the fertile nuclear fission fuel material 16 and/or the neutron absorbing poison 22 may change along a non-continuous gradient as a result of heterogeneous distribution as shown in FIGS. 1H-1L. In such cases, concentration of the neutron absorbing poison 22 can vary along a non-contiguous gradient because the neutron absorbing poison 22 is provided in discrete locations (as opposed to homogeneous distribution). Also in such cases, concentration of the fertile nuclear fission fuel material 16 can vary along a non-contiguous gradient because the fertile nuclear fission fuel material 16 is provided in discrete locations that are separated from each other by the discrete locations of the neutron absorbing poison 22.

In some embodiments the fertile nuclear fission fuel material 16 and the neutron absorbing poison 22 may be spatially fixed relative to each other. That is, in such arrangements the fertile nuclear fission fuel material 16 and the neutron absorbing poison 22 do not physically move in relation to each other. However, in some other embodiments the fertile nuclear fission fuel material 16 and the neutron absorbing poison 22 may be spatially movable relative to each other. Given by way of non-limiting example and referring briefly to FIGS. 1H-1L and 1O-1P, any one or more of the discrete locations of the neutron absorbing poison 22, such as without limitation the disks 25, may be slidably received in the reactivity control rod 12 and may be moved in and out of the reactivity control rod 12 as desired by a suitable mechanism, such as a control rod drive mechanism (not shown) or the like.

Figure 1Q:
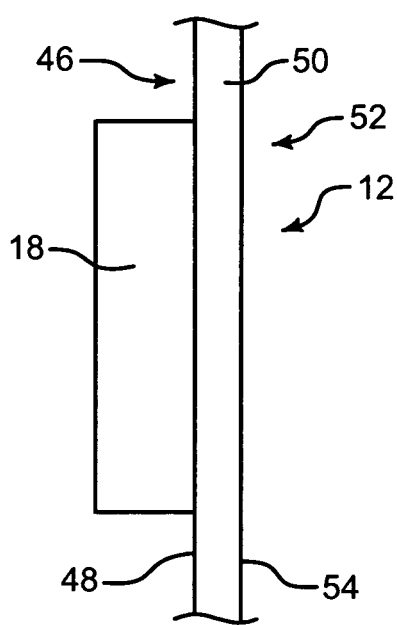
Figure 1R:
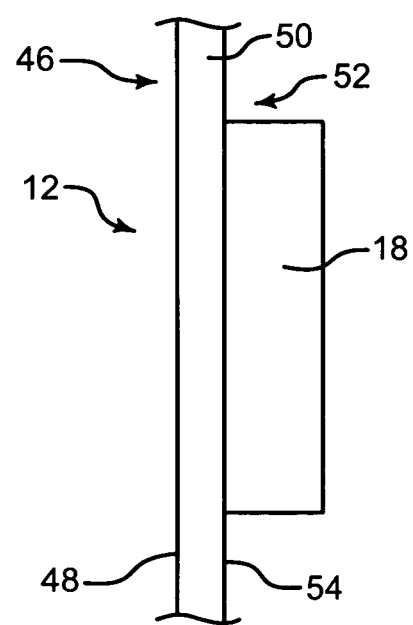

The sensor 18 may be physically associated with the reactivity control rod 12 in any suitable physical association as desired. For example, referring now to FIGS. 1A-1P and also to FIG. 1Q, in some embodiments physical association may include the sensor 18 being located within an interior 46 of the reactivity control rod 12. For example, the sensor 18 may be located via any suitable attachment method on an interior surface 48 of a cladding wall 50 of the reactivity control rod 12. As a further example and referring now to FIGS. 1A-1P and also to FIG. 1R, in some other embodiments physical association may include the sensor 18 being located proximate an exterior 52 of the reactivity control rod 12. For example, the sensor 18 may be located via any suitable method on an exterior surface 54 of the cladding wall 50.

Any one or more of various reactivity parameters associated with the reactivity control rod 12 may be sensed with the sensor 18. Given by way of non-limiting examples, the sensed reactivity parameter may include any one or more of parameters such as neutron fluence, neutron flux, neutron fissions, fission products, radioactive decay events, temperature, pressure, power, isotopic concentration, burnup, and/or neutron spectrum.

The sensor 18 may include any suitable sensor that is configured to sense the reactivity parameter that is desired to be sensed. Given by way of non-limiting example, in some embodiments the sensor 18 may include at least one fission detector, such as without limitation a micro-pocket fission detector. In some other embodiments the sensor 18 may include a neutron flux monitor, such as without limitation a fission chamber and/or an ion chamber. In some embodiments the sensor 18 may include a neutron fluence sensor, such as without limitation an integrating diamond sensor. In some embodiments the sensor 18 may include a fission product detector, such as without limitation a gas detector, a $\beta$ detector, and/or a $\gamma$ detector. In some embodiments, when provided, the fission product detector may configured to measure a ratio of isotope types in fission product gas. In some embodiments the sensor 18 may include a temperature sensor. In some other embodiments the sensor 18 may include a pressure sensor. In some embodiments the sensor 18 may include a power sensor, such as without limitation a power range nuclear instrument. In some embodiments, if desired the sensor 18 may be replaceable.

Figure 1S:
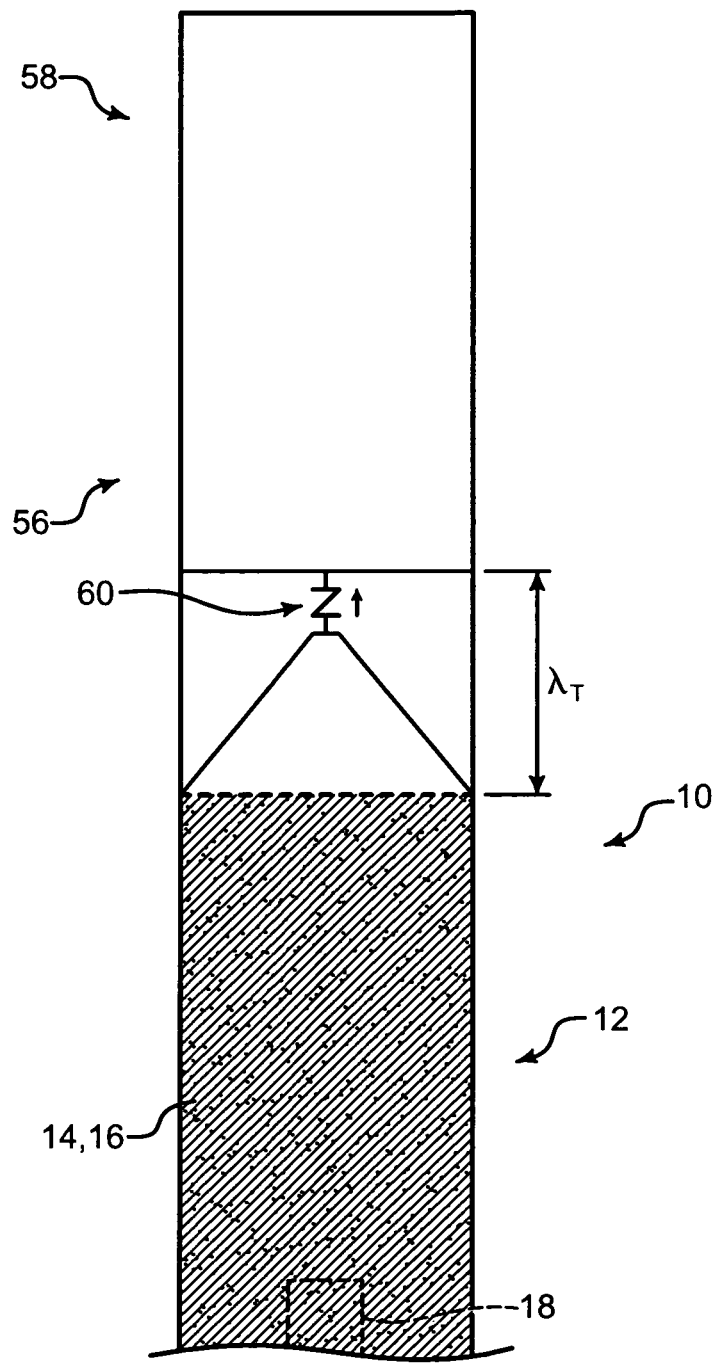

In some applications it may be desirable to mitigate effects of internal pressure within the reactivity control rod 12 exerted by fission products, such as fission product gases. In such cases and referring now to FIG. 1S, in some embodiments the reactivity control rod 12 may define at least one chamber 56 configured to accumulate fission products. For example, when provided the chamber 56 may include a plenum 58. In some embodiments the plenum 58 may be located at least one mean free path $\lambda_T$ for fission-inducing neutrons from the fertile nuclear fission fuel material 16. In some embodiments a backflow prevention device 60, such as a check valve like a ball check vale or the like, may be provided to help prevent re-entry into the reactivity control rod 12 of fission product gases that have outgassed from the reactivity control rod 12.

Figure 1T:
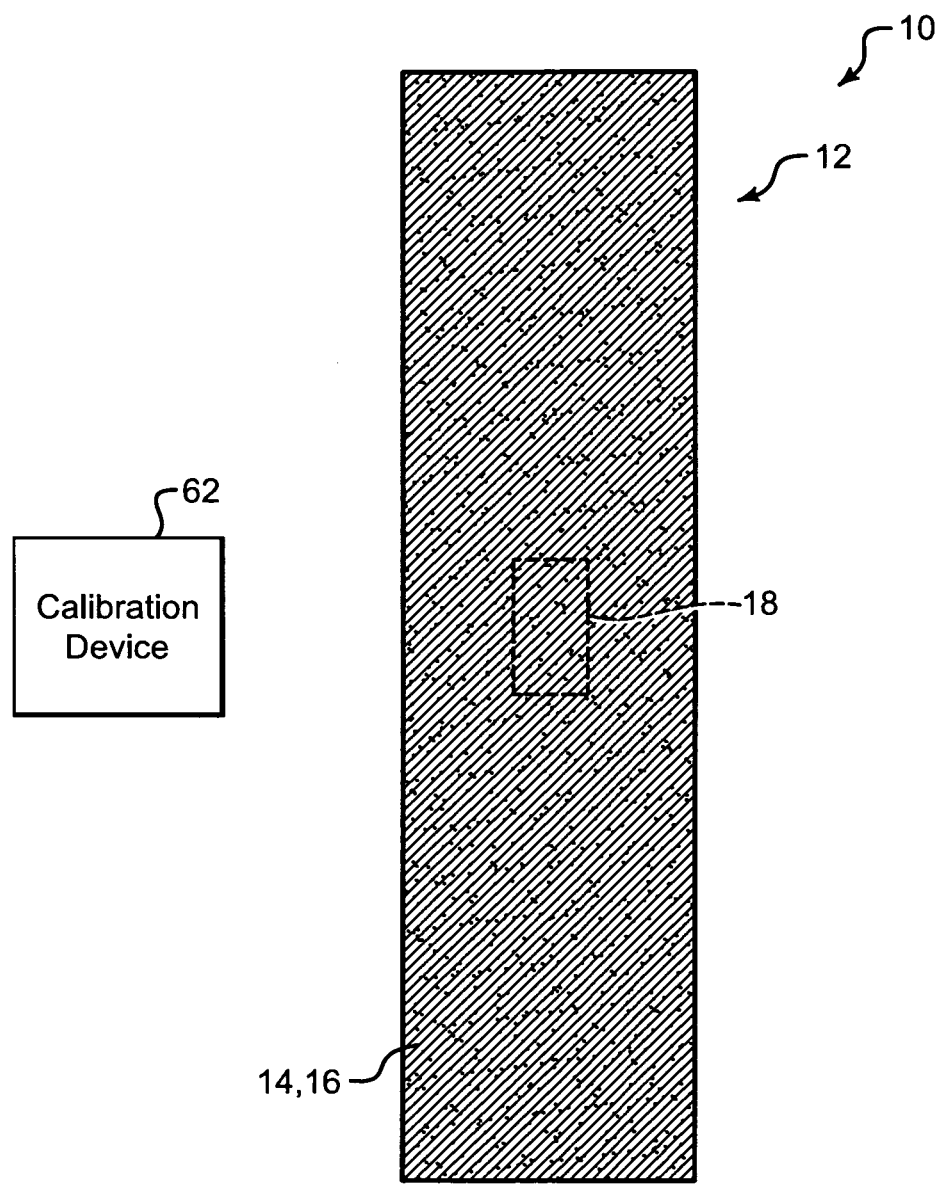

Referring now to FIG. 1T, in some embodiments a calibration device 62 configured to calibrate the sensor 18 may be provided. It will be appreciated that, when provided, the calibration device 62 suitably is a source having known characteristics or attributes of the reactivity parameter, discussed above, that is sensed by the sensor 18.

Figure 1U:
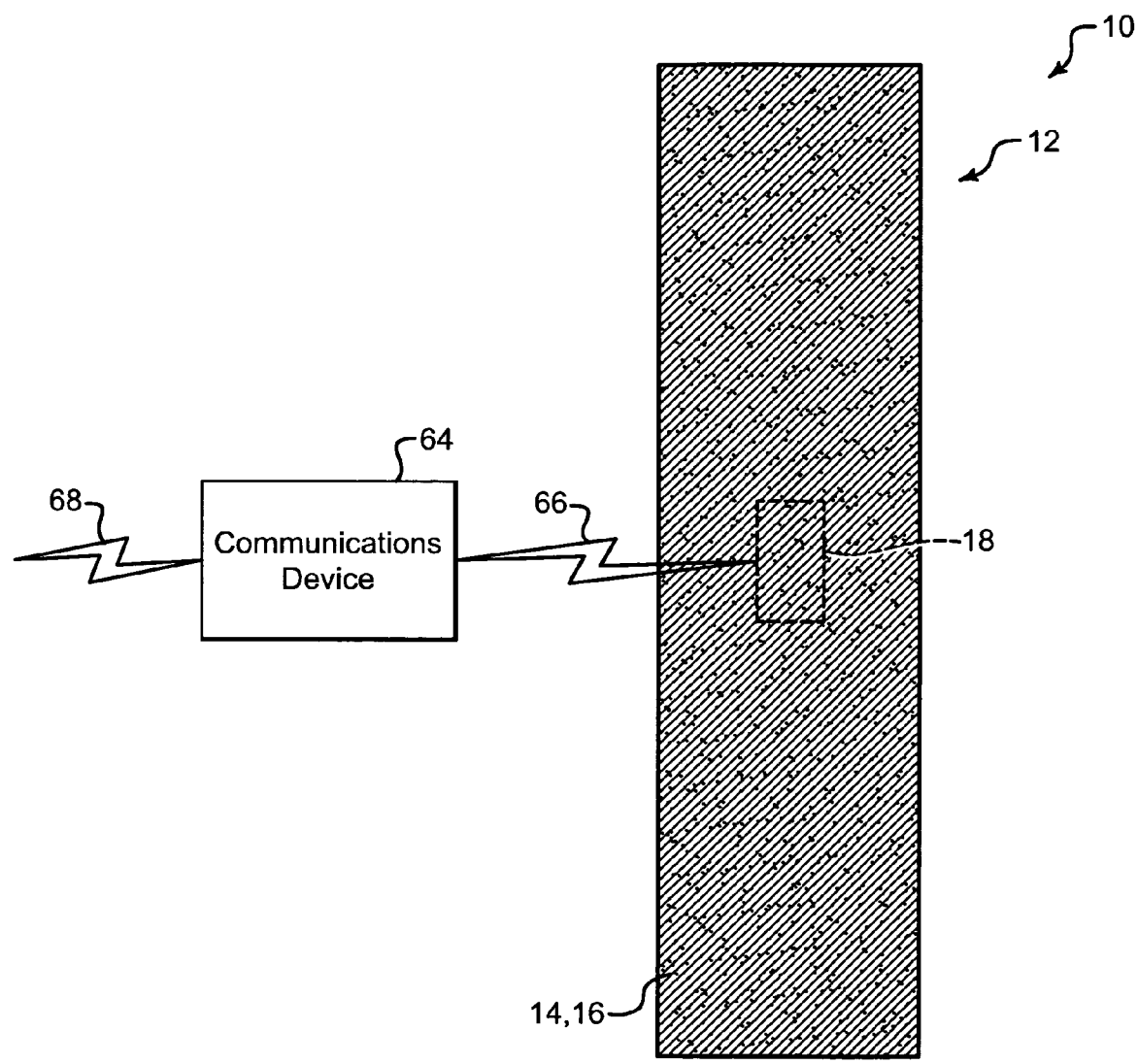

Referring now to FIG. 1U, in some embodiments at least one communications device 64 may be operatively coupled to the sensor 18 as generally indicated at 66. The communications device 18 suitably is any acceptable device that can operatively couple the sensor 18 in signal communication with a suitable communications receiving device (not shown) as generally indicated at 68. Given by way of non-limiting examples, the communications device 64 may include an electrical cable, a fiber optic cable, a telemetry transmitter, a radiofrequency transmitter, an optical transmitter, or the like.

Illustrative Reactivity Control System

Figure 2A:
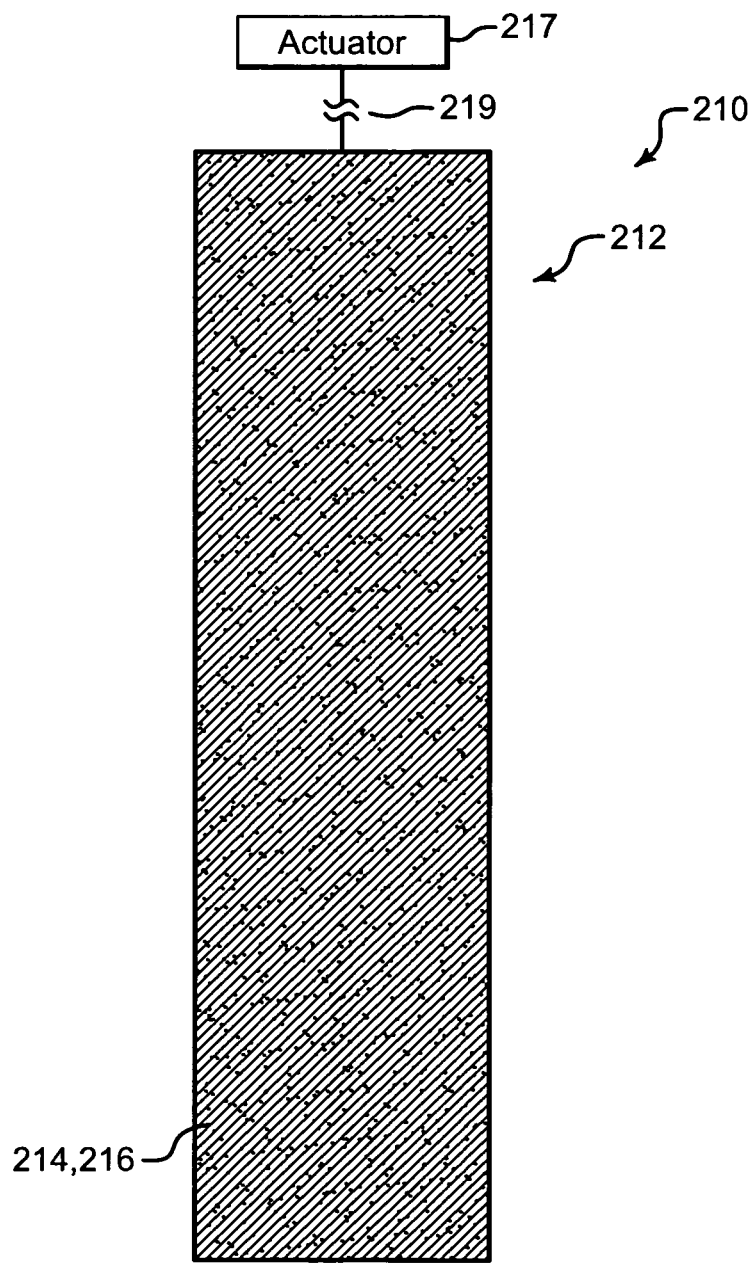
FIGS. 2A-2AP are illustrations in partial schematic form of illustrative reactivity control systems for a nuclear fission reactor having a fast neutron spectrum.

Referring now to FIG. 2A, an illustrative reactivity control system 210 is provided for a nuclear fission reactor (not shown) having a fast neutron spectrum. Given by way of overview, the reactivity control system 210 includes a reactivity control rod 212. The reactivity control rod 212 includes neutron absorbing material 214 configured to absorb fast spectrum neutrons. At least a portion of the neutron absorbing material 214 includes fertile nuclear fission fuel material 216. An actuator 217 is responsive to at least one reactivity parameter and is operationally coupled, as indicated generally at 219, to the reactivity control rod 212. Illustrative details will be set forth below by way of non-limiting examples.

The actuator 217 may be responsive to any one or more of various reactivity parameters as desired for a particular application. In some embodiments, the reactivity parameter may include any one or more reactivity parameter of the nuclear fission reactor. In some other embodiments the reactivity parameter may include any one or more reactivity parameter of the reactivity control rod 212. Given by way of non-limiting examples, the reactivity parameter may include any one or more of parameters such as neutron fluence, neutron flux, neutron fissions, fission products, radioactive decay events, temperature, pressure, power, isotopic concentration, burnup, and neutron spectrum.

As mentioned above, the nuclear fission reactor (not shown) has a fast neutron spectrum. In some embodiments the nuclear fission reactor may include a traveling wave reactor, in which case the fast spectrum neutrons may be part of a nuclear fission traveling wave. In some other embodiments the nuclear fission reactor may include a fast breeder reactor, like a liquid metal fast breeder reactor or a gas-cooled fast breeder reactor, or the like.

In some embodiments the neutron absorbing material 214 may be configured to reduce moderation of neutrons. For example, the neutron absorbing material 14 may have a suitably large atomic mass that can help reduce the amount of slowing down of fast spectrum neutrons. As such, a reduction may be made in softening of the neutron spectrum from the fast neutron spectrum toward neutron spectrums having neutron energy levels less than around 0.1 MeV, such as an epi-thermal neutron spectrum or a thermal neutron spectrum. It will be appreciated that, given by way of non-limiting examples, elements of the actinide series, such as without limitation uranium and thorium, present a sufficiently large atomic mass to help reduce moderation of neutrons.

The fertile nuclear fission fuel material 216, that is included in the neutron absorbing material 214, can include any type of fertile nuclear fission fuel material as desired for a particular application. For example, in some embodiments the fertile nuclear fission fuel material 216 may include uranium, such as $^{238}U$. In some other embodiments the fertile nuclear fission fuel material 16 may include thorium, such as $^{232}Th$. The fertile nuclear fission fuel material 16 may be provided in any suitable form as desired, such as without limitation powdered form, discrete particle form like beads or pellets, or any other form as desired.

In some applications it may be desirable to soften the neutron spectrum within the fast neutron spectrum toward a softer neutron spectrum that is still within the fast neutron spectrum—that is, at least around 0.1 MeV. For example, in some applications it may be desired to soften the neutron spectrum to reduce irradiation damage. To that end and referring now to FIGS. 2B-2G, in some embodiments the reactivity control rod 212 may also include neutron moderating material 220 in addition to the fertile nuclear fission fuel material 216. The neutron moderating material 220 may include any suitable neutron moderating material as desired for a particular application. Given by way of non-limiting example, the neutron moderating material 220 may include any one or more of hydrogen, deuterium, helium, lithium, boron, carbon, graphite, sodium, lead, and the like.

Figure 2B:
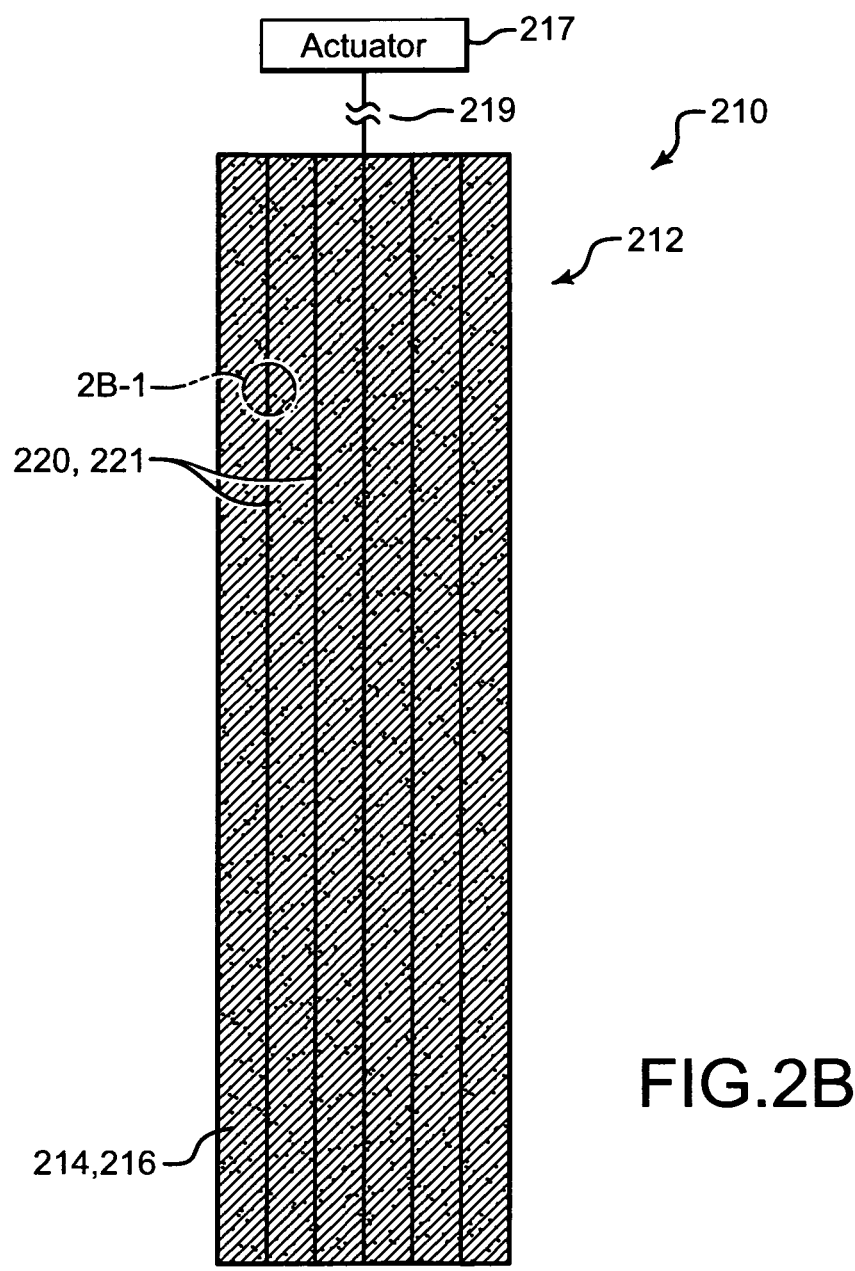
Figures 1, 2B:
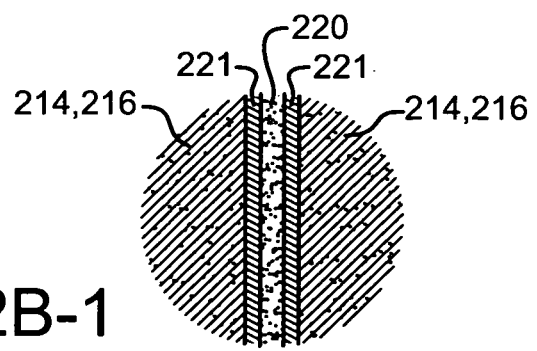
Figure 2D:
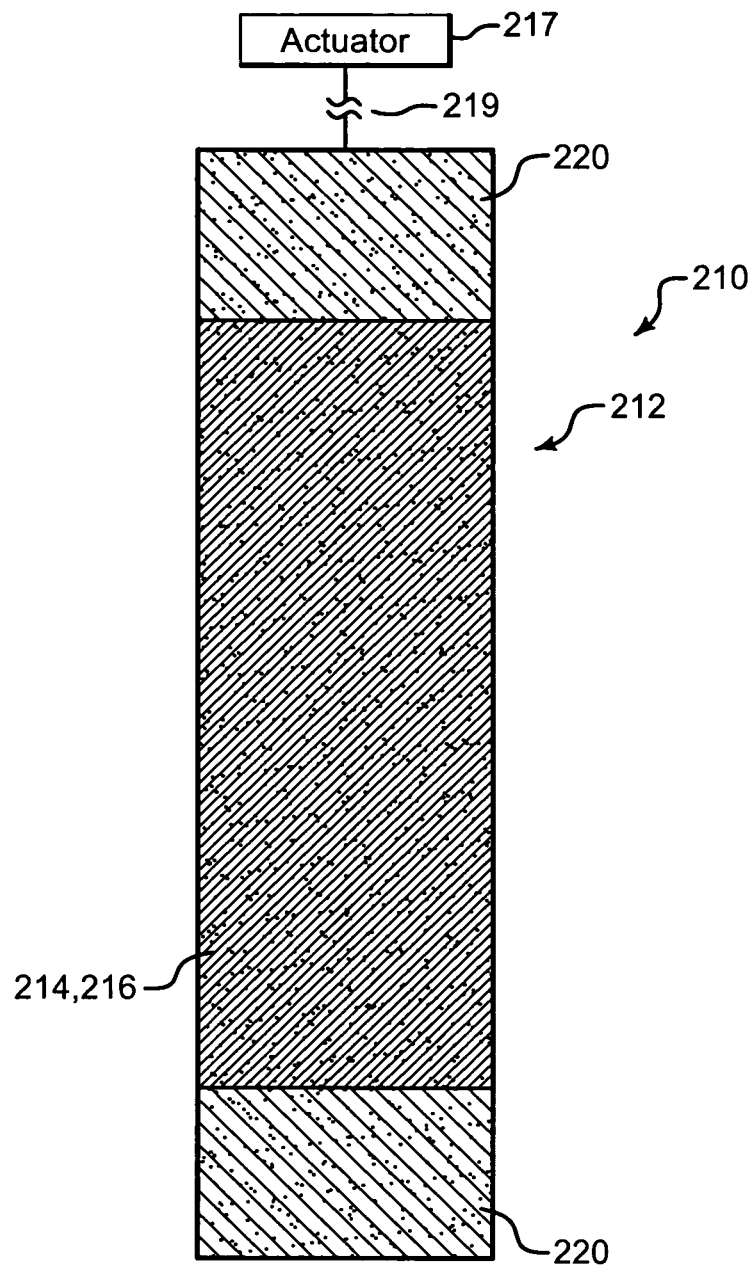
Figure 2E:
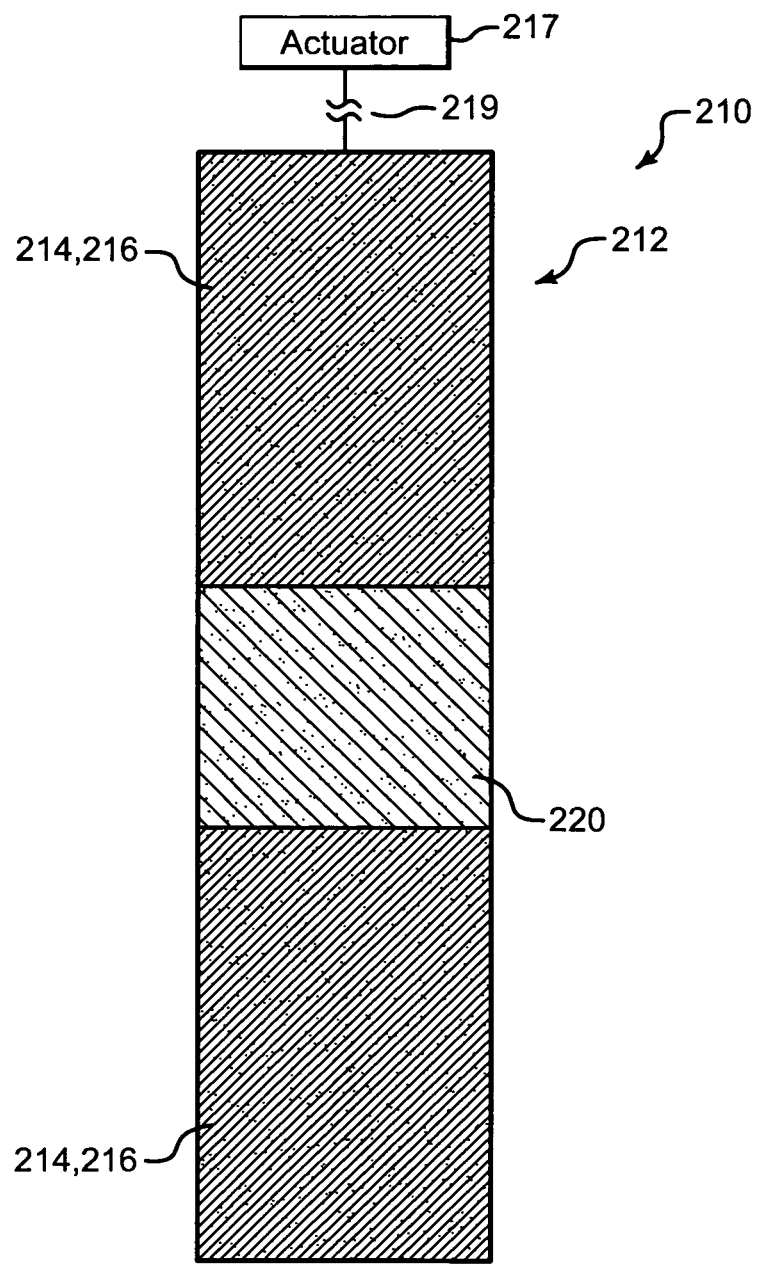
Figure 2F:
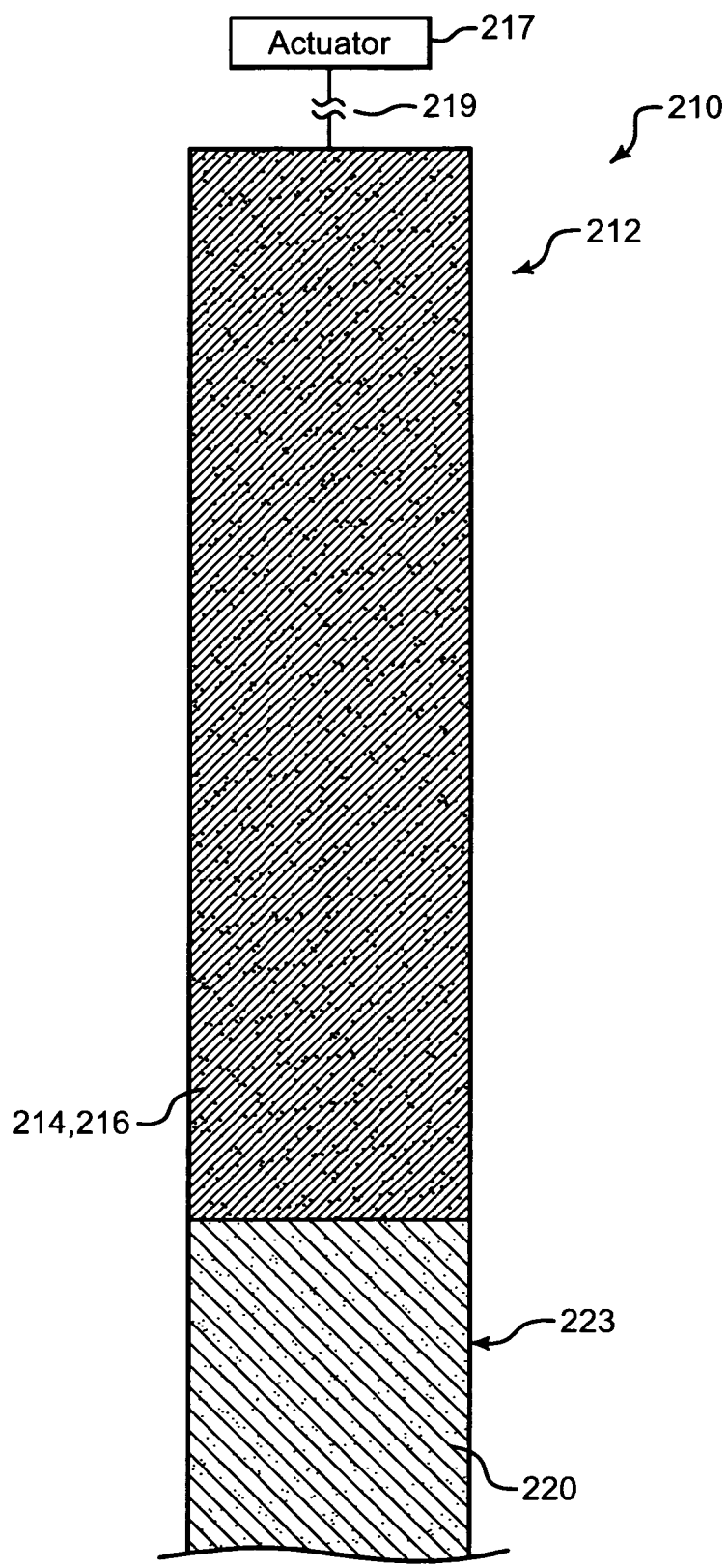
Figure 2G:
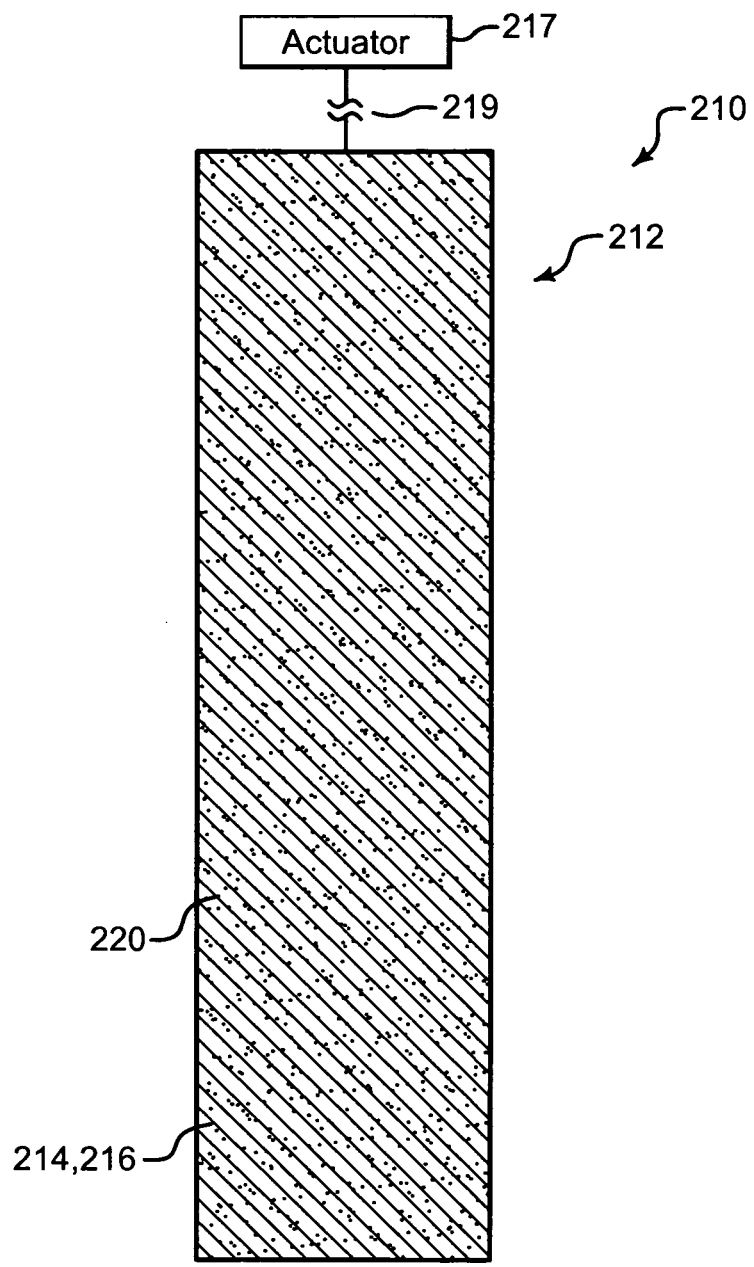

When the neutron moderating material 220 is provided, the neutron moderating material 220 may be distributed within the reactivity control rod 212 in any manner as desired for a particular application. For example and as shown in FIGS. 2B-2F by way of illustration and not of limitation, in some embodiments the neutron moderating material 220 may be substantially heterogeneously distributed within the reactivity control rod 212. Given by way of non-limiting examples, the neutron moderating material 220 may be heterogeneously distributed in disks 221 (FIGS. 2B and 2C). The disks 221 may be oriented substantially coaxially with an axial orientation of the reactivity control rod 212 (as shown in FIG. 2B) or substantially transverse to the axial orientation of the reactivity control rod 212 (as shown in FIG. 2C). Given by way of further non-limiting examples, the neutron moderating material 220 may be heterogeneously distributed toward ends of the reactivity control rod 212 (as shown in FIG. 2D) or toward a middle of the reactivity control rod 212 (as shown in FIG. 2E). Given by way of a further non-limiting example, the neutron moderating material 220 may be provided as a rod follower 223 (as shown in FIG. 2F). It will be appreciated that any heterogeneous distribution may be used as desired. No particular heterogeneous distribution is intended to be implied by way of illustration and none should be inferred. In some other embodiments and as shown in FIG. 2G, the neutron moderating material 220 may be substantially homogeneously distributed within the reactivity control rod 212.

Referring now to FIGS. 2H-2M, in some embodiments the neutron absorbing material 214 may also include neutron absorbing poison 222 in addition to the fertile nuclear fission fuel material 216. The neutron absorbing poison 222 may include any suitable neutron absorbing poison as desired. For example and given by way of non-limiting examples, the neutron absorbing poison 222 may include any one or more of silver, indium, cadmium, gadolinium, hafnium, lithium, $^3$He, fission products, protactinium, neptunium, boron, and the like. The neutron absorbing poison 222 may be provided in any suitable form as desired, such as without limitation powdered form, discrete particle form like beads or pellets, or any other form as desired.

Figure 2I:
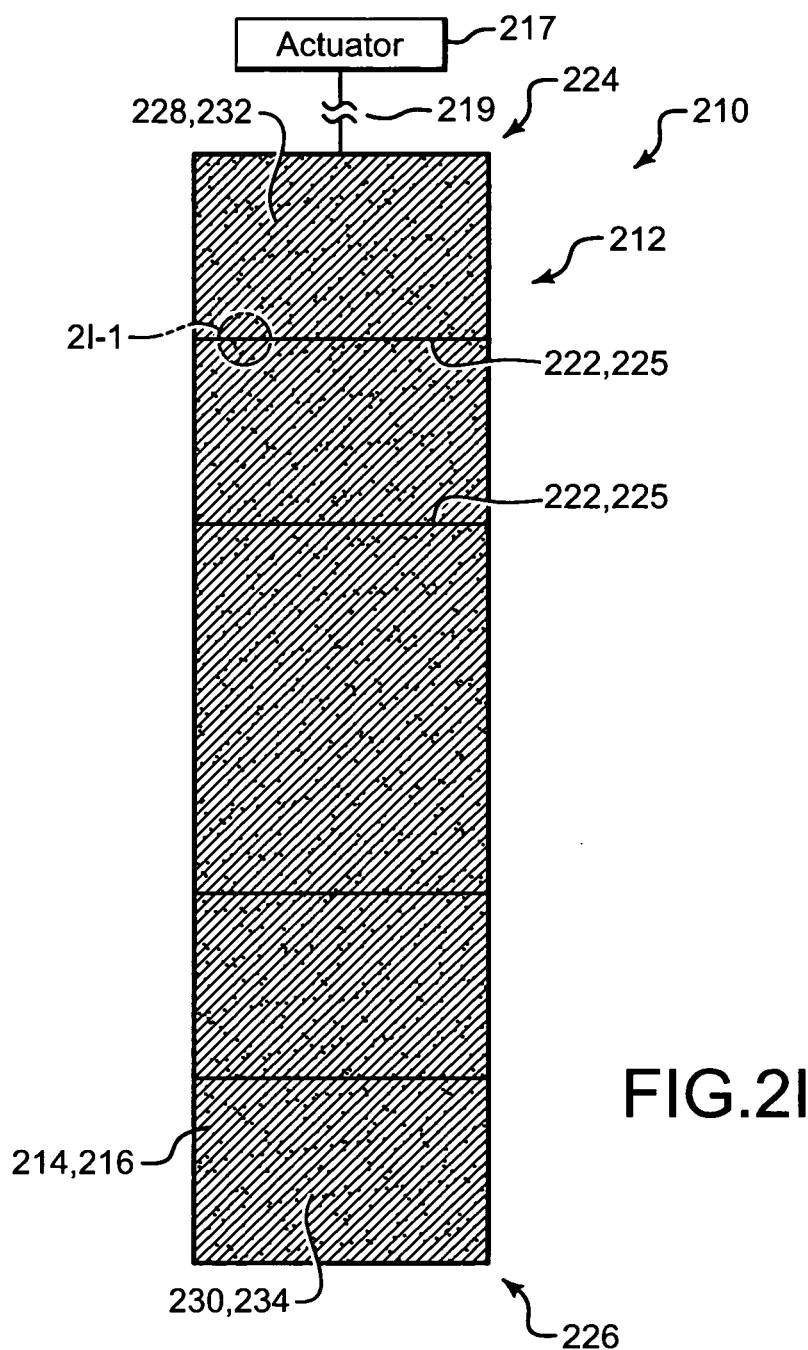
Figures 1, 2I:
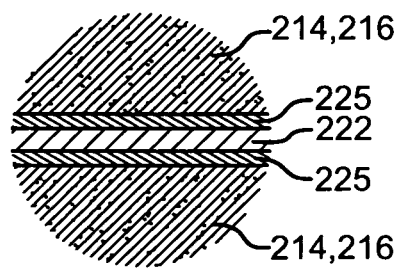
Figure 2J:
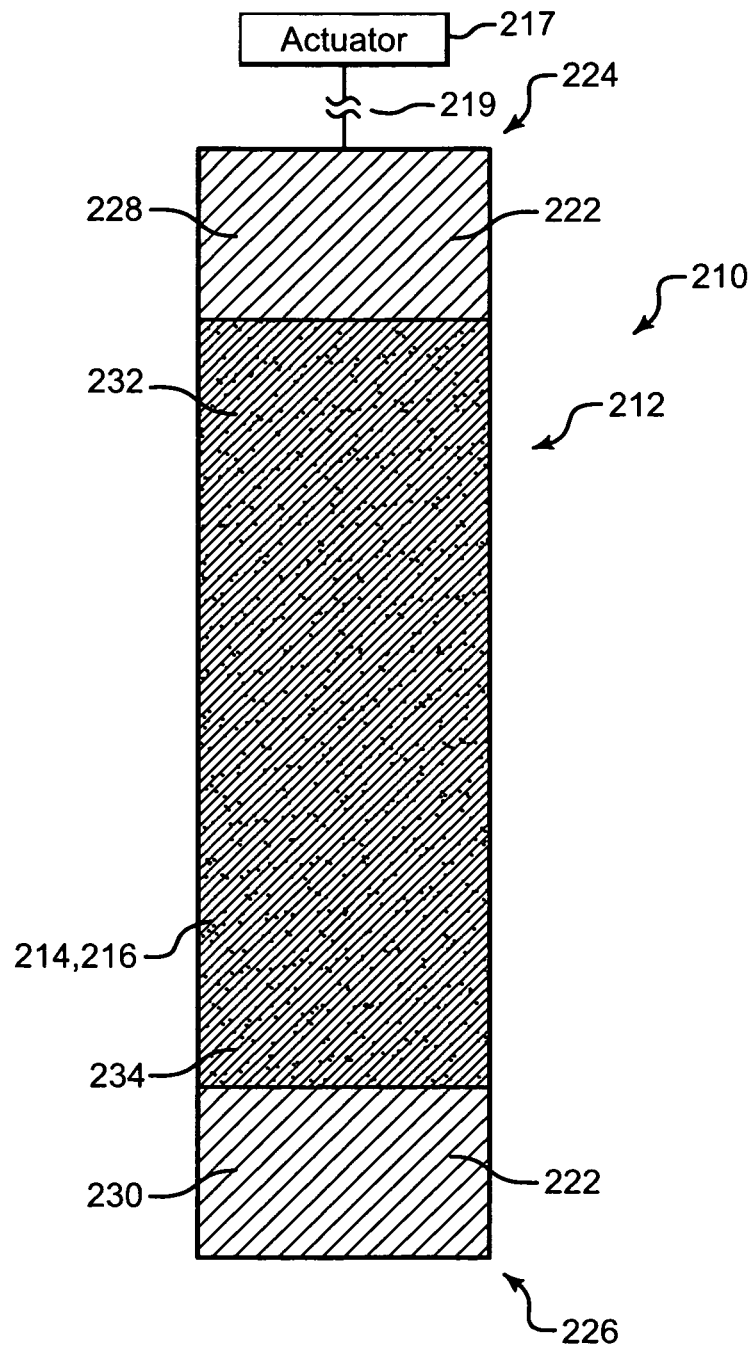
Figure 2K:
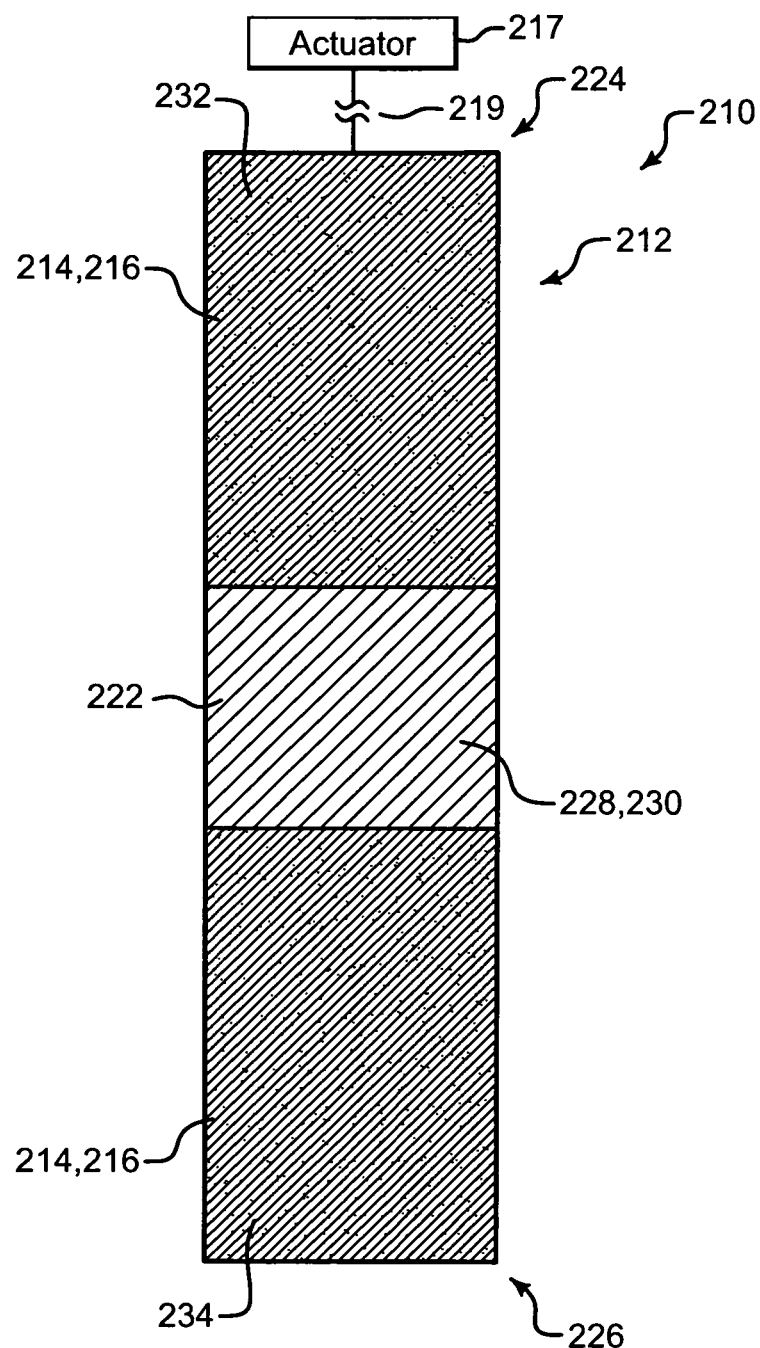
Figure 2L:
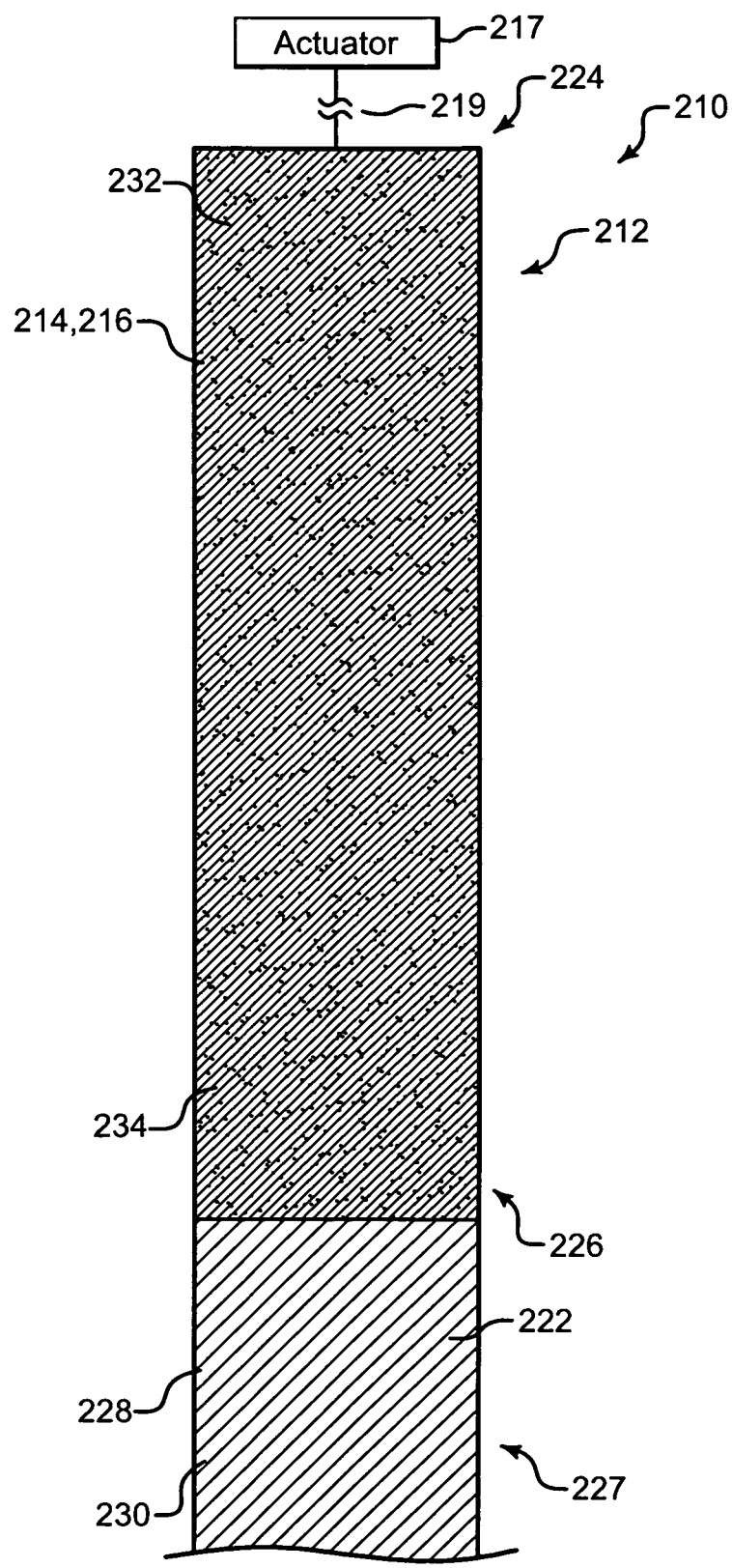

When the neutron absorbing poison 222 is provided, the neutron absorbing poison 222 may be distributed within the reactivity control rod 212 in any manner as desired for a particular application. For example and as shown in FIGS. 2H-2L by way of illustration and not of limitation, in some embodiments the neutron absorbing poison 222 may be substantially heterogeneously distributed within the reactivity control rod 212. Given by way of non-limiting examples, the neutron absorbing poison 222 may be heterogeneously distributed in disks 225 (FIGS. 2H and 2I). The disks 225 may be oriented substantially coaxially with an axial orientation of the reactivity control rod 212 (as shown in FIG. 2H) or substantially transverse to the axial orientation of the reactivity control rod 212 (as shown in FIG. 2I). Given by way of further non-limiting examples, the neutron absorbing poison 222 may be heterogeneously distributed toward ends of the reactivity control rod 212 (as shown in FIG. 2J) or toward a middle of the reactivity control rod 212 (as shown in FIG. 2K). Given by way of a further non-limiting example, the neutron absorbing poison 222 may be provided as a rod follower 227 (as shown in FIG. 2L). It will be appreciated that any heterogeneous distribution may be used as desired. No particular heterogeneous distribution is intended to be implied by way of illustration and none should be inferred. In some other embodiments and as shown in FIG. 2M, the neutron absorbing poison 222 may be substantially homogeneously distributed within the reactivity control rod 212.

Figure 2M:
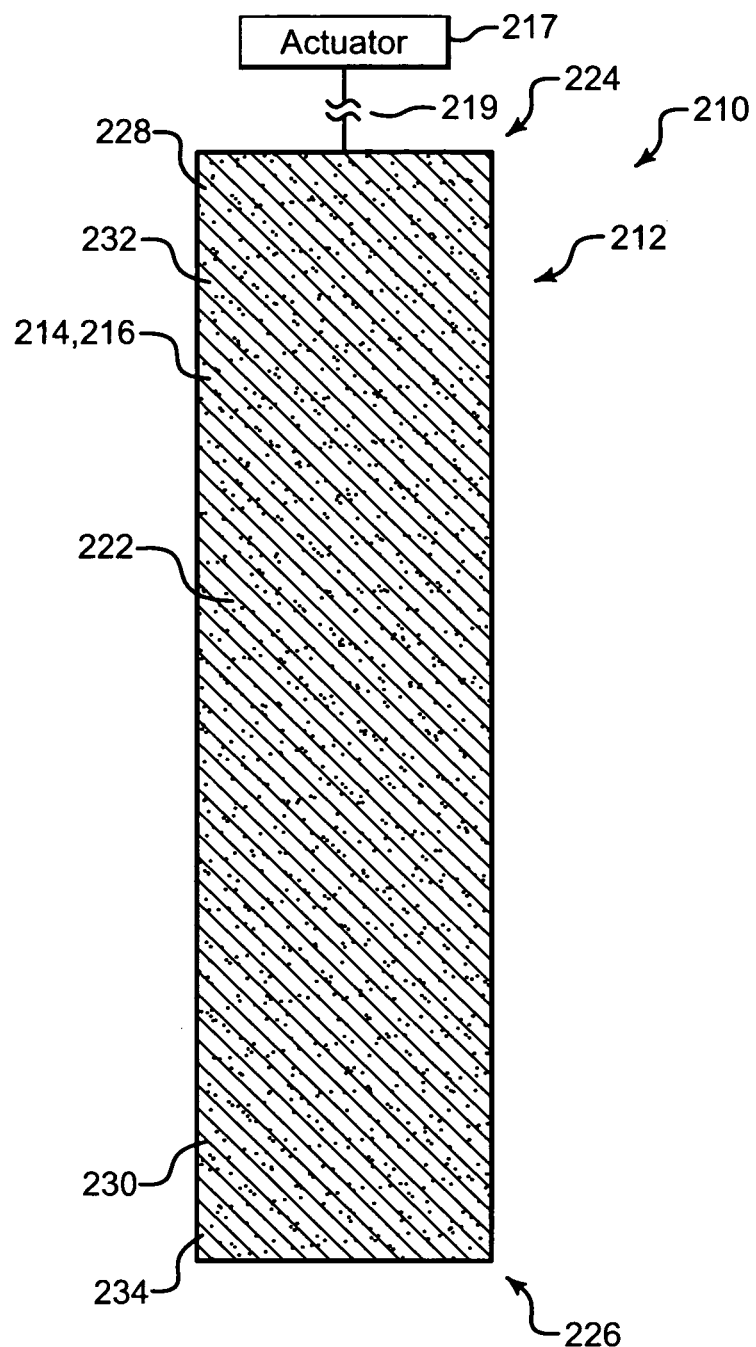
Figure 2N:
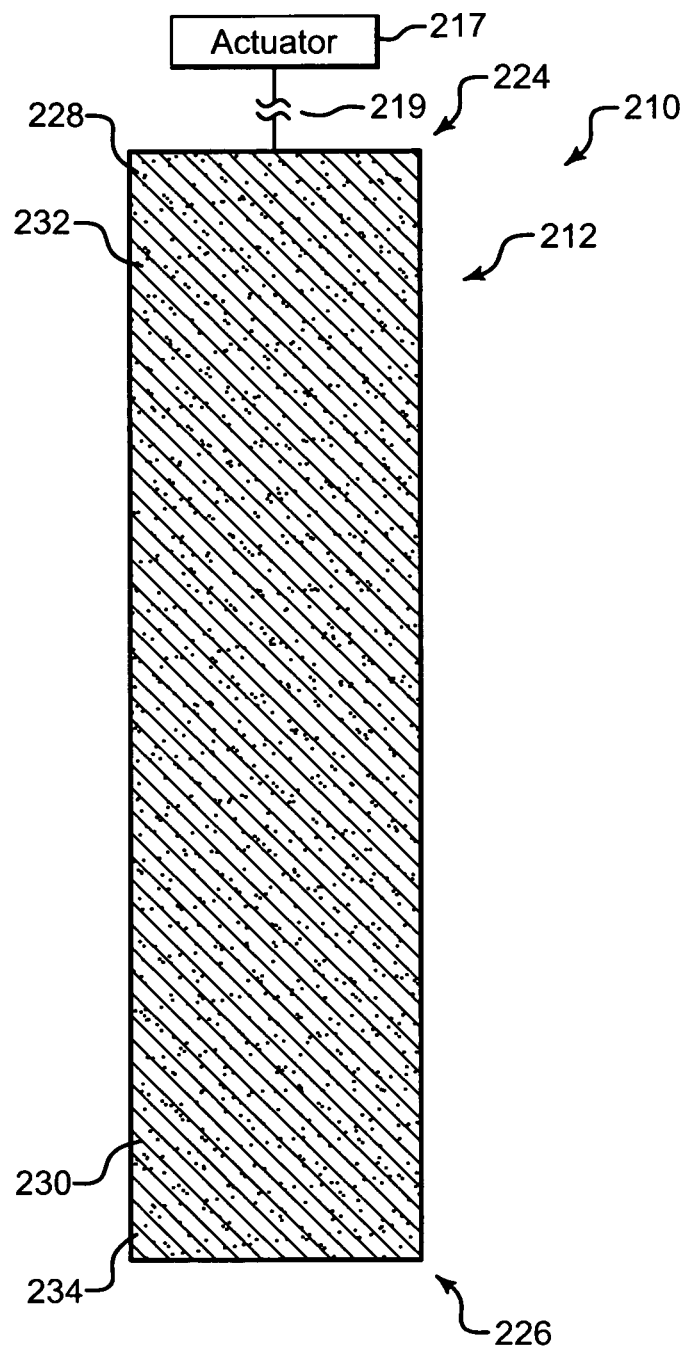

In some embodiments and referring now to FIGS. 2H-2P, an effect on reactivity achievable by the fertile nuclear fission fuel material 216 may equalized toward an effect on reactivity achievable by portions of the neutron absorbing poison 222. For example, such equalization may be desirable to mitigate localized flux peaking. It will be appreciated that such equalization may be effected regardless of whether the fertile nuclear fission fuel material 216 is distributed heterogeneously or homogeneously and regardless of whether the neutron absorbing poison 222 is distributed heterogeneously (FIGS. 2H-2L and FIGS. 2O-2P) or homogeneously (FIG. 2M).

In some other embodiments and still referring to FIGS. 2H-2P, reactivity effect of the fertile nuclear fission fuel material 216 and reactivity effect of the neutron absorbing poison 222 may be locally tailored as desired for a particular application. For example, in some embodiments and as shown generally in FIG. 2N the reactivity control rod 212 has a region 224 and a region 226. It will be appreciated that the regions 224 and 226 may be located anywhere within the reactivity control rod 212 as desired. No limitation is implied, and is not to be inferred, by virtue of appearance in the drawings which are provided for illustration purposes only. A concentration 228 of the neutron absorbing poison 222 is disposed in the region 224 and a concentration 230 of the neutron absorbing poison 222 is disposed in the region 226. A concentration 232 of the fertile nuclear fission fuel material 216 is disposed in the region 224 and a concentration 234 of the fertile nuclear fission fuel material 216 is disposed in the region 226. It will be appreciated that concentration may be determined per volume basis, per area basis, or per length basis, as desired.

It will be appreciated that reactivity effects of the concentrations 228 and 230 of the neutron absorbing poison 222 and reactivity effects of the concentrations 232 and 234 of the fertile nuclear fission fuel material 216 may be tailored as desired for a particular application. For example, in some embodiments and as shown in FIGS. 2H-2P a reactivity effect of the concentration 230 of the neutron absorbing poison 222 may be substantially equalized with a reactivity effect of the concentration 232 of the fertile nuclear fission fuel material 216. In some other embodiments and as also shown in FIGS. 2H-2P a reactivity effect of the concentration 228 of the neutron absorbing poison 222 may be substantially equalized with a reactivity effect of the concentration 234 of the fertile nuclear fission fuel material 216.

In some other embodiments and as shown in FIGS. 2H-2P a reactivity effect of the concentration 230 of the neutron absorbing poison 222 may be different from a reactivity effect of the concentration 232 of the fertile nuclear fission fuel material 216. In other embodiments a reactivity effect of the concentration 228 of the neutron absorbing poison 222 may be different from a reactivity effect of the concentration 234 of the fertile nuclear fission fuel material 216.

Other reactivity effects may be affected as desired. For example and as shown in FIGS. 2H-2P, in some embodiments a sum of reactivity effects of the concentration 228 of the neutron absorbing poison 222 and the concentration 232 of the fertile nuclear fission fuel material 216 may be substantially equalized toward a sum of reactivity effects of the concentration 230 of the neutron absorbing poison 222 and the concentration 234 of the fertile nuclear fission fuel material 216. In some other embodiments, reactivity effect is substantially constant between the region 224 and the region 226.

Figure 2O:
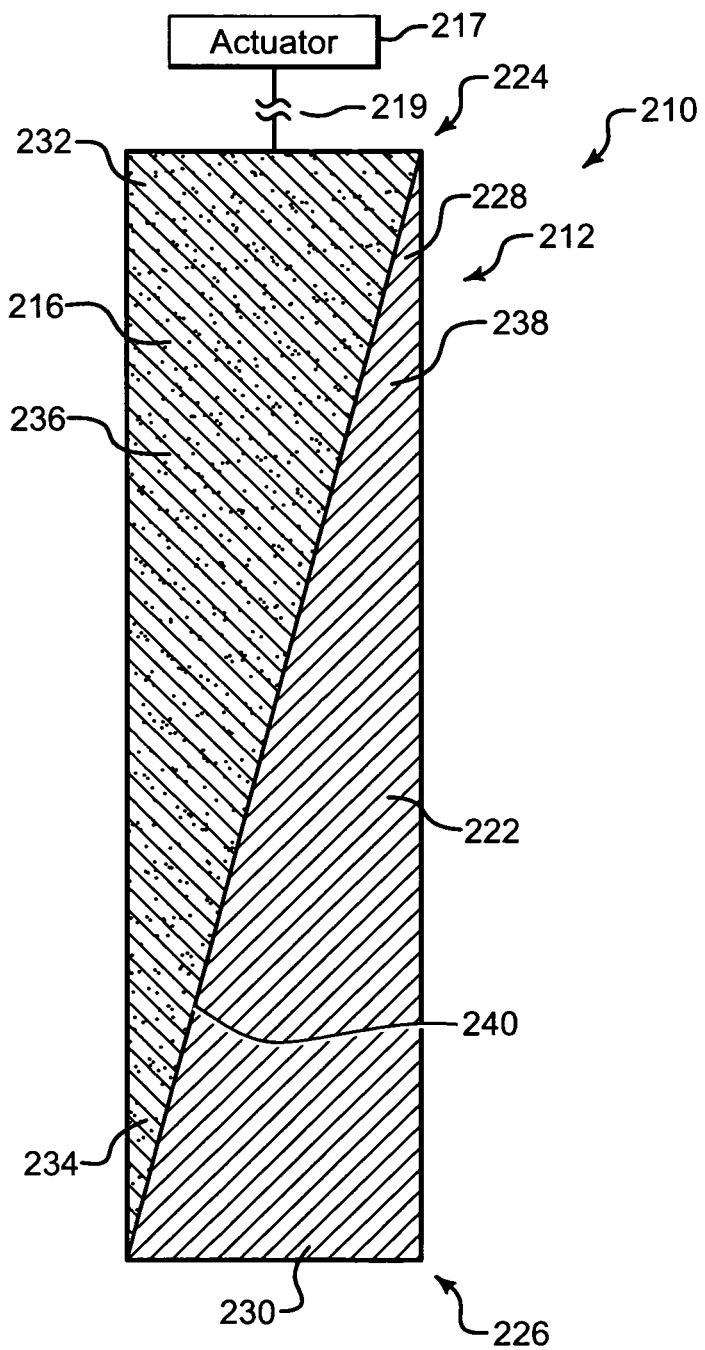
Figure 2P:
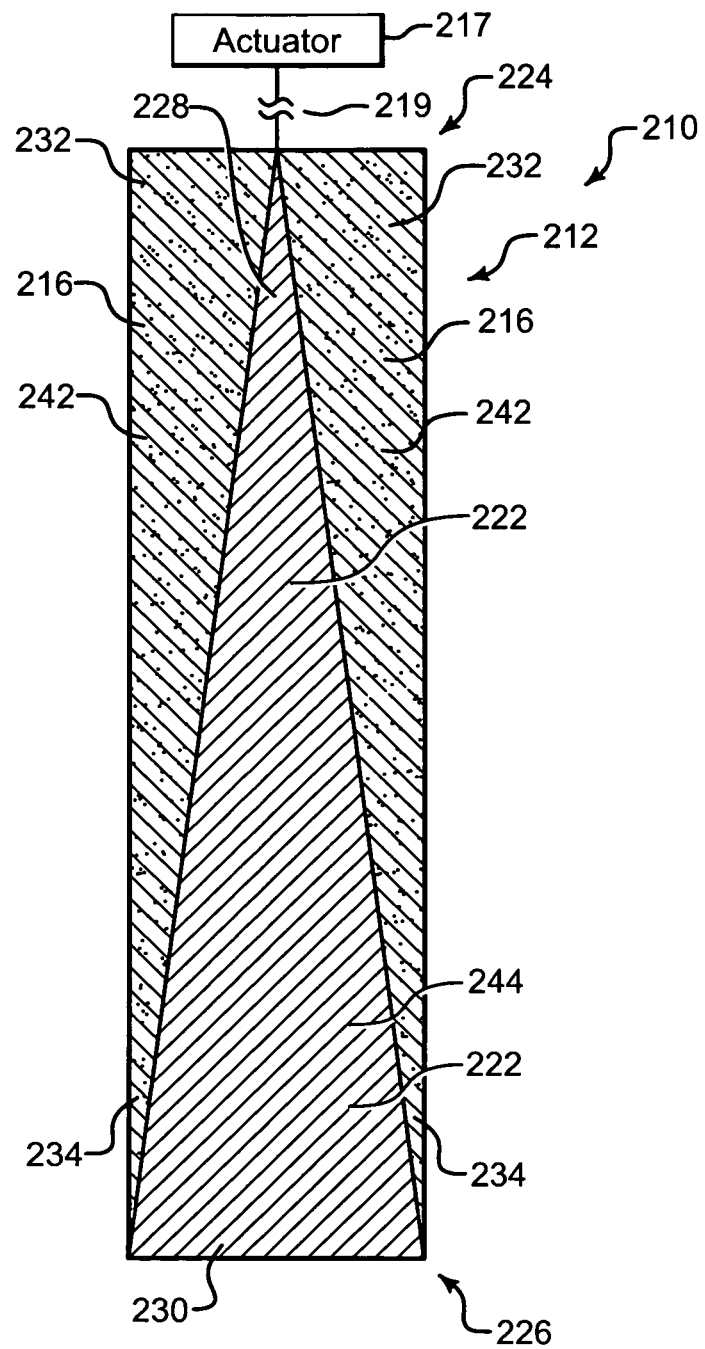

If desired, concentration of the fertile nuclear fission fuel material 216 and/or the neutron absorbing poison 222 may vary. For example and as shown in FIGS. 2O and 2P, in some embodiments concentration the fertile nuclear fission fuel material 216 and/or the neutron absorbing poison 222 may change along a continuous gradient. Given by way of non-limiting example, as shown in FIG. 2O the fertile nuclear fission fuel material 216 and the neutron absorbing poison 222 may be provided in wedges 236 and 238, respectively, that abut each other along their hypotenuse 240. Given by way of another non-limiting example, as shown in FIG. 2P the fertile nuclear fission fuel material 216 and the neutron absorbing poison 222 may be provided in mated frustoconical sections 242 and 244, respectively. It will be appreciated that the fertile nuclear fission fuel material 216 and the neutron absorbing poison 222 may be provided in other suitable arrangements in which their concentrations change along a continuous gradient, and arrangements are not to be limited to those shown in FIGS. 2G and 2H by way of illustration and not of limitation.

In some other embodiments, concentration of the fertile nuclear fission fuel material 216 and/or the neutron absorbing poison 222 may change along a non-continuous gradient. For example, concentration of the fertile nuclear fission fuel material 216 and/or the neutron absorbing poison 222 may change along a non-continuous gradient as a result of heterogeneous distribution as shown in FIGS. 2H-2L. In such cases, concentration of the neutron absorbing poison 222 can vary along a non-contiguous gradient because the neutron absorbing poison 222 is provided in discrete locations (as opposed to homogeneous distribution). Also in such cases, concentration of the fertile nuclear fission fuel material 216 can vary along a non-contiguous gradient because the fertile nuclear fission fuel material 216 is provided in discrete locations that are separated from each other by the discrete locations of the neutron absorbing poison 222.

In some embodiments the fertile nuclear fission fuel material 216 and the neutron absorbing poison 222 may be spatially fixed relative to each other. That is, in such arrangements the fertile nuclear fission fuel material 216 and the neutron absorbing poison 222 do not physically move in relation to each other. However, in some other embodiments the fertile nuclear fission fuel material 216 and the neutron absorbing poison 222 may be spatially movable relative to each other. Given by way of non-limiting example and referring briefly to FIGS. 2H-2L and 2O-2P, any one or more of the discrete locations of the neutron absorbing poison 222, such as without limitation the disks 225, may be slidably received in the reactivity control rod 212 and may be moved in and out of the reactivity control rod 212 as desired by a suitable mechanism, such as a control rod drive mechanism or the like.

Figure 2Q:
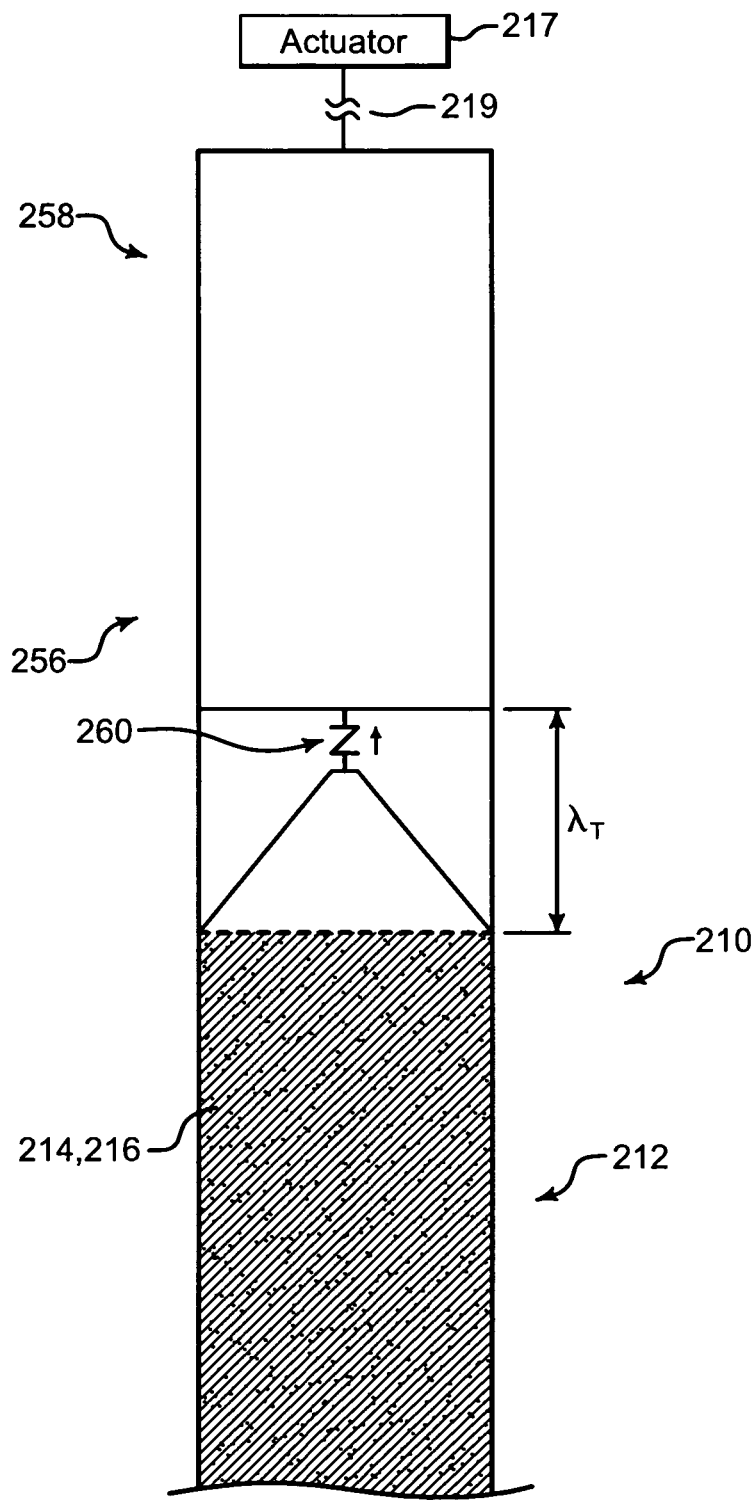

Referring now to FIG. 2Q, in some embodiments the reactivity control rod 212 may define at least one chamber 256 configured to accumulate fission products. For example, when provided the chamber 256 may include a plenum 258. In some embodiments the plenum 258 may be located at least one mean free path $\lambda_T$ for fission-inducing neutrons from the fertile nuclear fission fuel material 216. In some embodiments a backflow prevention device 260, such as a check valve like a ball check vale or the like, may be provided to help prevent re-entry into the reactivity control rod 212 of fission product gases that have outgassed from the reactivity control rod 212.

As mentioned above, the actuator 217 is responsive to at least one reactivity parameter. In some embodiments, the reactivity control system 210 may include an apparatus configured to determine the reactivity parameter. Given by way of non-limiting examples and referring now to FIGS. 2R-2AL, the apparatus may include at least one sensor 218.

Figure 2R:
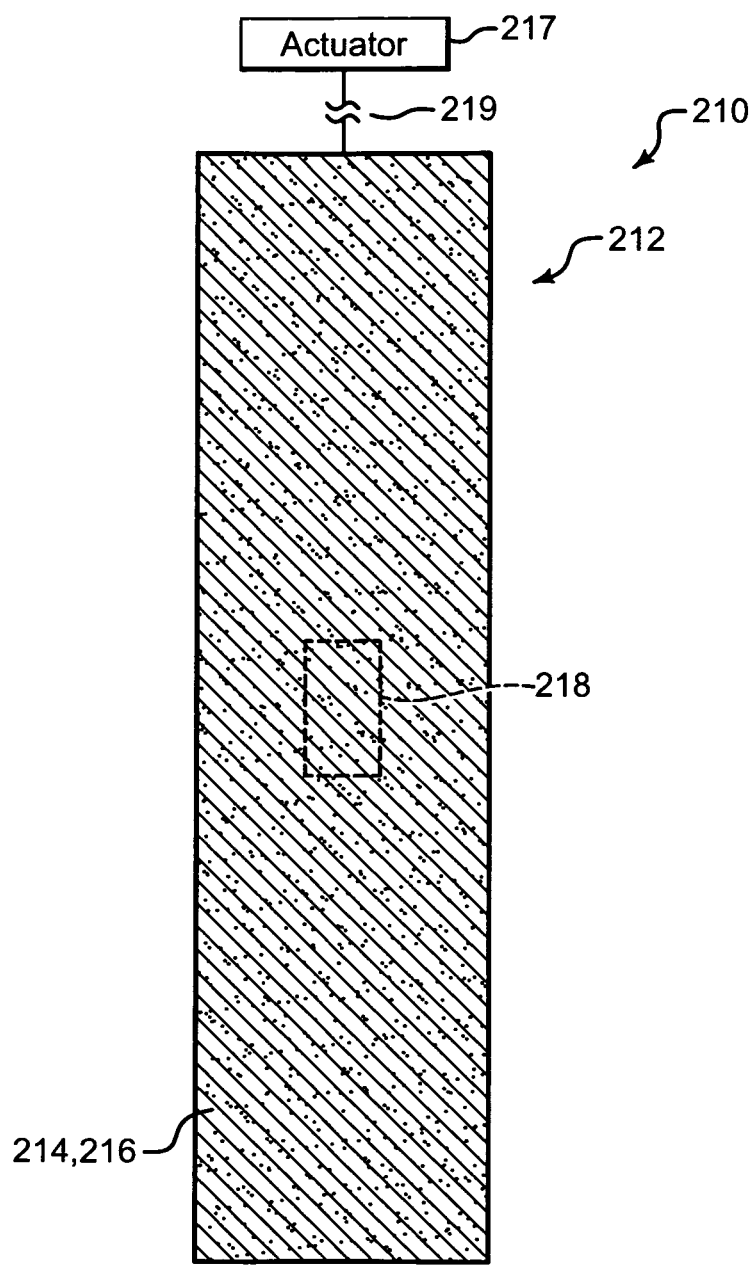
Figure 2T:
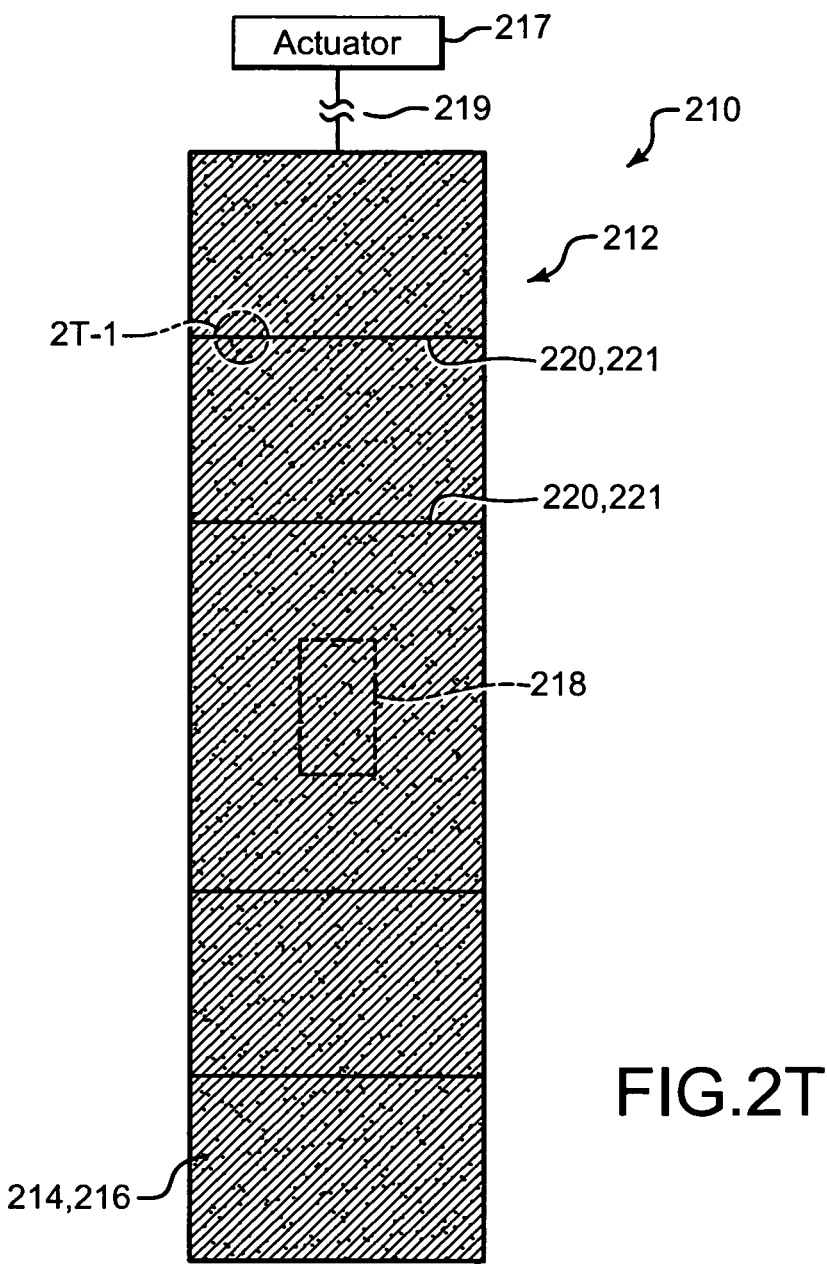
Figures 1, 2T:
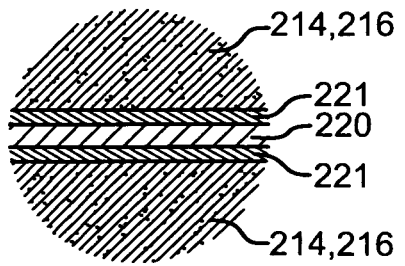
Figure 2U:
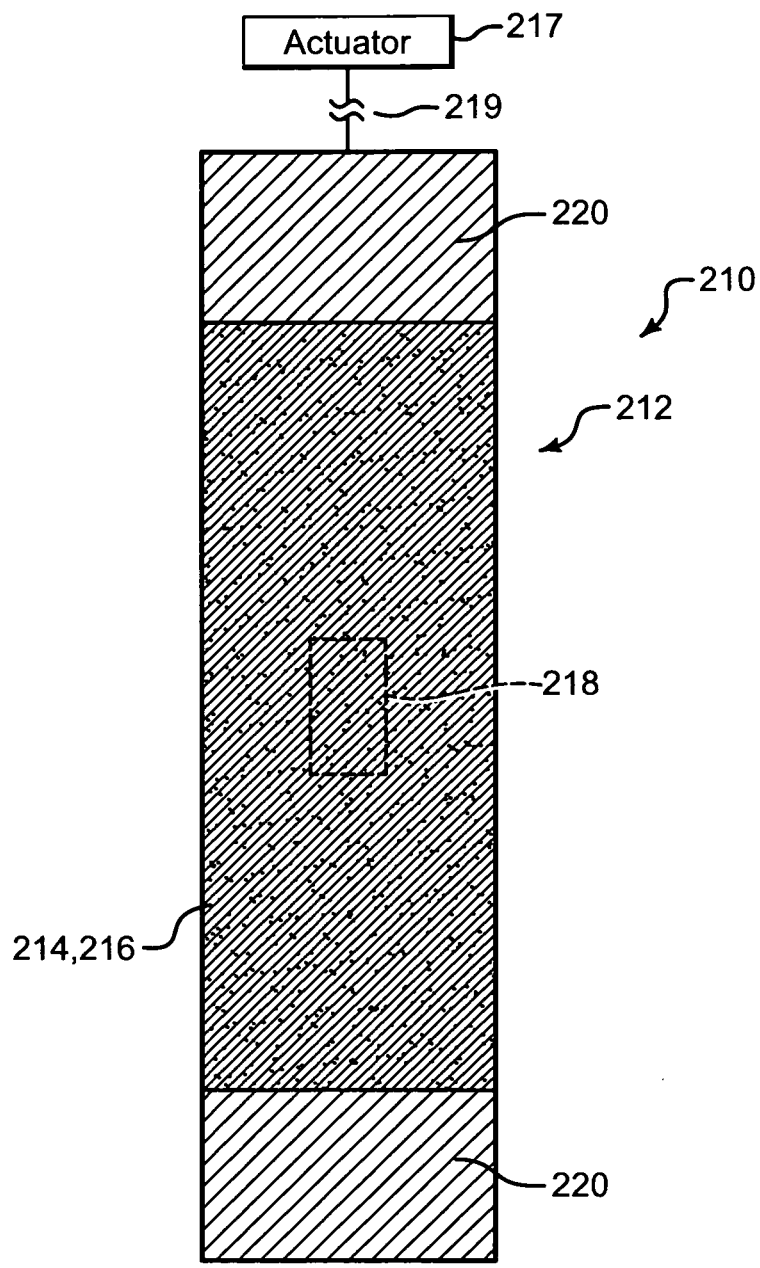
Figure 2V:
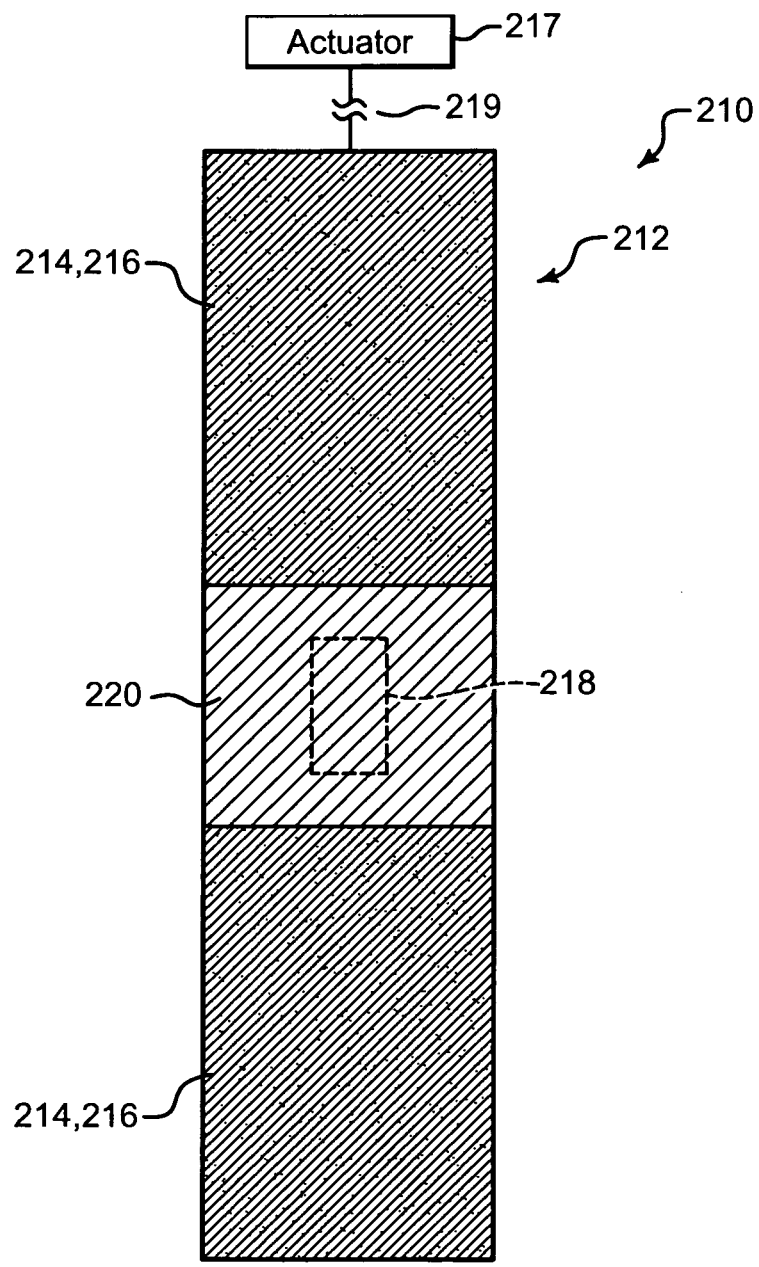
Figure 2W:
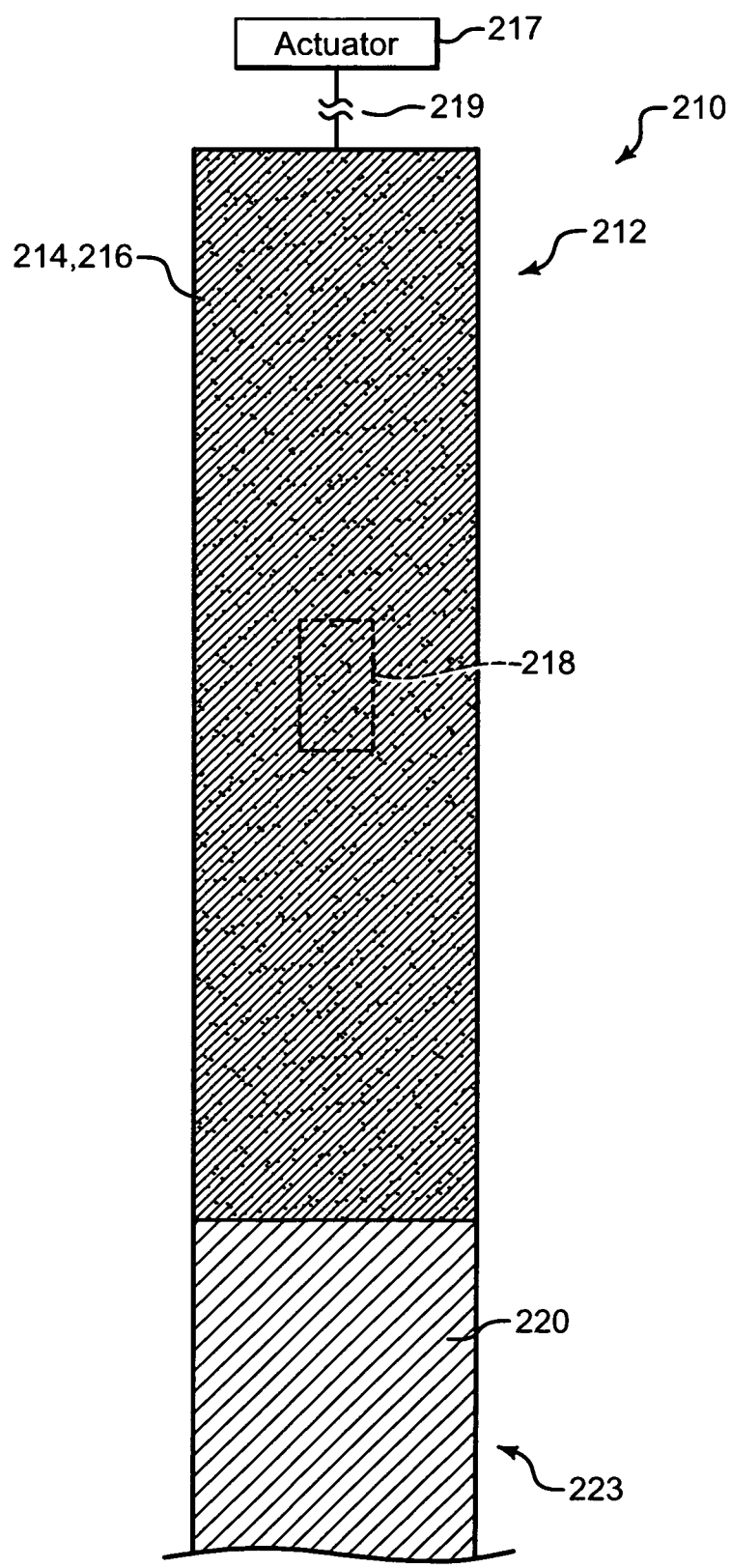
Figure 2X:
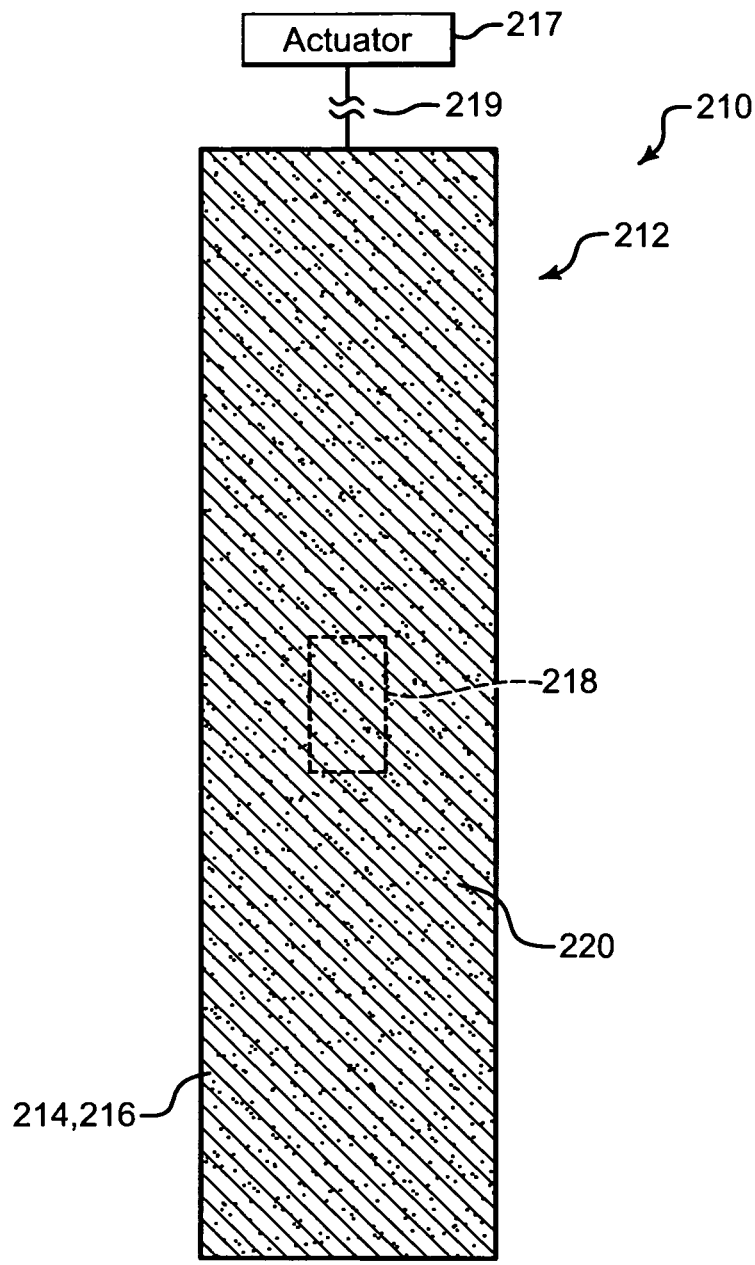
Figure 2A:
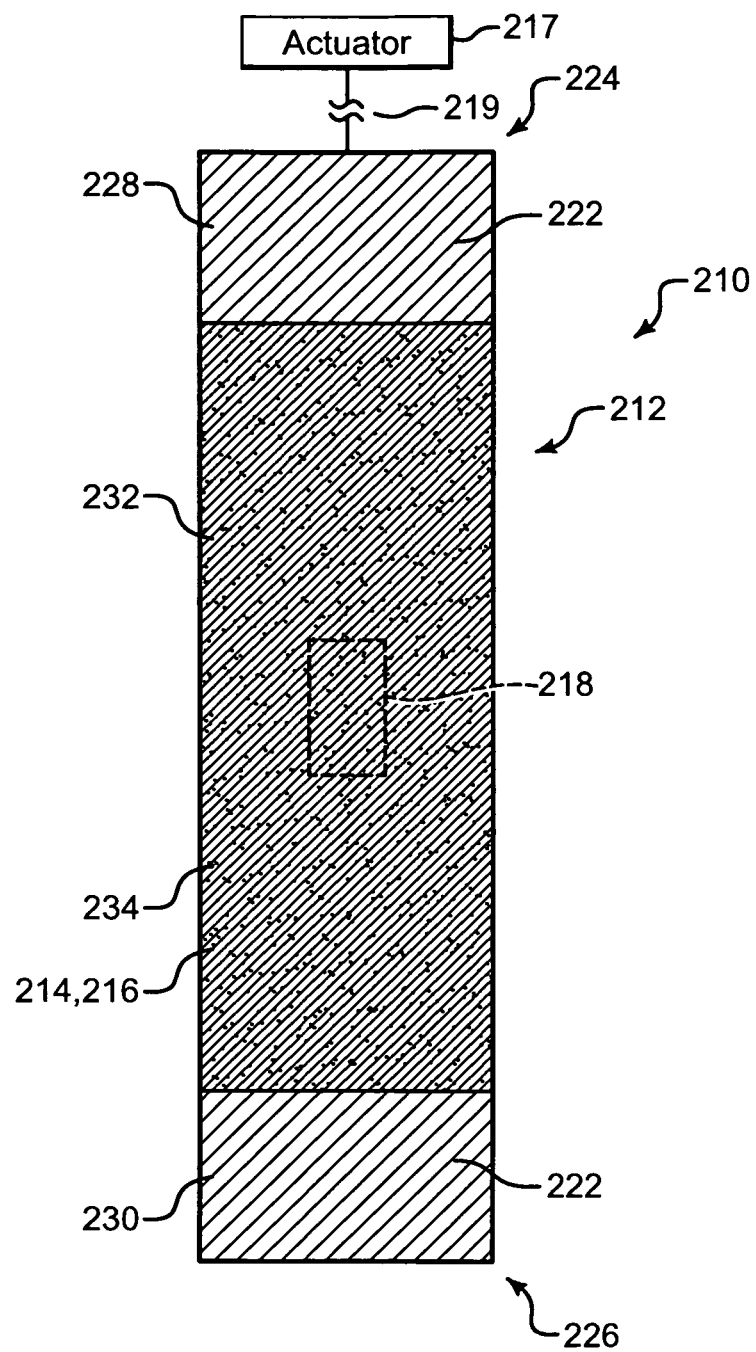
Figure 2A:
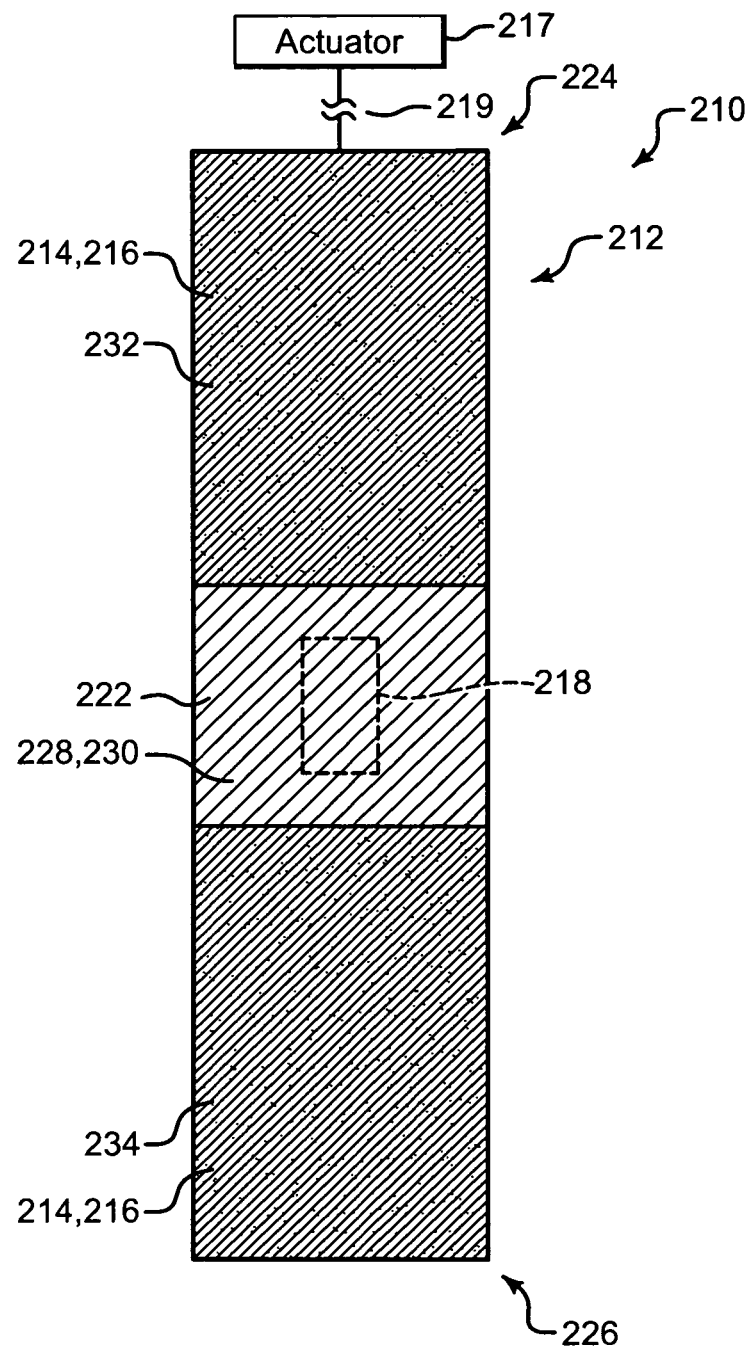
Figure 2A:
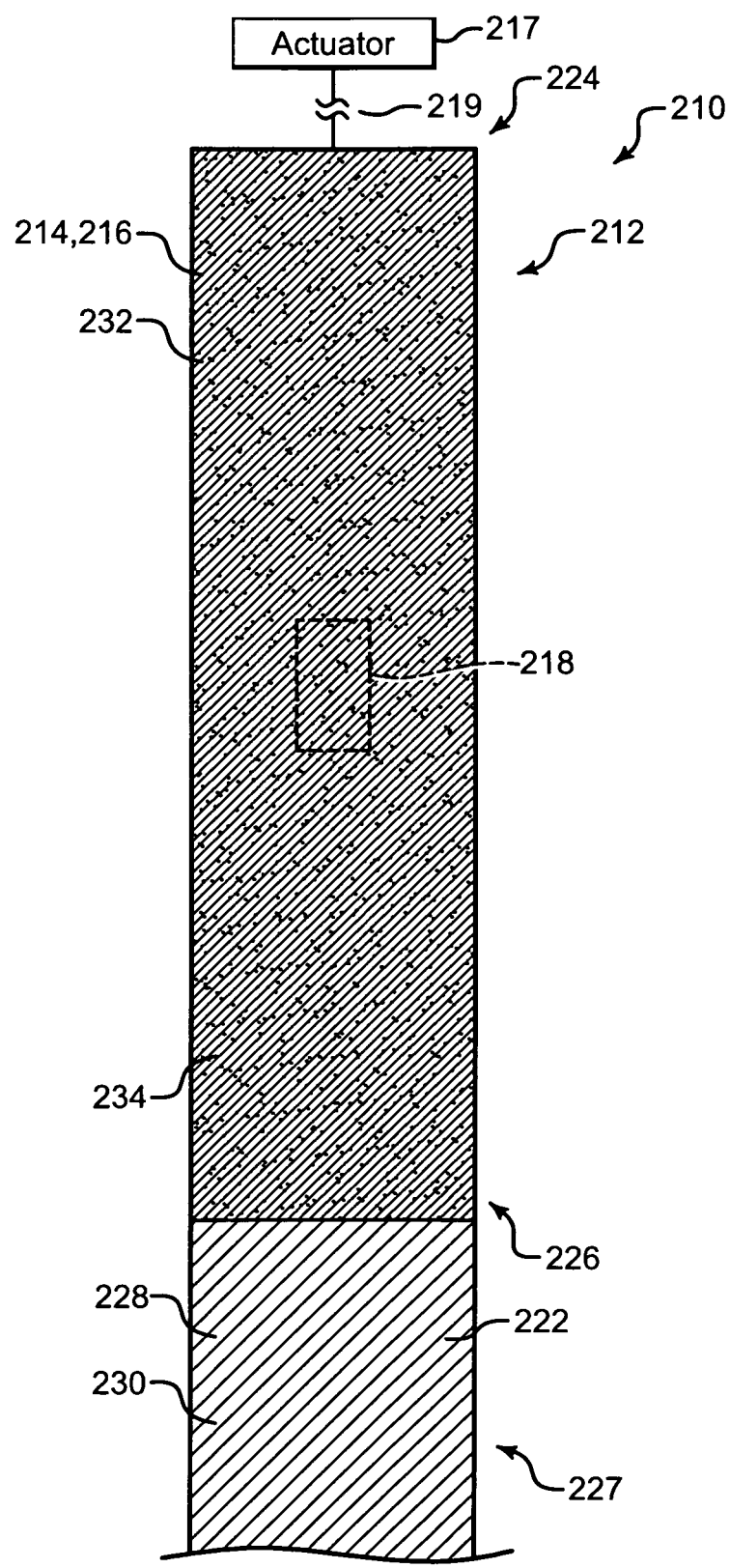
Figure 2A:
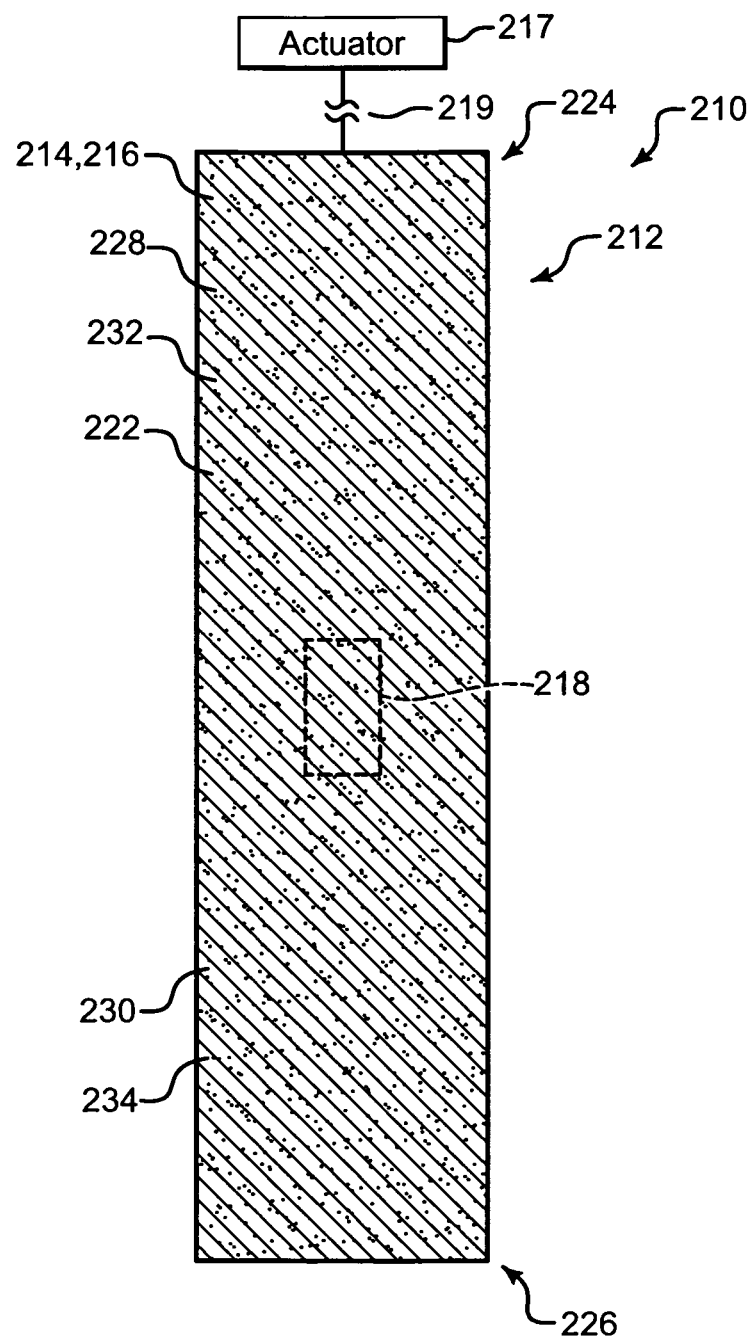
Figure 2A:
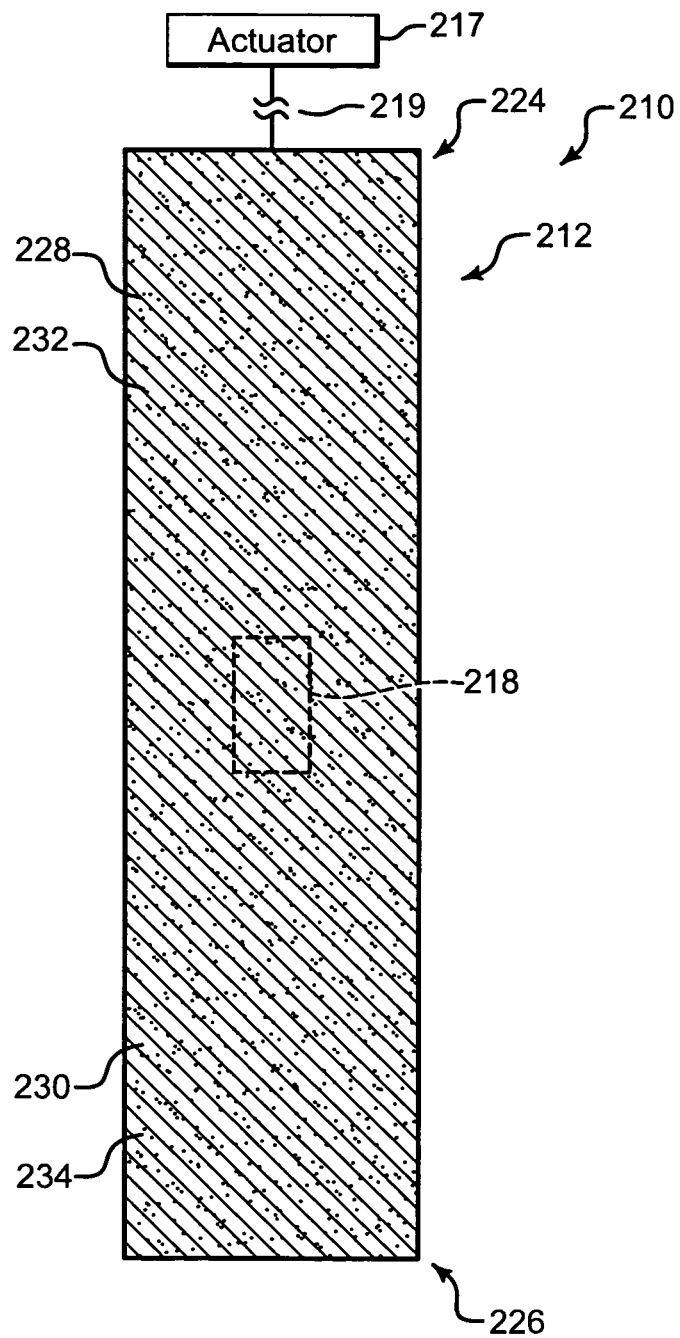
Figure 2A:
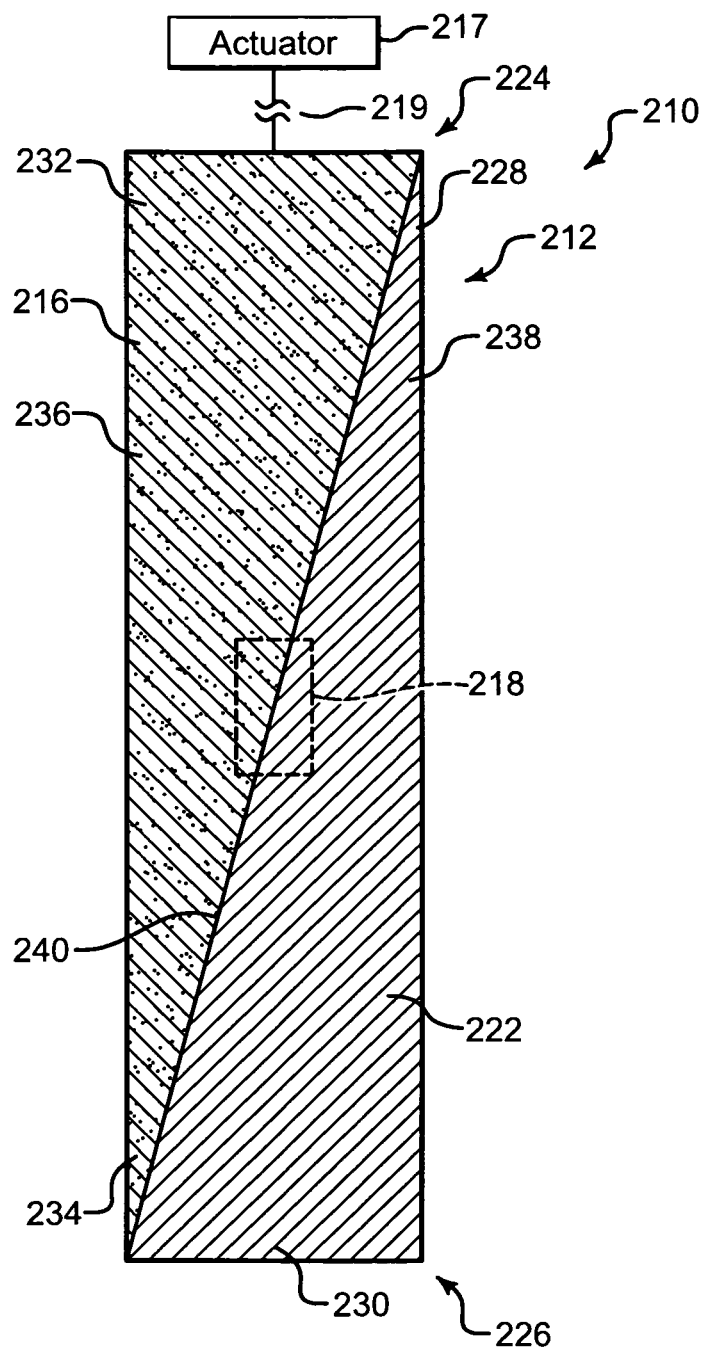
Figure 2A:
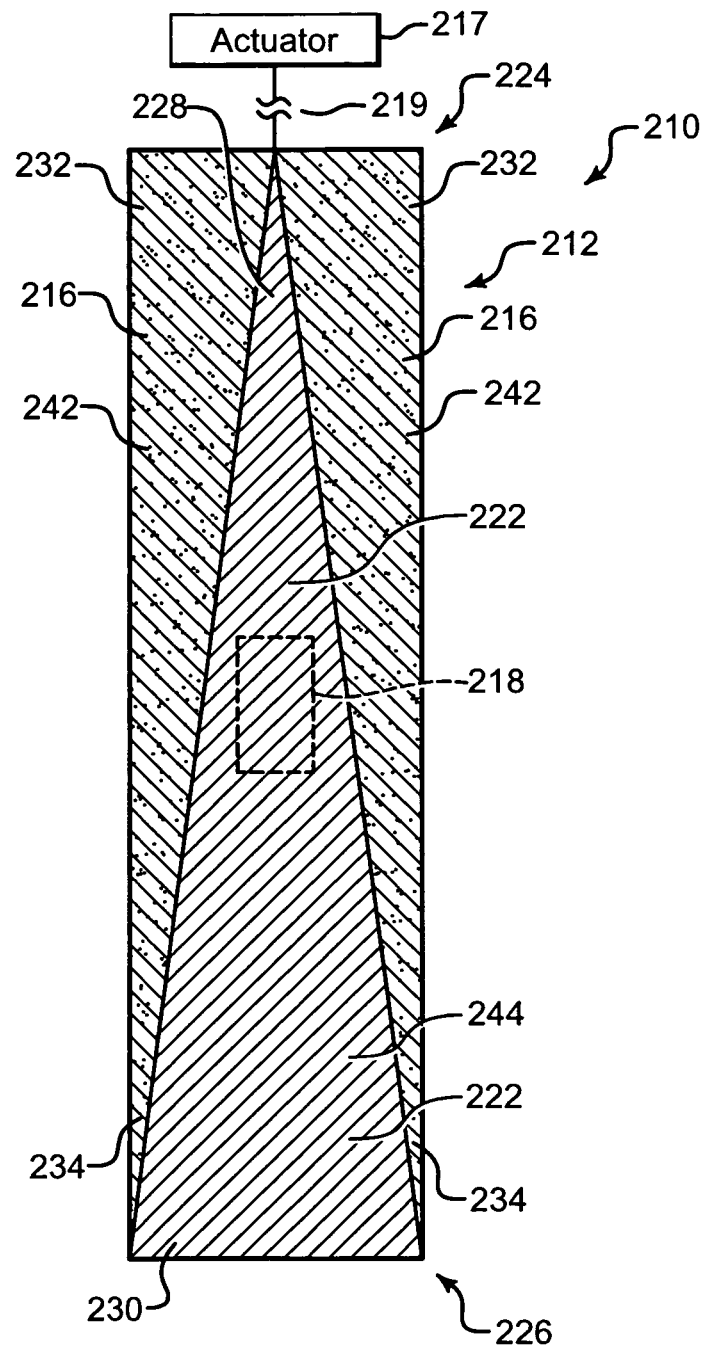
Figure 2A:
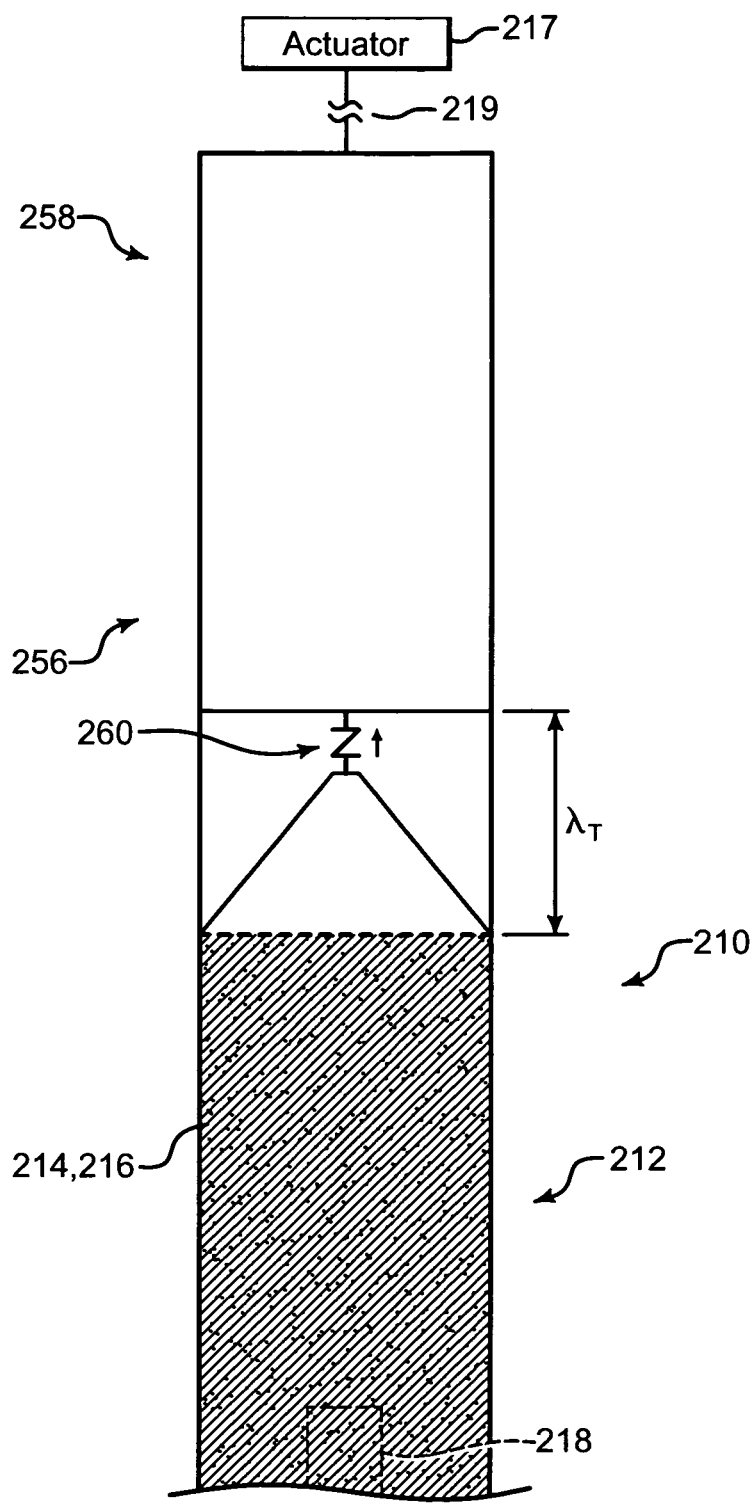
Figure 2A:
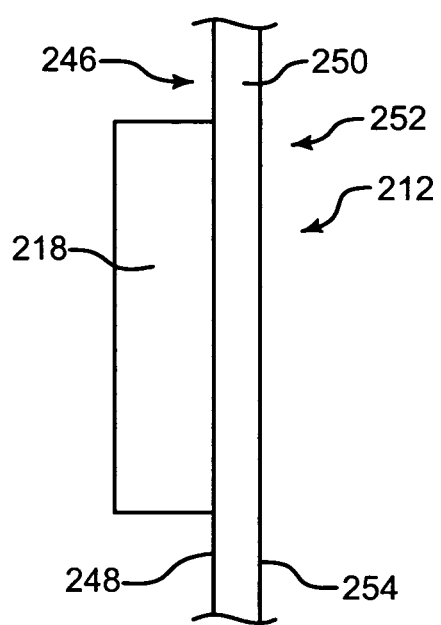
Figure 2A:
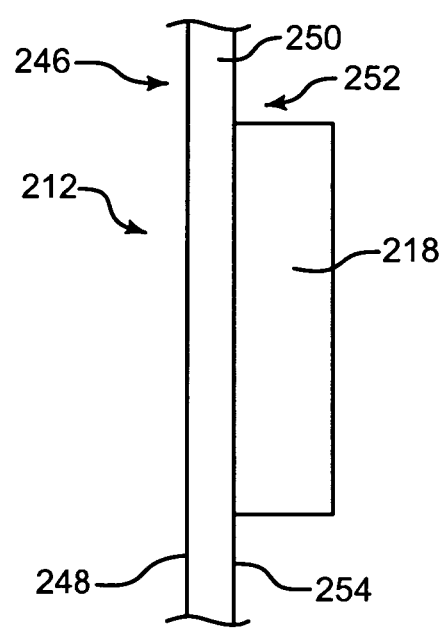
Figure 2A:
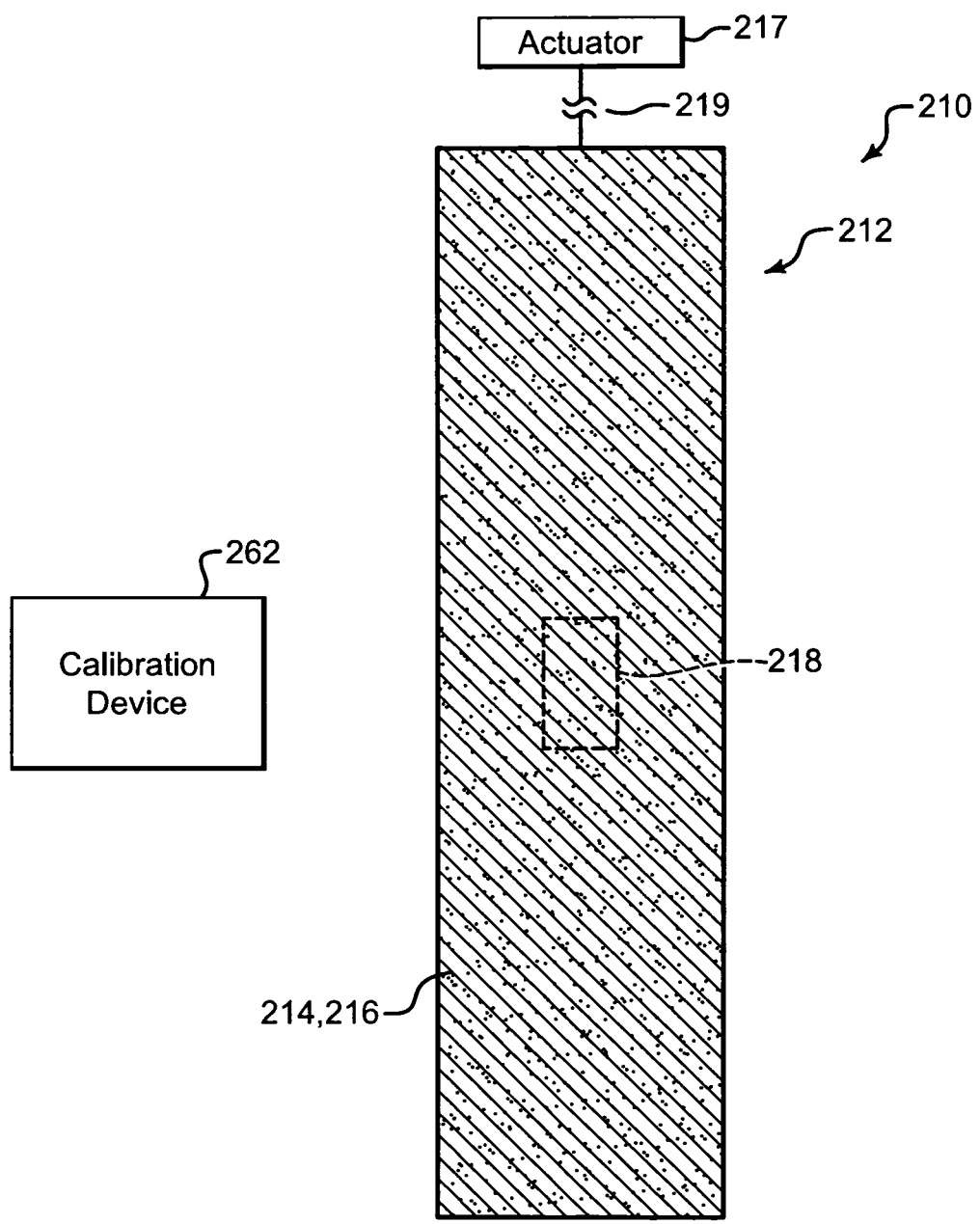
Figure 2A:
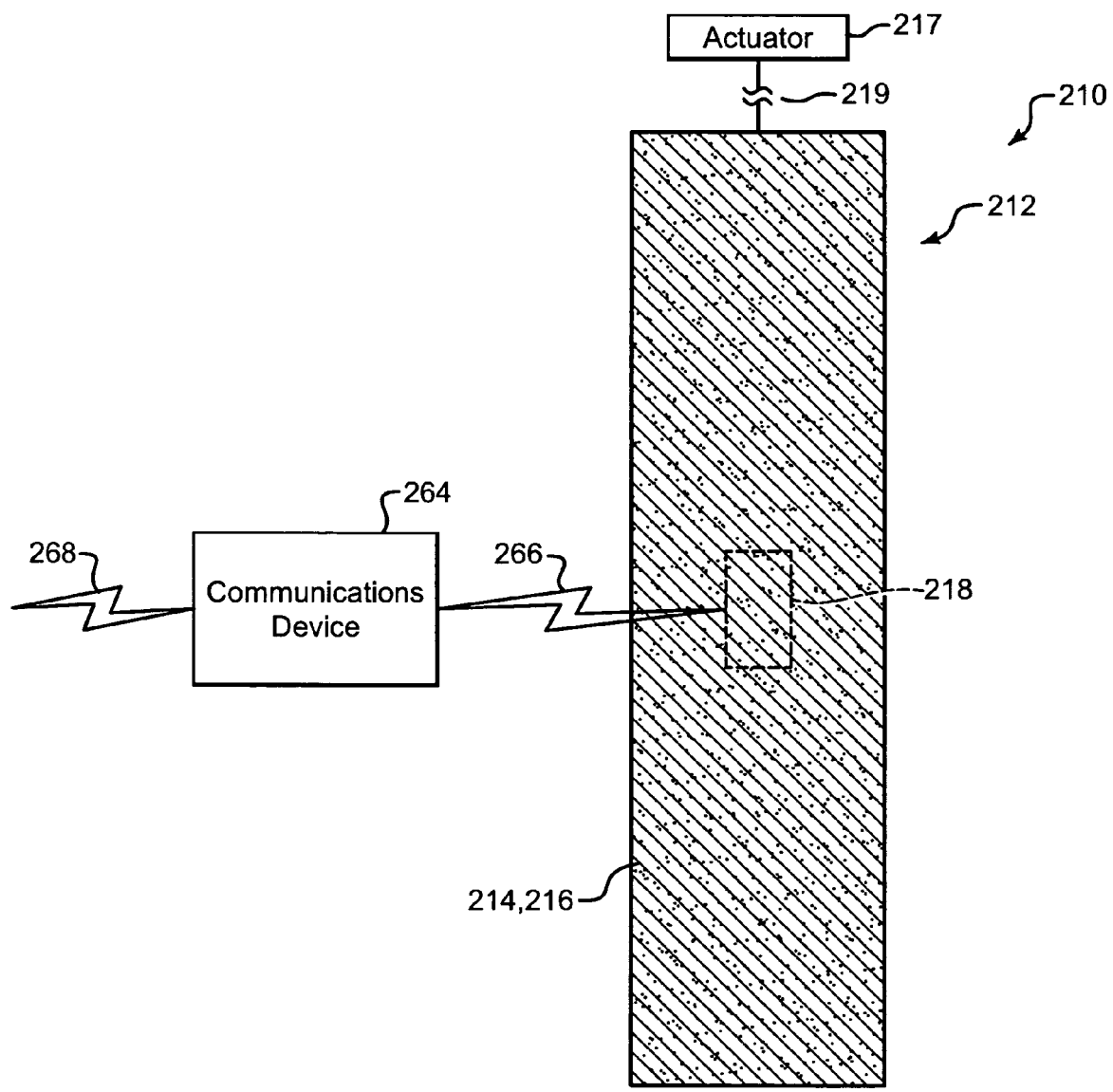
Figure 2A:
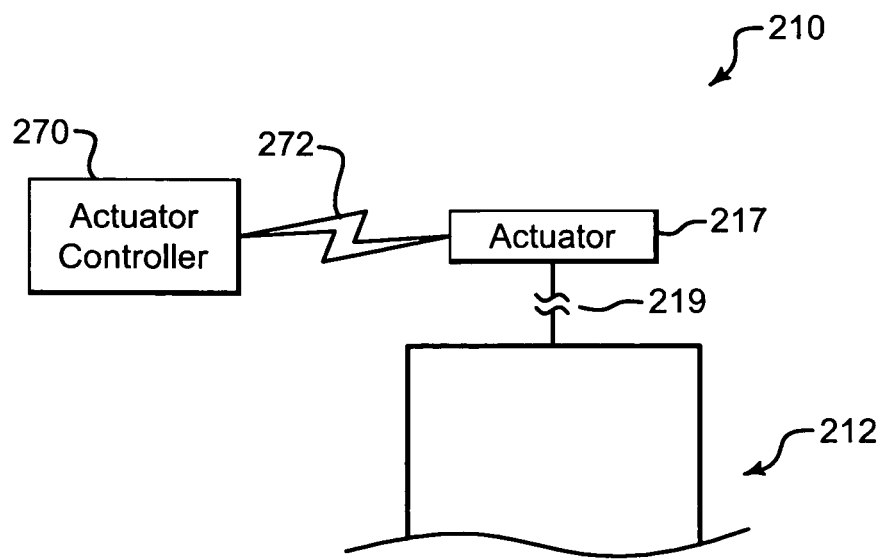
Figure 2A:
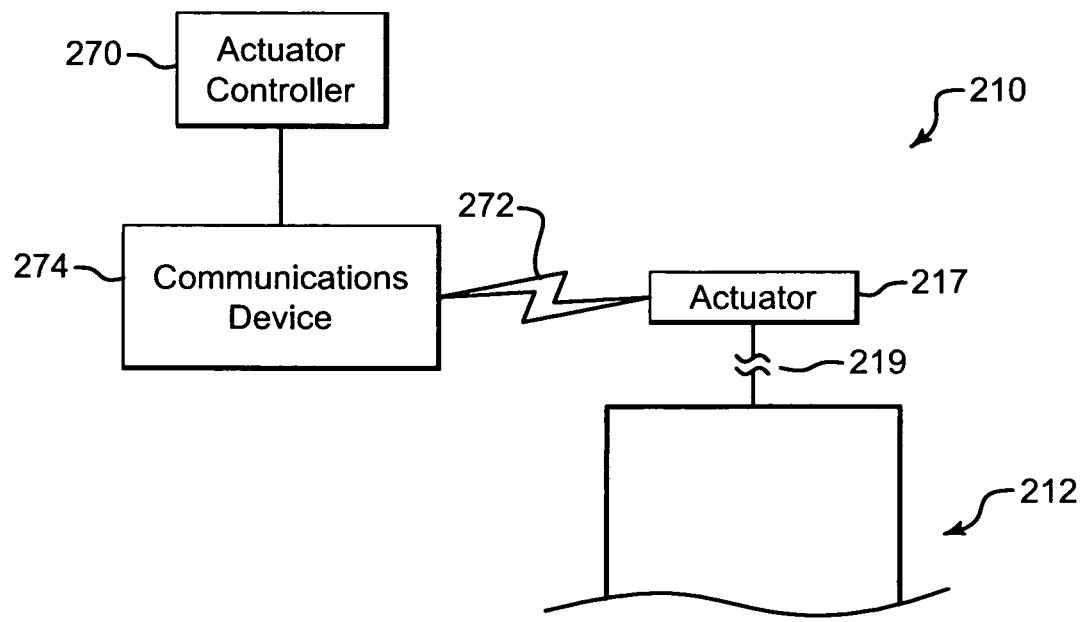
Figure 2A:
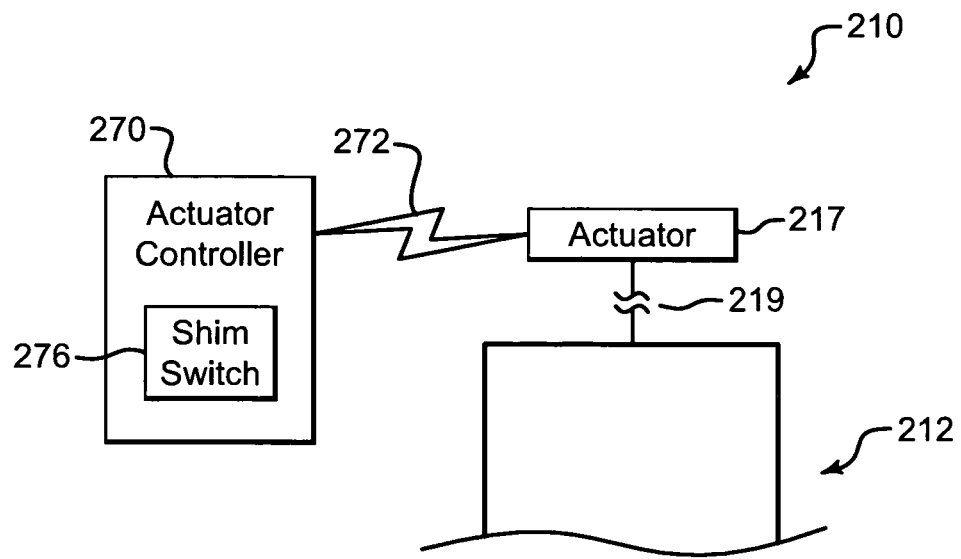
Figure 2A:
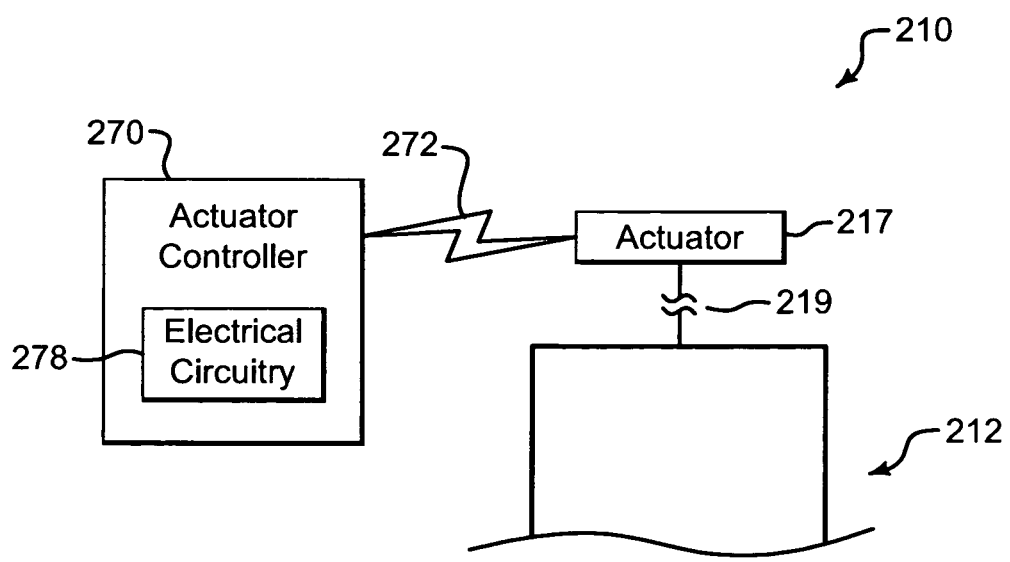

As shown in FIGS. 2R-2AL, in some embodiments the sensor 218 may be physically associated with the reactivity control rod 210. Given by way of non-limiting examples, in FIGS. 2R-2AH the sensor 218 may be physically associated with embodiments of the reactivity control rod 210 that have been shown and explained with reference to FIGS. 2A-2Q. In such cases, details have already been set forth regarding embodiments of the reactivity control rod 210 with reference to FIGS. 2A-2Q and need not be repeated for an understanding.

In such embodiments the sensor 218 may be physically associated with the reactivity control rod 212 in any suitable physical association as desired. For example and referring to FIG. 2AI, in some embodiments physical association may include the sensor 218 being located within an interior 246 of the reactivity control rod 212. For example, the sensor 218 may be located via any suitable attachment method on an interior surface 248 of a cladding wall 250 of the reactivity control rod 212. As a further example and referring now to FIG. 2AJ, in some other embodiments physical association may include the sensor 218 being located proximate an exterior 252 of the reactivity control rod 212. For example, the sensor 218 may be located via any suitable method on an exterior surface 254 of the cladding wall 250.

It will be appreciated that the sensor 218 need not be physically associated with the reactivity control rod 212. To that end, in some embodiments, the sensor 218 is not physically associated with the reactivity control rod 212. For example, in some embodiments the sensor 218 may be located at a position that is separate from the reactivity control rod 212 but that permits the sensor 218 to sense the reactivity parameter desired to be sensed. Given by way of non-limiting example, the sensor 218 may be located at a position that is separate but no more than one mean free path $\lambda_T$ for fission-inducing neutrons from the reactivity control rod 212.

Any one or more of various reactivity parameters associated with the reactivity control rod 212 may be sensed with the sensor 218. Given by way of non-limiting examples, the sensed reactivity parameter may include any one or more of parameters such as neutron fluence, neutron flux, neutron fissions, fission products, radioactive decay events, temperature, pressure, power, isotopic concentration, burnup, and/or neutron spectrum.

The sensor 218 may include any suitable sensor that is configured to sense the reactivity parameter that is desired to be sensed. Given by way of non-limiting example, in some embodiments the sensor 218 may include at least one fission detector, such as without limitation a micro-pocket fission detector. In some other embodiments the sensor 218 may include a neutron flux monitor, such as without limitation a fission chamber and/or an ion chamber. In some embodiments the sensor 218 may include a neutron fluence sensor, such as without limitation an integrating diamond sensor. In some embodiments the sensor 218 may include a fission product detector, such as without limitation a gas detector, a β detector, and/or a γ detector. In some embodiments, when provided, the fission product detector may be configured to measure a ratio of isotope types in fission product gas. In some embodiments the sensor 18 may include a temperature sensor. In some other embodiments the sensor 218 may include a pressure sensor. In some embodiments the sensor 218 may include a power sensor, such as without limitation a power range nuclear instrument. In some embodiments, if desired the sensor 218 may be replaceable.

In some other embodiments, the reactivity parameter may be determined without being sensed by a sensor. Given by way of non-limiting example, in some embodiments the apparatus may include electrical circuitry (not shown) configured to determine at least one reactivity parameter (which have been discussed above). The reactivity parameter may be determined in any suitable manner. Given by way of non-limiting example, the reactivity parameter may be retrieved from a look-up table using operating parameters, such as temperature, pressure, power level, time in core life (as measured in effective full power hours), and the like, as entering arguments. Given by way of another non-limiting example, the reactivity parameter may be modeled, such as by running suitable neutronics modeling software on a suitable computer. Given by way of illustration, suitable neutronics modeling software includes MCNP, CINDER, REBUS, and the like. In a further non-limiting example, the reactivity parameter may be determined by a reactor operator or any other person skilled in the art based on prior knowledge or experience.

In a general sense, those skilled in the art will recognize that various aspects described herein (including the electrical circuitry configured to determine at least one reactivity parameter) can be implemented, individually and/or collectively, by a wide range of hardware, software, firmware, or any combination thereof that can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Referring to FIG. 2AK, in some embodiments a calibration device 262 configured to calibrate the sensor 218 may be provided. It will be appreciated that, when provided, the calibration device 262 suitably is a source having known characteristics or attributes of the reactivity parameter, discussed above, that is sensed by the sensor 218.

Referring to FIG. 2AL, in some embodiments at least one communications device 264 may be operatively coupled to the sensor 218 as generally indicated at 266. The communications device 218 suitably is any acceptable device that can operatively couple the sensor 218 in signal communication with a suitable communications receiving device (not shown) as generally indicated at 268. Given by way of non-limiting examples, the communications device 264 may include an electrical cable, a fiber optic cable, a telemetry transmitter, a radiofrequency transmitter, an optical transmitter, or the like.

Referring now to FIGS. 2A-2AL, the reactivity control rod 212 is operationally coupled, as indicated generally at 219, to the actuator 217 in any suitable manner as desired. For example, in some embodiments the reactivity control rod 212 may be electromagnetically coupled to the actuator 217. In some other embodiments the reactivity control rod 212 may be mechanically linked to the actuator 217.

Referring to FIG. 2AM, in some embodiments the reactivity control system 210 may include an actuator controller 270 that is configured to generate a rod control signal 272. In such embodiments, the actuator 217 is configured to move the reactivity control rod 217 that is operationally coupled thereto (as generally indicated at 219) responsive to the rod control signal 272.

The actuator controller 270 generates the rod control signal 272 and communicates the rod control signal 272 in signal communication to the actuator 217. Referring to FIG. 2AN, in some embodiments a communications device 274 is configured to communicate the rod control signal 272 from the actuator controller 270 to the actuator 217. The communications device 274 suitably is any acceptable device that can operatively couple the actuator controller 270 in signal communication with the actuator 217. Given by way of non-limiting examples, the communications device 274 may include an electrical cable, a fiber optic cable, a telemetry transmitter, a radiofrequency transmitter, an optical transmitter, or the like.

The actuator controller 270 may generate the rod control signal 272 in any suitable manner as desired. For example and referring to FIG. 2AO, in some embodiments the actuator controller 270 may include an operator interface 276. Given by way of non-limiting example, in some embodiments the operator interface 276 may include a shim switch.

Referring to FIG. 2AP, in some other embodiments the actuator controller 270 may include electrical circuitry 278 that is configured to automatically generate the rod control signal 272 based upon at least one reactivity parameter (which have been discussed above).

Referring now to FIGS. 2A-2AP, the actuator 217 may be any suitable actuator as desired for a particular application. Given by way of non-limiting example, in some embodiments the actuator 217 may include a reactivity control rod drive mechanism. In some embodiments the actuator 217 may be configured to drive the reactivity control rod 212 bidirectionally. That is, when the reactivity control rod 212 is provided for use in a nuclear fission reactor, the reactivity control rod 212 may be driven into and/or out of a core of the nuclear fission reactor as desired. In some other embodiments, the actuator 217 may be further configured to stop driving the reactivity control rod 217 at least one intermediate position between a first stop position and a second stop position.

Illustrative Nuclear Fission Traveling Wave Reactor

Figure 3:
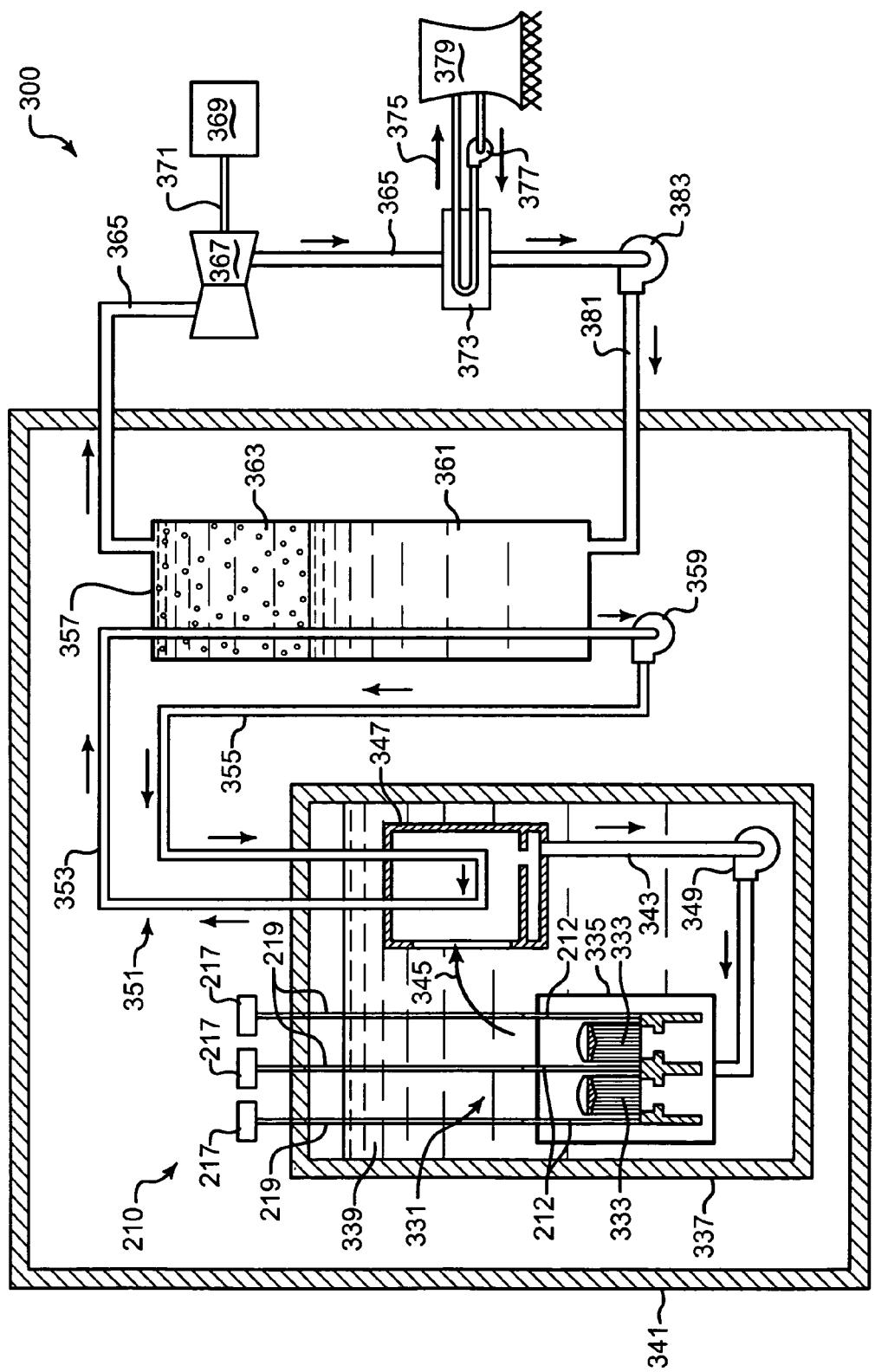
FIG. 3 is an illustration in partial schematic form of an illustrative nuclear fission traveling wave reactor having a fast neutron spectrum.

Referring now to FIG. 3, in some embodiments an illustrative nuclear fission traveling wave reactor 300 having a fast neutron spectrum may include any illustrative embodiment of the reactivity control system 210 (FIGS. 2A-2AP).

Given by way of non-limiting example, the nuclear fission traveling wave reactor 300 includes an illustrative nuclear fission reactor core 331. The nuclear fission reactor core 331 includes suitable nuclear fission fuel material 333 that is configured to propagate therein a nuclear fission traveling wave having a fast neutron spectrum.

As described above, the reactivity control system 210 includes reactivity control rods 212. Each reactivity control rod 212 includes neutron absorbing material configured to absorb fast spectrum neutrons of the nuclear fission traveling wave. At least a portion of the neutron absorbing material includes fertile nuclear fission fuel material. The reactivity control system 210 also includes actuators 217. Each of the actuators 217 is responsive to at least one reactivity parameter and is operationally coupled to at least one of the reactivity control rods 212, as indicated generally at 219.

In some embodiments, the reactivity parameter may include at least one reactivity parameter of the nuclear fission traveling wave reactor. However, in some other embodiments and as discussed above, the reactivity parameter may include at least one reactivity parameter of at least one of the reactivity control rods 212. In various embodiments the reactivity parameter may include one or more reactivity parameters such as neutron fluence, neutron flux, neutron fissions, fission products, radioactive decay events, temperature, pressure, power, isotopic concentration, burnup, and/or neutron spectrum.

It will be appreciated that the reactivity control system 210 included in the nuclear fission traveling wave reactor 300 may be embodied in any manner desired as discussed above. For example, the reactivity control system and any of its components may be embodied, without limitation, as discussed above with reference to any one or more of FIGS. 2A-2AP. Because embodiments of the reactivity control system 210 have been discussed in detail above, for sake of brevity details need not be repeated for an understanding.

Illustrative details of embodiments of the nuclear fission traveling wave reactor 300 will be set forth below. It will be appreciated that the nuclear fission traveling wave reactor 300 is a non-limiting example that is set forth below for purposes of illustration and not of limitation.

The nuclear fission reactor core 333 is housed within an illustrative reactor core enclosure 335 which acts to maintain vertical coolant flow through the core. In some embodiments the reactor core enclosure 335 may also function as a radiation shield to protect in-pool components such as heat exchangers and the like from neutron bombardment. The reactivity control rods 212 longitudinally extend into the nuclear fission reactor core 331 for controlling the fission process occurring therein, as discussed above.

The nuclear fission reactor core 331 is disposed within an illustrative reactor vessel 337. In some embodiments the reactor vessel 337 is filled to a suitable amount (such as about 90% or so) with a pool of coolant 339, such as liquid metal like sodium, potassium, lithium, lead, mixtures thereof, and the like, or liquid metal alloys such as lead-bismuth, to such an extent that the nuclear fission reactor core 331 is submerged in the pool of coolant. Suitably, in an illustrative embodiment contemplated herein, the coolant is a liquid sodium (Na) metal or sodium metal mixture, such as sodium-potassium (Na—K). In addition, in some embodiments a containment vessel 341 sealingly surrounds parts of the nuclear fission traveling wave reactor 300.

In some embodiments a primary coolant pipe 343 is coupled to the nuclear fission reactor core 331 for allowing a suitable coolant to flow through the nuclear fission reactor core 331 along a coolant flow stream or flow path 345 in order to cool the nuclear fission reactor core 331. In various embodiments the primary coolant pipe 343 may be made from materials such as, without limitation, stainless steel or from non-ferrous alloys, zirconium-based alloys, or other suitable structural materials or composites.

In some embodiments the heat-bearing coolant generated by the nuclear fission reactor core 331 flows along the coolant flow path 345 to an intermediate heat exchanger 347 that is also submerged in the pool of coolant 339. The intermediate heat exchanger 347 may be made from any suitable material, such as without limitation stainless steel, that is sufficiently resistant to heat and corrosive effects of the coolant, such as without limitation liquid sodium, in the pool of coolant 339. The coolant flowing along the coolant flow path 345 flows through the intermediate heat exchanger 347 and continues through the primary coolant pipe 343. It will be appreciated that the coolant leaving intermediate heat exchanger 347 has been cooled due to heat transfer occurring in the intermediate heat exchanger 347. In some embodiments a pump 349, which may be an electro-mechanical pump or an electromagnetic pump as desired, is coupled to the primary coolant pipe 343. In such embodiments the pump 349 is in fluid communication with the coolant carried by the primary coolant pipe 343. The pump 349 pumps the coolant through the primary coolant pipe 343, through the nuclear fission reactor core 331, along the coolant flow path 345, and into the intermediate heat exchanger 347.

A secondary coolant pipe 351 is provided for removing heat from the intermediate heat exchanger 347. The secondary coolant pipe 351 includes a secondary hot leg pipe segment 353 and a secondary cold leg pipe segment 355. The secondary hot leg pipe segment 353 and the secondary cold leg pipe segment 355 are integrally connected to the intermediate heat exchanger 347. The secondary coolant pipe 351 contains a secondary coolant, that is a fluid such as any one of the coolant choices previously mentioned.

The secondary hot leg pipe segment 353 extends from the intermediate heat exchanger 347 to a steam generator 357. In some embodiments, if desired, the steam generator 357 may include a superheater. After passing through the steam generator 357, the secondary coolant flowing through the secondary loop pipe 351 and exiting the steam generator 357 is at a lower temperature and enthalpy than before entering the steam generator 357 due to heat transfer occurring within the steam generator 357. After passing through the steam generator 357, the secondary coolant is pumped, such as by means of a pump 359, which may be an electro-mechanical pump or an electromagnetic pump or the like, along the secondary cold leg pipe segment 355, which extends into the intermediate heat exchanger 347 for providing the previously mentioned heat transfer.

Disposed in the steam generator 357 is a body of water 361 having a predetermined temperature. The secondary coolant flowing through the secondary hot leg pipe segment 353 will transfer its heat by means of conduction and convection to the body of water 361, which is at a lower temperature than the secondary coolant flowing through the secondary hot leg pipe segment 353. As the secondary coolant flowing through the secondary hot leg pipe segment 353 transfers its heat to the body of water 361, a portion of the body of water 361 will vaporize to steam 363 according to the predetermined temperature within the steam generator 357. The steam 363 will then travel through a steam line 365. One end of the steam line 365 is in vapor communication with the steam 363 and another end of the steam line 365 is in liquid communication with the body of water 361.

A rotatable turbine 367 is coupled to the steam line 365 such that the turbine 367 rotates as the steam 363 passes therethrough. An electrical generator 369 is coupled to the turbine 367 by a rotatable turbine shaft 371. The electrical generator 369 generates electricity as the turbine 367 rotates.

A condenser 373 is coupled to the steam line 365 and receives the steam 363 passing through the turbine 367. The condenser 373 condenses the steam 363 to liquid water and passes any waste heat via a recirculation fluid path 375 and a condensate pump 377, such as an electro-mechanical pump, to a heat sink 379, such as a cooling tower, which is associated with the condenser 373. The feed water condensed by the condenser 373 is pumped along a feed water line 381 from the condenser 373 to the steam generator 357 by a feed water pump 383, which may be an electro-mechanical pump that is interposed between the condenser 373 and the steam generator 357.

Embodiments of the nuclear fission reactor core 331 may include any suitable configuration as desired to accommodate the reactivity control system 210. In this regard, in some embodiments the nuclear fission reactor core 331 may be generally cylindrically shaped to obtain a generally circular transverse cross section. In some other embodiments the nuclear fission reactor core 331 may be generally hexagonally shaped to obtain a generally hexagonal transverse cross section. In other embodiments the nuclear fission reactor core 331 may be generally parallelepiped shaped to obtain a generally rectangular transverse cross section.

Regardless of the configuration or shape selected for the nuclear fission reactor core 331, the nuclear fission reactor core 331 is operated as a traveling wave nuclear fission reactor core. For example, a nuclear fission igniter (not shown for clarity), which includes an isotopic enrichment of nuclear fissionable material, such as, without limitation, U-233, U-235 or Pu-239, is suitably located in the nuclear fission reactor core 331. Neutrons are released by the igniter. The neutrons that are released by the igniter are captured by fissile and/or fertile material within the nuclear fission fuel material 333 to initiate a nuclear fission chain reaction. The igniter may be removed once the fission chain reaction becomes self-sustaining, if desired.

The igniter initiates a three-dimensional, traveling wave or "burn wave". When the igniter generates neutrons to cause "ignition", the burn wave travels outwardly from the igniter so as to form the traveling or propagating burn wave. Speed of the traveling burn wave may be constant or non-constant. Thus, the speed at which the burn wave propagates can be controlled. For example, longitudinal movement of the reactivity control rods 210 in a predetermined or programmed manner can drive down or lower neutronic reactivity of vented nuclear fission fuel modules 30. In this manner, neutronic reactivity of nuclear fuel that is presently being burned behind the burn wave or at the location of the burn wave is driven down or lowered relative to neutronic reactivity of "unburned" nuclear fuel ahead of the burn wave. Controlling reactivity in this manner maximizes the propagation rate of the burn wave subject to operating constraints for the nuclear fission reactor core 331, such as amount of permissible fission product production and/or neutron fluence limitations of reactor core structural materials.

The basic principles of such a traveling wave nuclear fission reactor are disclosed in more detail in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, and LOWELL L. WOOD, JR. as inventors, filed 28 Nov. 2006; U.S. patent application Ser. No. 11/605,848, entitled METHOD AND SYSTEM FOR PROVIDING FUEL IN A NUCLEAR REACTOR, naming RODERICK A. HYDE, MURIEL Y. ISHIKAWA, NATHAN P. MYHRVOLD, and LOWELL L. WOOD, JR. as inventors, filed 28 Nov. 2006; and U.S. patent application Ser. No. 11/605,933, entitled CONTROLLABLE LONG TERM OPERATION OF A NUCLEAR REACTOR, naming RODERICK A. HYDE, MURIEL Y. ISHIKAWA, NATHAN P. MYHRVOLD, and LOWELL L. WOOD, JR. as inventors, filed 28 Nov. 2006, the entire contents of which are hereby incorporated by reference.

It will be appreciated that the embodiment of the nuclear fission traveling wave reactor 300 described above is set forth as a non-limiting example for purposes of illustration only and not of limitation. In some other embodiments, the nuclear fission traveling wave reactor 300 may be a gas-cooled fast nuclear fission traveling wave reactor that includes a suitable gas coolant, such as helium or the like. In such an embodiment, a gas-driven turbine-generator may be driven by the gas coolant.

Illustrative Methods, Systems, and Computer Software Program Products

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms. Also, although the various operational flows are presented in the sequence(s) illustrated, it should be understood that the various operations may be performed in other orders than those which are illustrated, or may be performed concurrently.

Figure 4A:
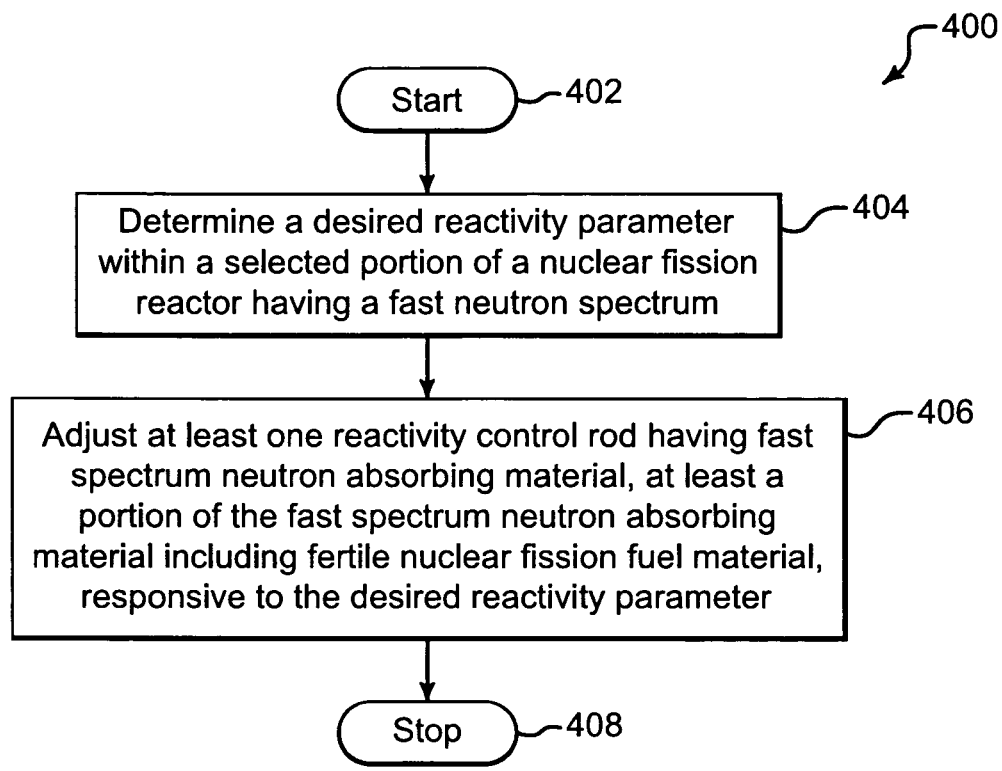
FIG. 4A is a flowchart of an illustrative method of controlling reactivity in a nuclear fission reactor having a fast neutron spectrum.

Referring now to FIG. 4A, a method 400 is provided for controlling reactivity in a nuclear fission reactor having a fast neutron spectrum. The method 400 starts at a block 402. At a block 404 a desired reactivity parameter within a selected portion of the nuclear fission reactor having a fast neutron spectrum is determined. At a block 406 at least one reactivity control rod having fast spectrum neutron absorbing material, at least a portion of the fast spectrum neutron absorbing material including fertile nuclear fission fuel material, is adjusted responsive to the desired reactivity parameter. The method 400 stops at a block 408.

It will be appreciated that the method 400 may be performed with respect to any nuclear fission reactor having a fast neutron spectrum. In some embodiments, the method 400 may be performed with respect to a nuclear fission traveling wave reactor, in which case the fast spectrum neutrons may be part of a nuclear fission traveling wave. In some other embodiments, the method 400 may be performed with respect to any suitable fast breeder reactor, such as a liquid metal fast breeder reactor, a gas-cooled fast breeder reactor, or the like. Thus, no limitation to any particular type of nuclear fission reactor having a fast neutron spectrum is intended and should not be inferred.

Illustrative details will be set forth below by way of non-limiting examples.

Figure 4B:
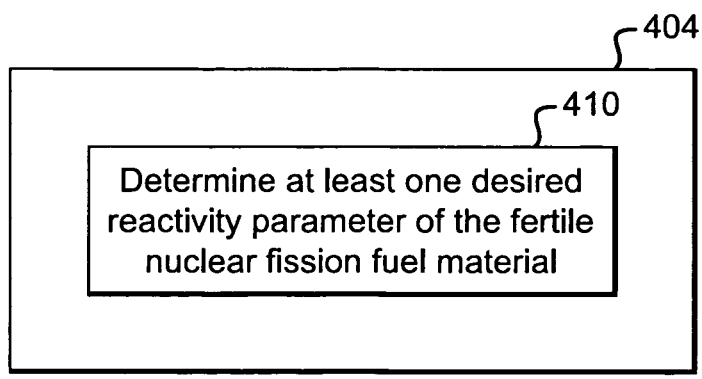
FIGS. 4B-4W are flowcharts of illustrative details of the method of FIG. 4A.
Figure 4C:
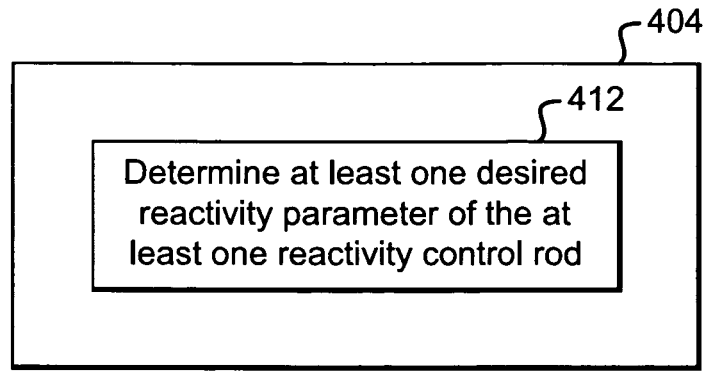
Figure 4D:
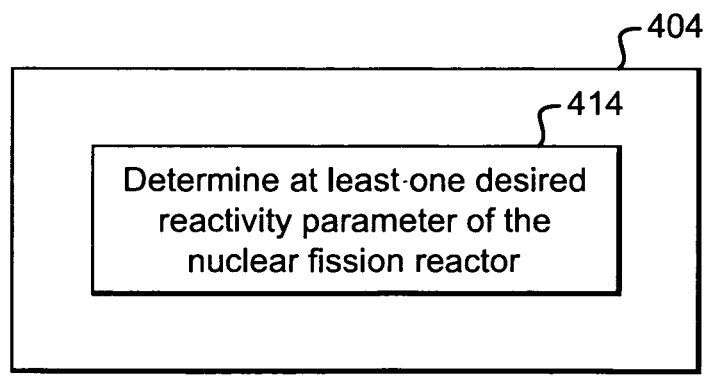

In various embodiments the desired reactivity parameter may be determined with respect to any portion of a nuclear fission reactor as desired. For example and referring to FIG. 4B, in some embodiments determining a desired reactivity parameter within a selected portion of a nuclear fission reactor having a fast neutron spectrum at the block 404 may include determining at least one desired reactivity parameter of the fertile nuclear fission fuel material at a block 410. In some other embodiments and referring to FIG. 4C, determining a desired reactivity parameter within a selected portion of a nuclear fission reactor having a fast neutron spectrum at the block 404 may include determining at least one desired reactivity parameter of the at least one reactivity control rod at a block 412. In some other embodiments and referring to FIG. 4D, determining a desired reactivity parameter within a selected portion of a nuclear fission reactor having a fast neutron spectrum at the block 404 may include determining at least one desired reactivity parameter of the nuclear fission reactor at a block 414.

Figure 4E:
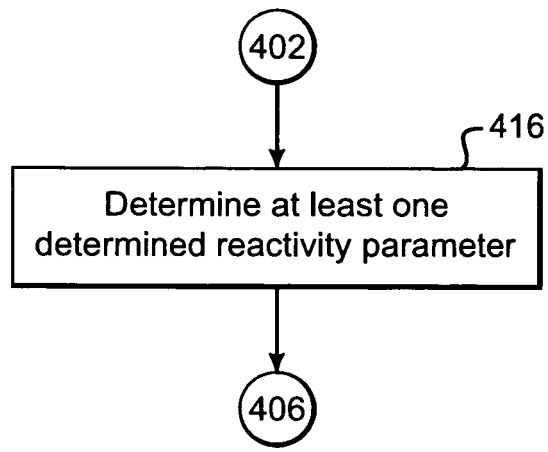
Figure 4F:
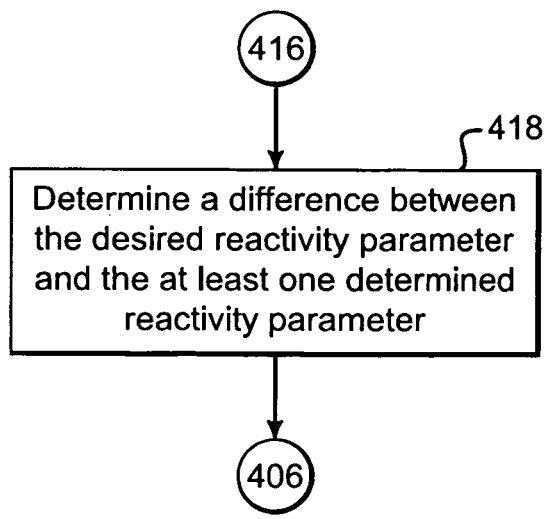
Figure 4G:
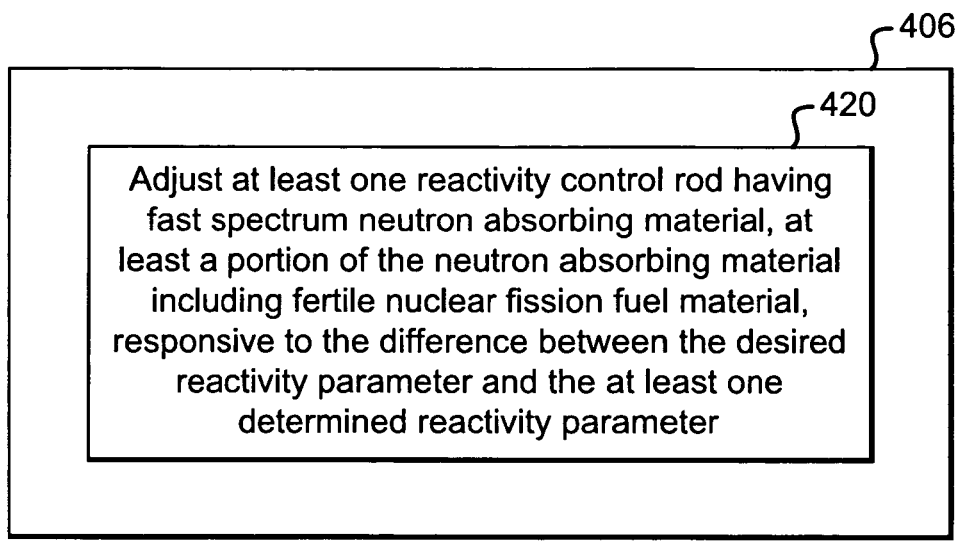

In some embodiments the reactivity control rod may be adjusted responsive to a difference between the desired reactivity parameter and a determination of the reactivity parameter. For example and referring to FIGS. 4A and 4E, in some embodiments at a block 416 at least one determined reactivity parameter may be determined. Referring additionally to FIG. 4F, in some embodiments at a block 418 a difference between the desired reactivity parameter and the at least one determined reactivity parameter may be determined. Referring additionally to FIG. 4G, in some embodiments adjusting at least one reactivity control rod having fast spectrum neutron absorbing material, at least a portion of the neutron absorbing material including fertile nuclear fission fuel material, responsive to the desired reactivity parameter at the block 406 may include adjusting at least one reactivity control rod having fast spectrum neutron absorbing material, at least a portion of the neutron absorbing material including fertile nuclear fission fuel material, responsive to the difference between the desired reactivity parameter and the at least one determined reactivity parameter at a block 420.

Figure 4H:
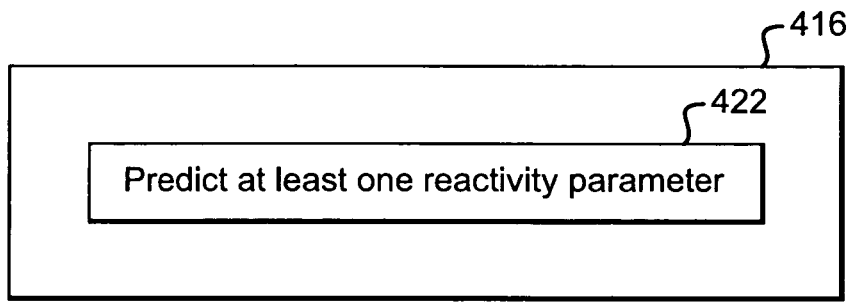
Figure 4I:
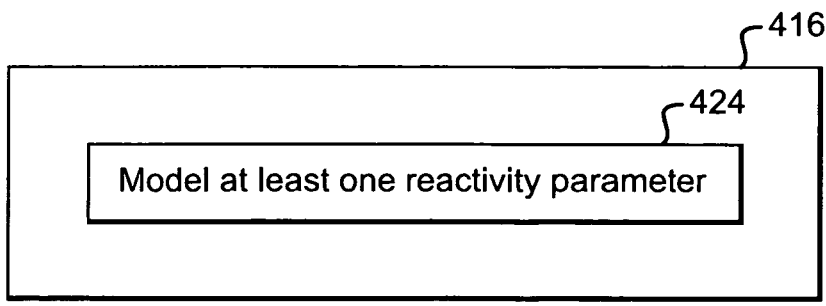
Figure 4J:
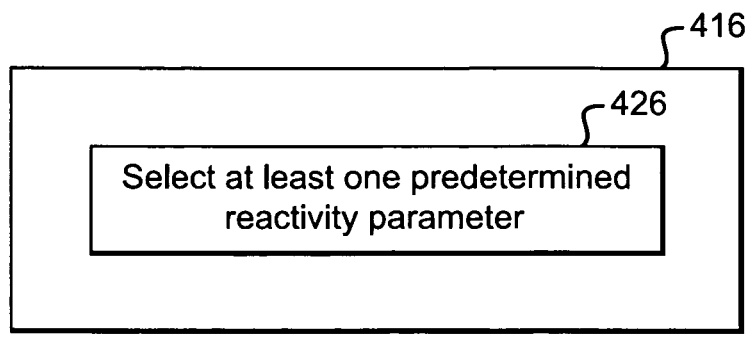

The determined reactivity parameter may be determined in any suitable manner as desired. For example and referring now to FIGS. 4E and 4H, in some embodiments determining at least one determined reactivity parameter at the block 416 may include predicting at least one reactivity parameter at a block 422. Referring to FIGS. 4E and 4I, in some embodiments determining at least one determined reactivity parameter at the block 416 may include modeling at least one reactivity parameter at a block 424. Referring to FIGS. 4E and 4J, in some embodiments determining at least one determined reactivity parameter at the block 416 may include selecting at least one predetermined reactivity parameter at a block 426.

Figure 4K:
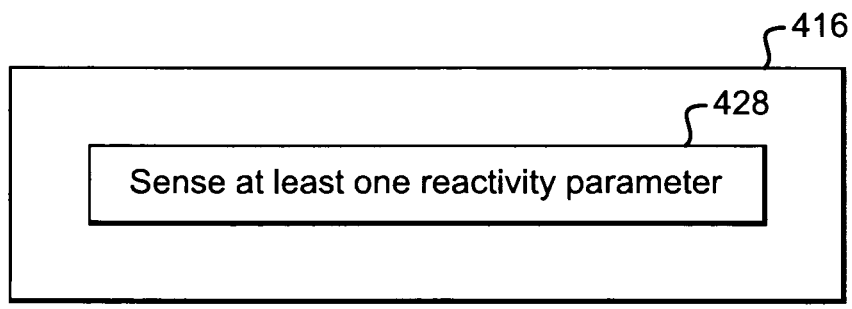

Referring to FIGS. 4E and 4K, in some other embodiments determining at least one determined reactivity parameter at the block 416 may include sensing at least one reactivity parameter at a block 428. It will be appreciated that any desired reactivity parameter may be sensed at the block 428 in any suitable manner.

Figure 4L:
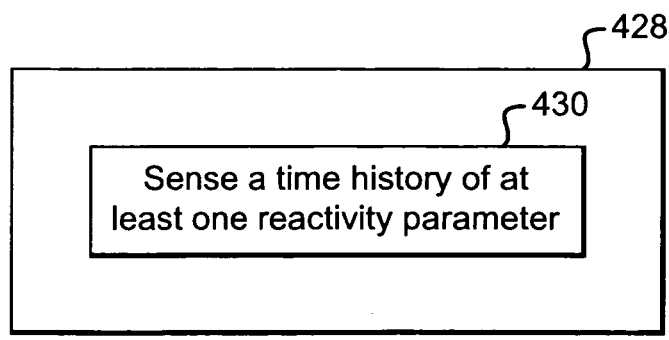
Figure 4M:
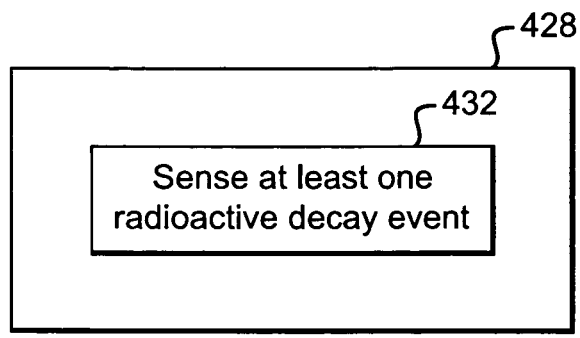
Figure 4N:
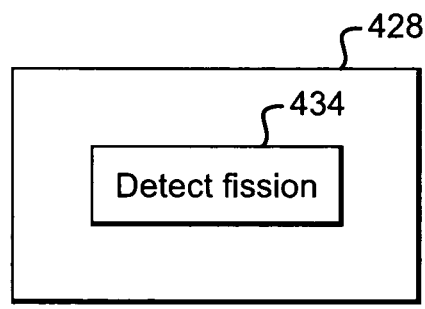
Figure 4O:
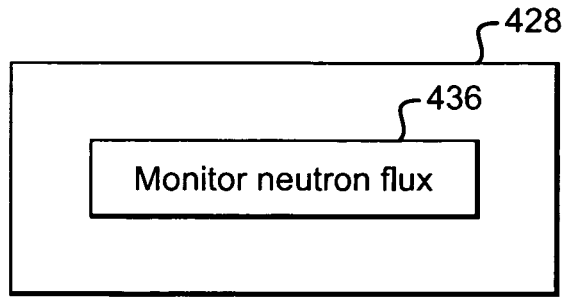
Figure 4P:
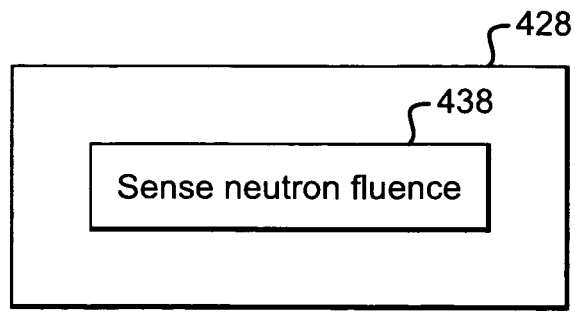
Figure 4Q:
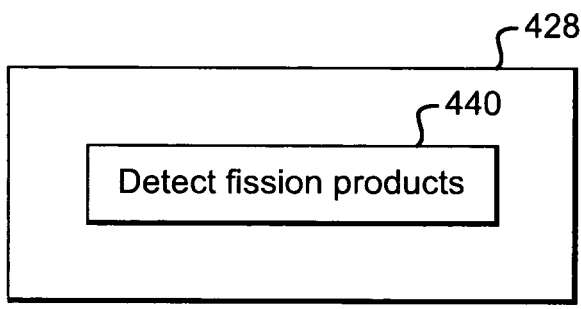

For example and referring to FIGS. 4K and 4L, in some embodiments sensing at least one reactivity parameter at the block 428 may include sensing a time history of at least one reactivity parameter at a block 430. Sensing a time history may be performed as desired, such as by sensing and recording or storing the sensed reactivity parameter more than one time. Given by way of non-limiting examples, a time history of at least one reactivity parameter may include, without limitation, a rate of the reactivity parameter, accumulation of the reactivity parameter, total fissions, or the like. Referring to FIGS. 4K and 4M, in some embodiments sensing at least one reactivity parameter at the block 428 may include sensing at least one radioactive decay event at a block 432. Referring to FIGS. 4K and 4N, in some embodiments sensing at least one reactivity parameter at the block 428 may include detecting fission at a block 434. Referring to FIGS. 4K and 4O, in some embodiments sensing at least one reactivity parameter at the block 428 may include monitoring neutron flux at a block 436. Referring to FIGS. 4K and 4P, in some embodiments sensing at least one reactivity parameter at the block 428 may include sensing neutron fluence at a block 438. Referring to FIGS. 4K and 4Q, in some embodiments sensing at least one reactivity parameter at the block 428 may include detecting fission products at a block 440.

Figure 4R:
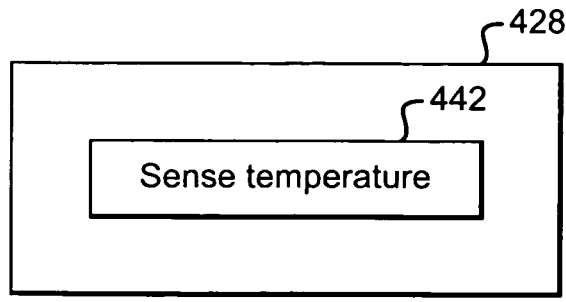
Figure 4S:
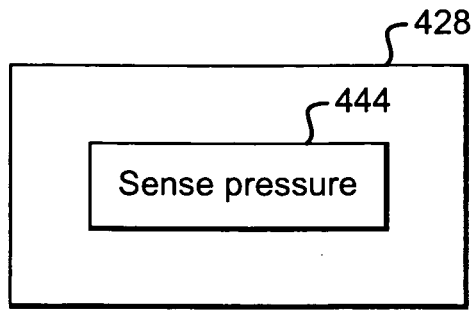
Figure 4T:
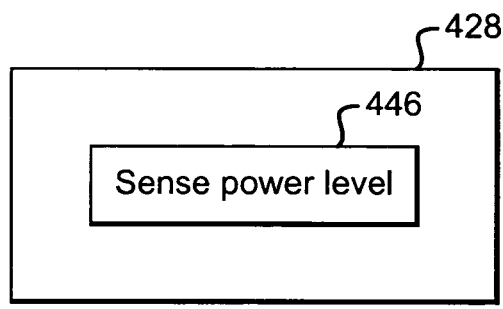

Referring to FIGS. 4K and 4R, in some embodiments sensing at least one reactivity parameter at the block 428 may include sensing temperature at a block 442. Referring to FIGS. 4K and 4S, in some embodiments sensing at least one reactivity parameter at the block 428 may include sensing pressure at a block 444. Referring to FIGS. 4K and 4T, in some embodiments sensing at least one reactivity parameter at the block 428 may include sensing power level at a block 446.

Figure 4U:
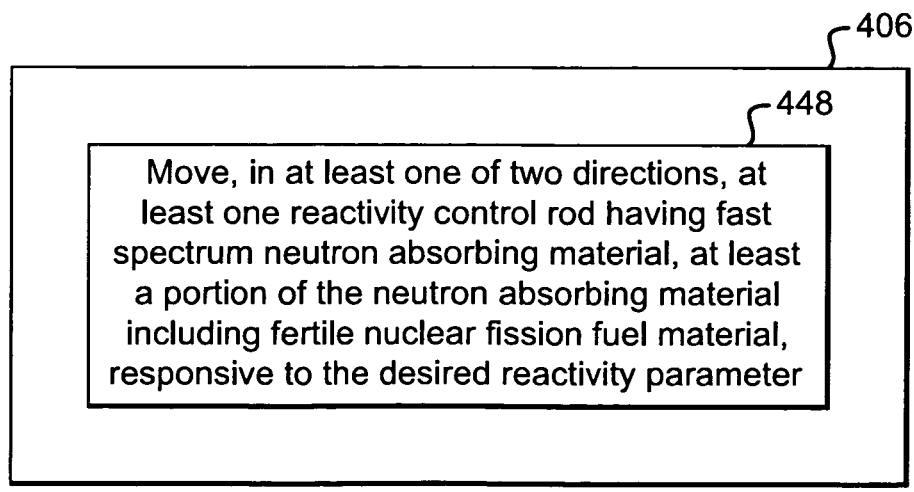

Referring now to FIGS. 4A and 4U, in some embodiments adjusting at least one reactivity control rod having fast spectrum neutron absorbing material, at least a portion of the neutron absorbing material including fertile nuclear fission fuel material, responsive to the desired reactivity parameter at the block 406 may include moving, in at least one of two directions, at least one reactivity control rod having fast spectrum neutron absorbing material, at least a portion of the neutron absorbing material including fertile nuclear fission fuel material, responsive to the desired reactivity parameter at a block 448. In various embodiments the directions may include axial directions in the nuclear fission reactor, radial directions in the nuclear fission reactor, and/or lateral directions in the nuclear fission reactor.

Figure 4V:
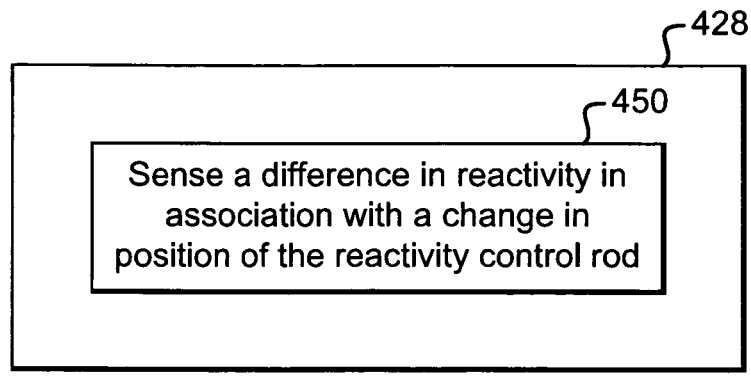

Referring now to FIGS. 4A and 4V, in some embodiments sensing at least one reactivity parameter at the block 428 may include sensing a difference in reactivity in association with a change in position of the reactivity control rod at a block 450.

Figure 4W:
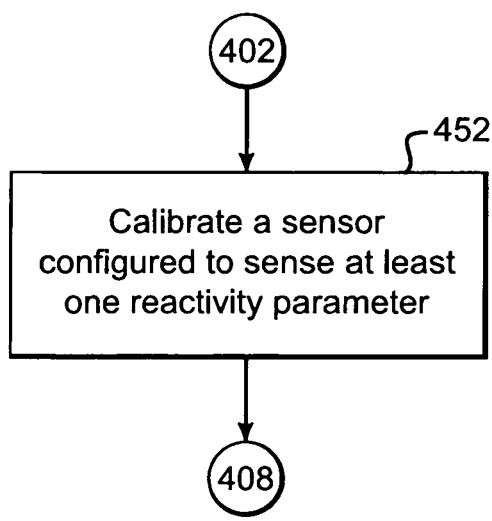

Referring to FIGS. 4A and 4W, in some embodiments a sensor that is configured to sense at least one reactivity parameter may be calibrated at a block 452.

Figure 5A:
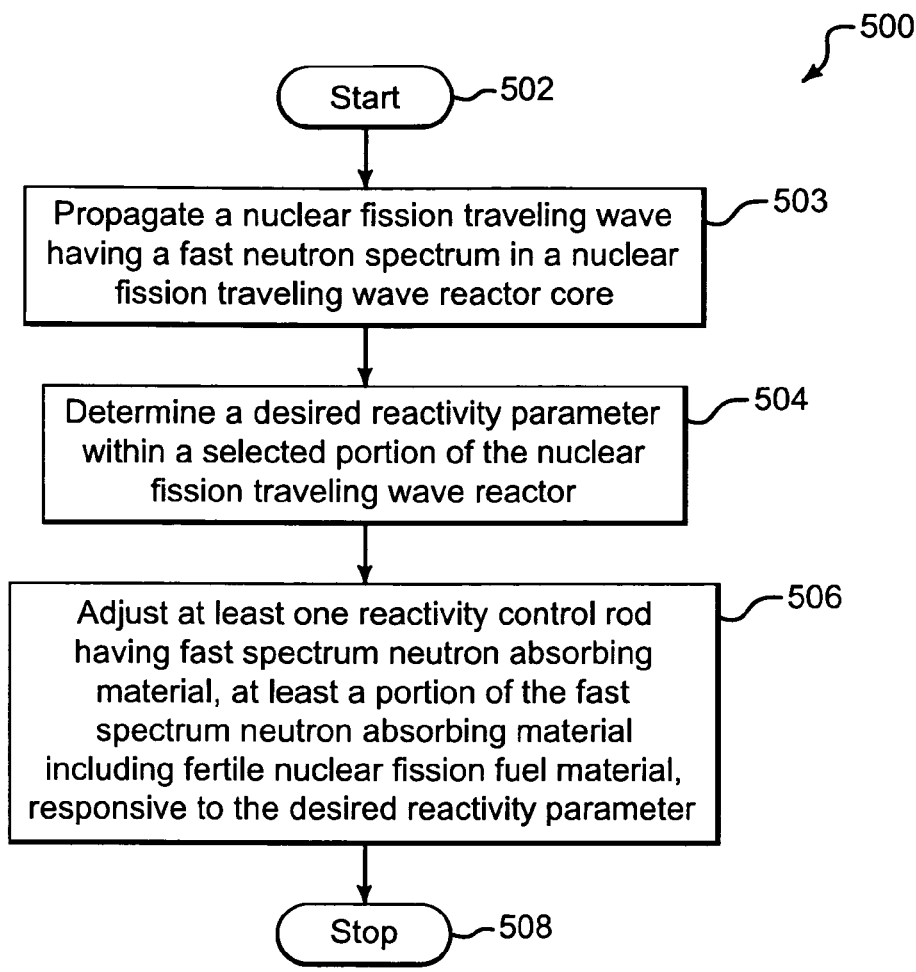
FIG. 5A is a flowchart of an illustrative method of operating a nuclear fission traveling wave reactor having a fast neutron spectrum.

Referring now to FIG. 5A, a method 500 is provided for operating a nuclear fission traveling wave reactor having a fast neutron spectrum. The method 500 starts at a block 502. At a block 503 a nuclear fission traveling wave having a fast neutron spectrum is propagated in a nuclear fission traveling wave reactor core. At a block 504 a desired reactivity parameter within a selected portion of the nuclear fission traveling wave reactor is determined. At a block 506 at least one reactivity control rod having fast spectrum neutron absorbing material, at least a portion of the fast spectrum neutron absorbing material including fertile nuclear fission fuel material, is adjusted responsive to the desired reactivity parameter. The method 500 stops at a block 508.

Illustrative details will be set forth below by way of non-limiting examples.

Figure 5B:
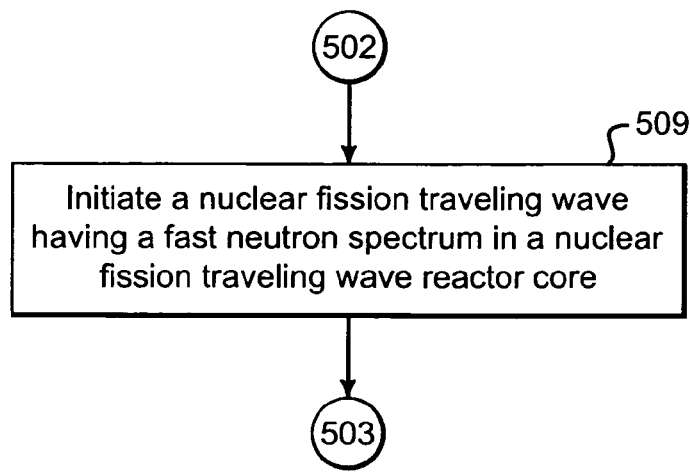
FIGS. 5B-5X are flowcharts of illustrative details of the method of FIG. 5A.

Referring now to FIGS. 5A and 5B, in some embodiments a nuclear fission traveling wave having a fast neutron spectrum may be initiated in the nuclear fission traveling wave reactor core at a block 509.

Figure 5C:
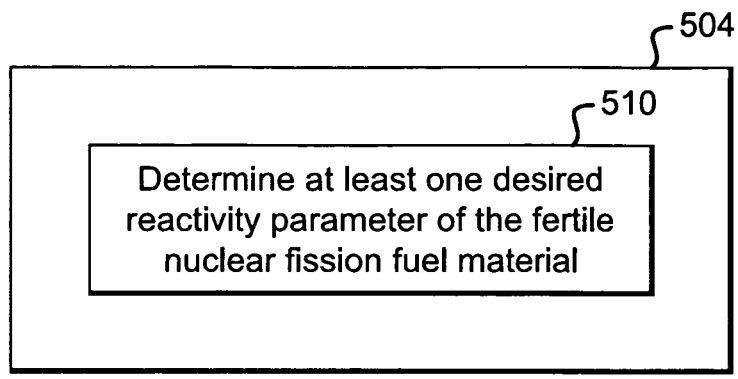
Figure 5D:
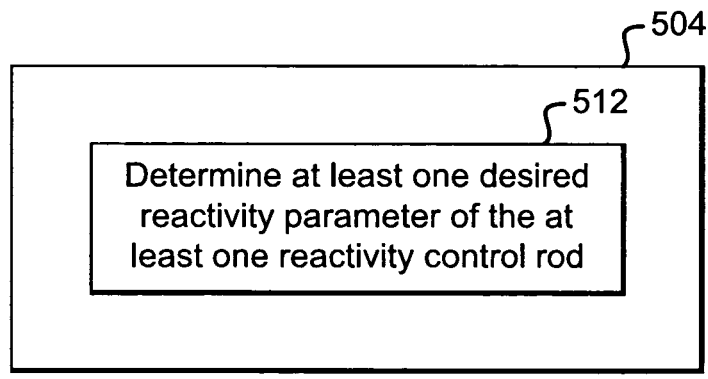
Figure 5E:
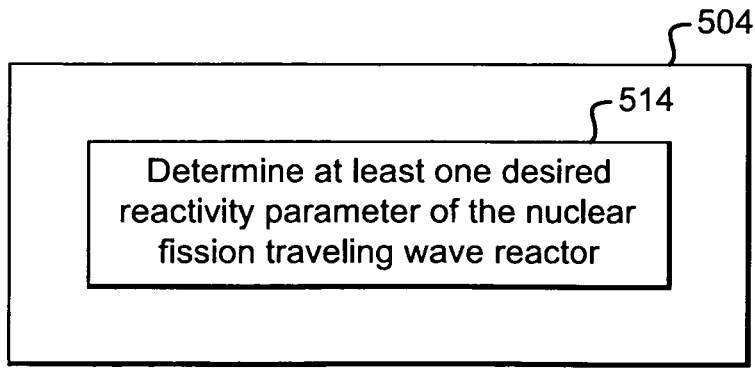

In various embodiments the desired reactivity parameter may be determined with respect to any portion of the nuclear fission traveling wave reactor as desired. For example and referring to FIG. 5C, in some embodiments determining a desired reactivity parameter within a selected portion of the nuclear fission traveling wave reactor at the block 504 may include determining at least one desired reactivity parameter of the fertile nuclear fission fuel material at a block 510. In some other embodiments and referring to FIG. 5D, determining a desired reactivity parameter within a selected portion of the nuclear fission traveling wave reactor at the block 504 may include determining at least one desired reactivity parameter of the at least one reactivity control rod at a block 512. In some other embodiments and referring to FIG. 5E, determining a desired reactivity parameter within a selected portion of the nuclear fission traveling wave reactor at the block 504 may include determining at least one desired reactivity parameter of the nuclear fission traveling wave reactor at a block 514.

Figure 5F:
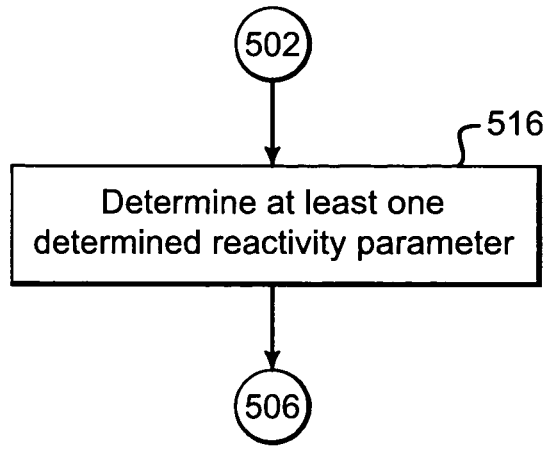
Figure 5G:
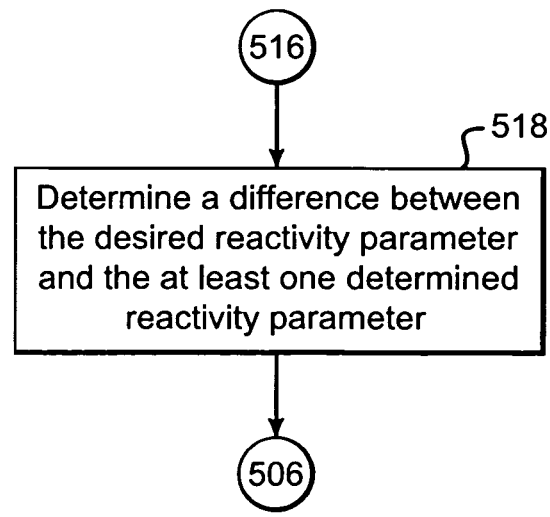
Figure 5H:
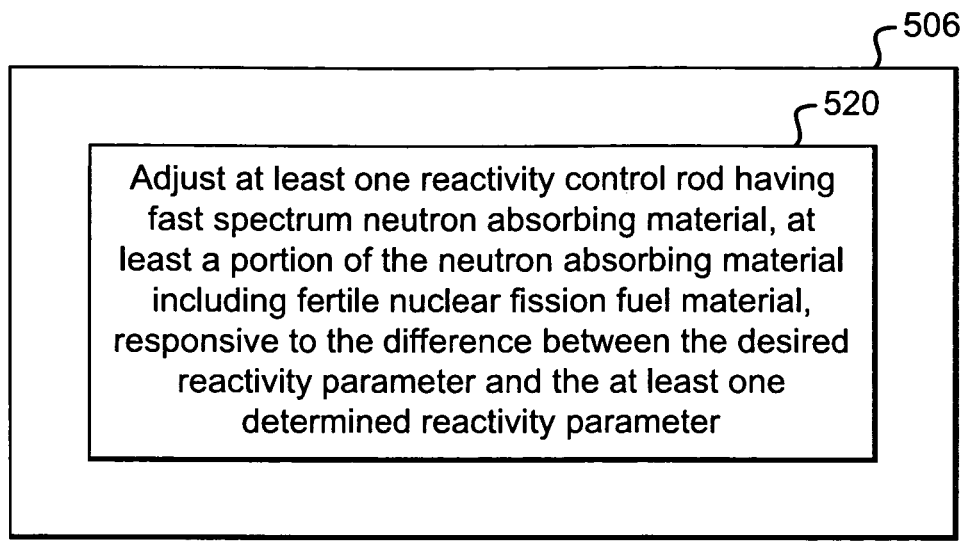

In some embodiments the reactivity control rod may be adjusted responsive to a difference between the desired reactivity parameter and a determination of the reactivity parameter. For example and referring to FIGS. 5A and 5F, in some embodiments at a block 516 at least one determined reactivity parameter may be determined. Referring additionally to FIG. 5G, in some embodiments at a block 518 a difference between the desired reactivity parameter and the at least one determined reactivity parameter may be determined. Referring additionally to FIG. 5H, in some embodiments adjusting at least one reactivity control rod having fast spectrum neutron absorbing material, at least a portion of the neutron absorbing material including fertile nuclear fission fuel material, responsive to the desired reactivity parameter at the block 506 may include adjusting at least one reactivity control rod having fast spectrum neutron absorbing material, at least a portion of the neutron absorbing material including fertile nuclear fission fuel material, responsive to the difference between the desired reactivity parameter and the at least one determined reactivity parameter at a block 520.

Figure 5I:
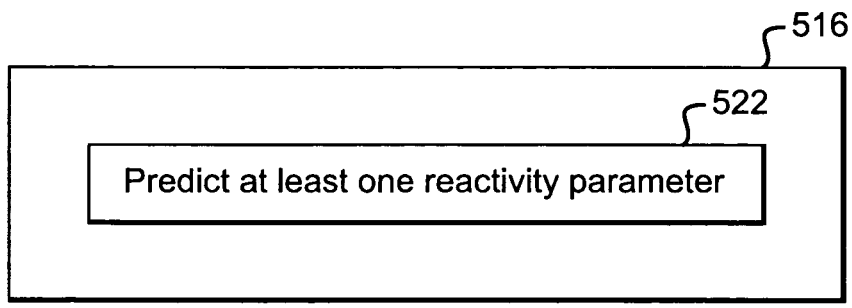
Figure 5J:
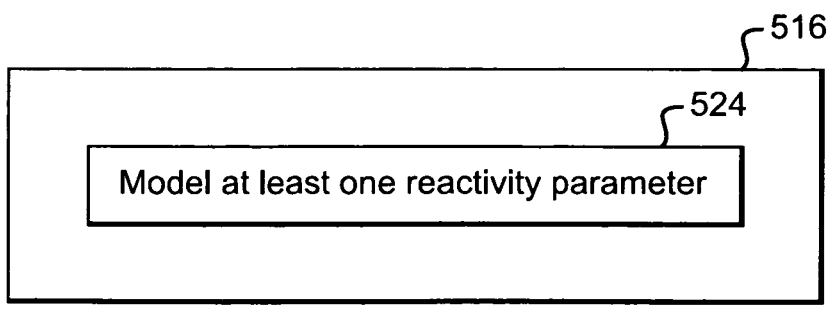
Figure 5K:
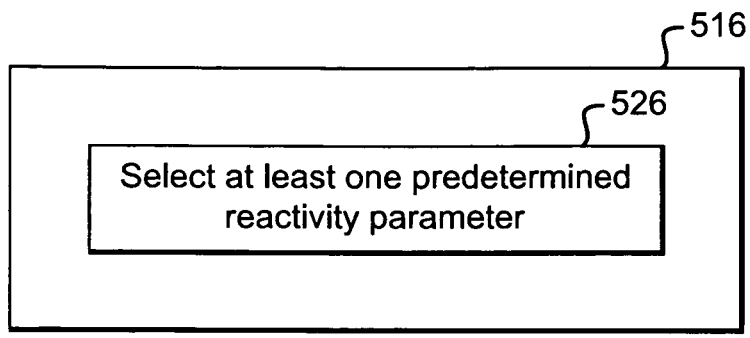

The determined reactivity parameter may be determined in any suitable manner as desired. For example and referring now to FIGS. 5F and 5I, in some embodiments determining at least one determined reactivity parameter at the block 516 may include predicting at least one reactivity parameter at a block 522. Referring to FIGS. 5F and 5J, in some embodiments determining at least one determined reactivity parameter at the block 516 may include modeling at least one reactivity parameter at a block 524. Referring to FIGS. 5F and 5K, in some embodiments determining at least one determined reactivity parameter at the block 516 may include selecting at least one predetermined reactivity parameter at a block 526.

Figure 5L:
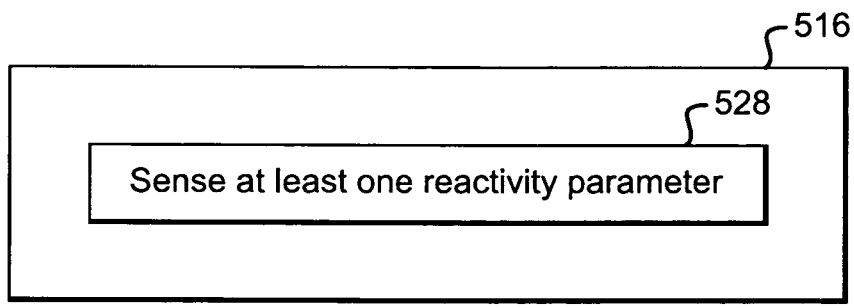

Referring to FIGS. 5F and 5L, in some other embodiments determining at least one determined reactivity parameter at the block 516 may include sensing at least one reactivity parameter at a block 528. It will be appreciated that any desired reactivity parameter may be sensed at the block 528 in any suitable manner.

Figure 5M:
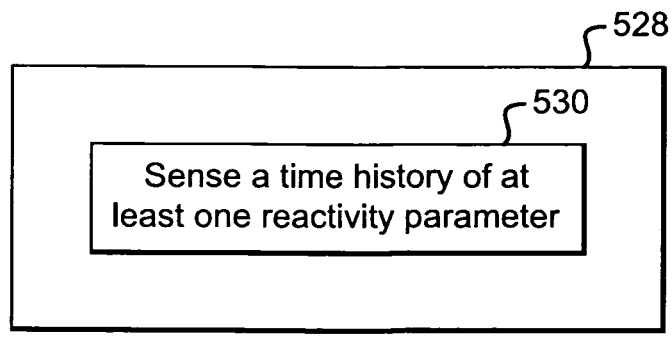
Figure 5N:
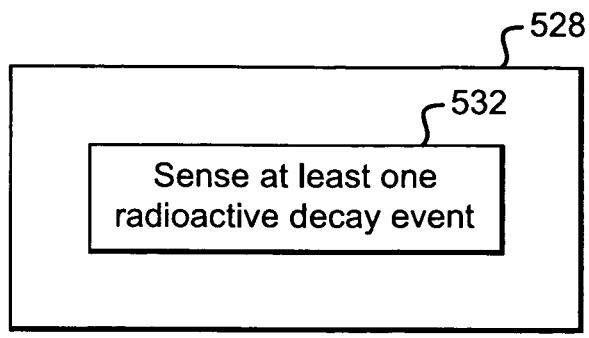
Figure 5O:
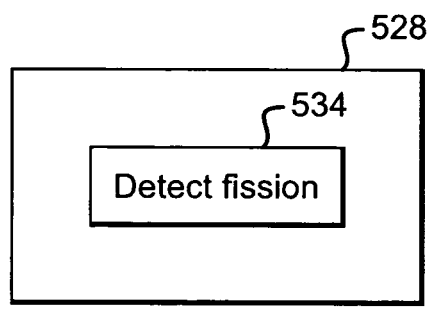
Figure 5P:
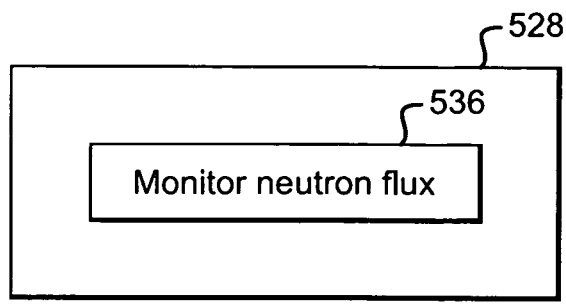
Figure 5Q:
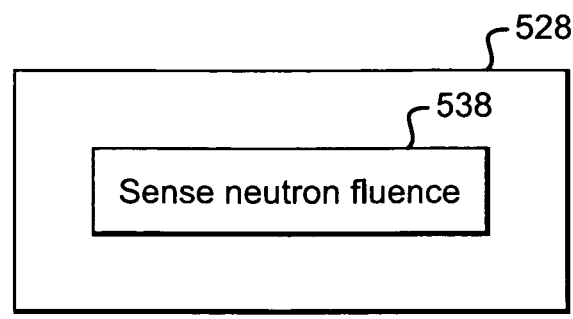
Figure 5R:
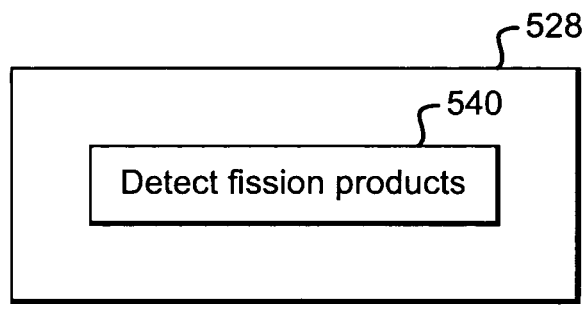

For example and referring to FIGS. 5L and 5M, in some embodiments sensing at least one reactivity parameter at the block 528 may include sensing a time history of at least one reactivity parameter at a block 530. Sensing a time history may be performed as desired, such as by sensing and recording or storing the sensed reactivity parameter more than one time. Given by way of non-limiting examples, a time history of at least one reactivity parameter may include, without limitation, a rate of the reactivity parameter, accumulation of the reactivity parameter, total fissions, or the like. Referring to FIGS. 5L and 5N, in some embodiments sensing at least one reactivity parameter at the block 528 may include sensing at least one radioactive decay event at a block 532. Referring to FIGS. 5L and 5O, in some embodiments sensing at least one reactivity parameter at the block 528 may include detecting fission at a block 534. Referring to FIGS. 5L and 5P, in some embodiments sensing at least one reactivity parameter at the block 528 may include monitoring neutron flux at a block 536. Referring to FIGS. 5L and 5Q, in some embodiments sensing at least one reactivity parameter at the block 528 may include sensing neutron fluence at a block 538. Referring to FIGS. 5L and 5R, in some embodiments sensing at least one reactivity parameter at the block 528 may include detecting fission products at a block 540.

Figure 5S:
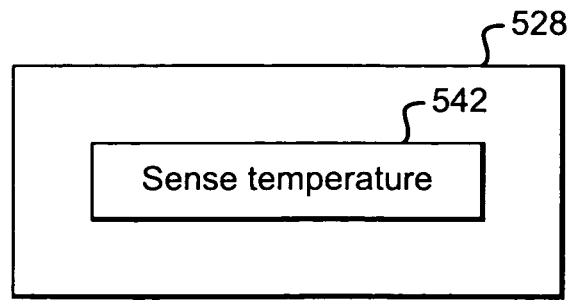
Figure 5T:
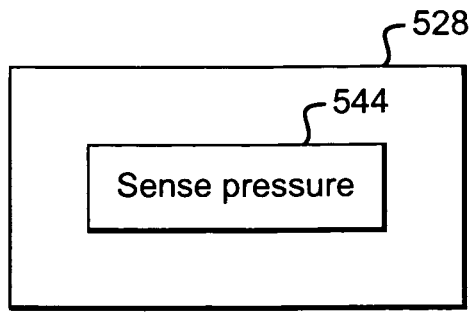
Figure 5U:
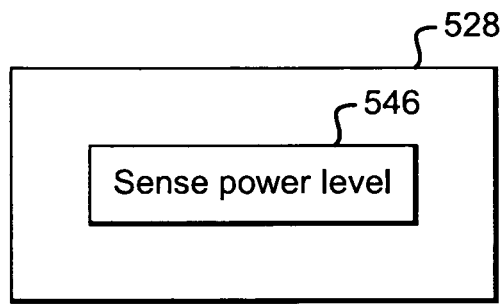

Referring to FIGS. 5L and 5S, in some embodiments sensing at least one reactivity parameter at the block 528 may include sensing temperature at a block 542. Referring to FIGS. 5L and 5T, in some embodiments sensing at least one reactivity parameter at the block 528 may include sensing pressure at a block 544. Referring to FIGS. 5L and 5U, in some embodiments sensing at least one reactivity parameter at the block 528 may include sensing power level at a block 546.

Figure 5V:
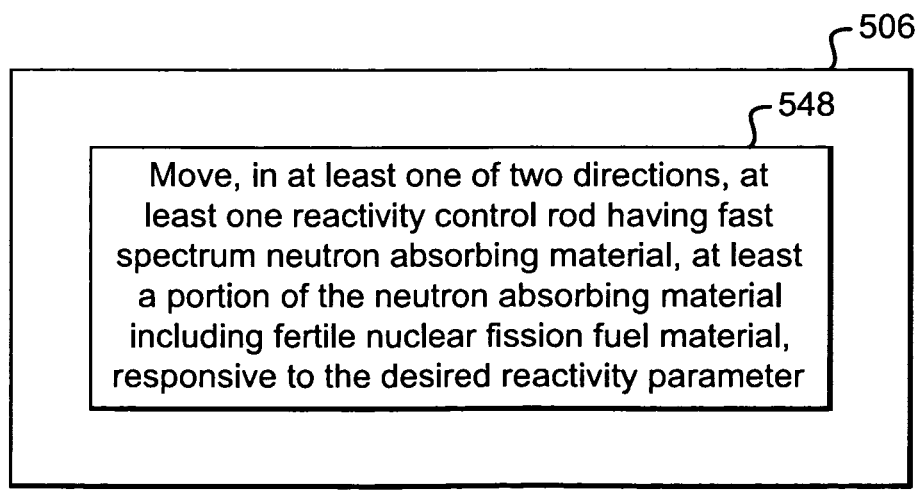

Referring now to FIGS. 5A and 5V, in some embodiments adjusting at least one reactivity control rod having fast spectrum neutron absorbing material, at least a portion of the neutron absorbing material including fertile nuclear fission fuel material, responsive to the desired reactivity parameter at the block 506 may include moving, in at least one of two directions, at least one reactivity control rod having fast spectrum neutron absorbing material, at least a portion of the neutron absorbing material including fertile nuclear fission fuel material, responsive to the desired reactivity parameter at a block 548. In various embodiments the directions may include axial directions in the nuclear fission traveling wave reactor, radial directions in the nuclear fission traveling wave reactor, and/or lateral directions in the nuclear fission traveling wave reactor.

Figure 5W:
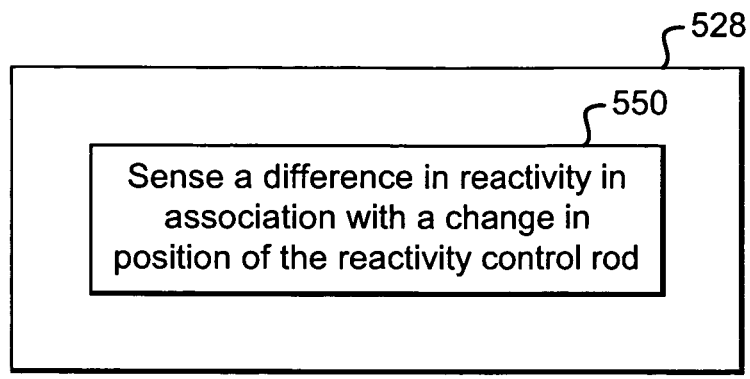

Referring now to FIGS. 5A and 5W, in some embodiments sensing at least one reactivity parameter at the block 528 may include sensing a difference in reactivity in association with a change in position of the reactivity control rod at a block 550.

Figure 5X:
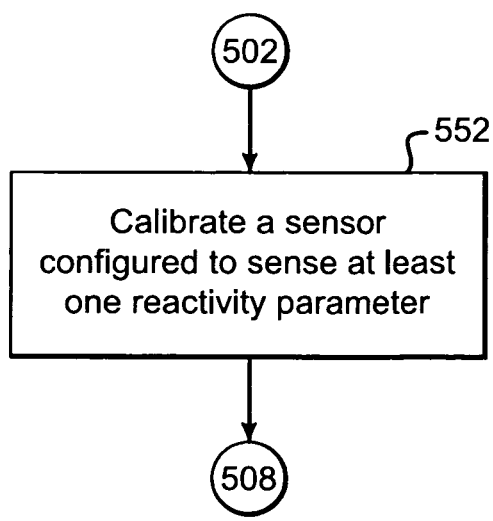

Referring to FIGS. 5A and 5X, in some embodiments a sensor that is configured to sense at least one reactivity parameter may be calibrated at a block 552.

Figure 6A:
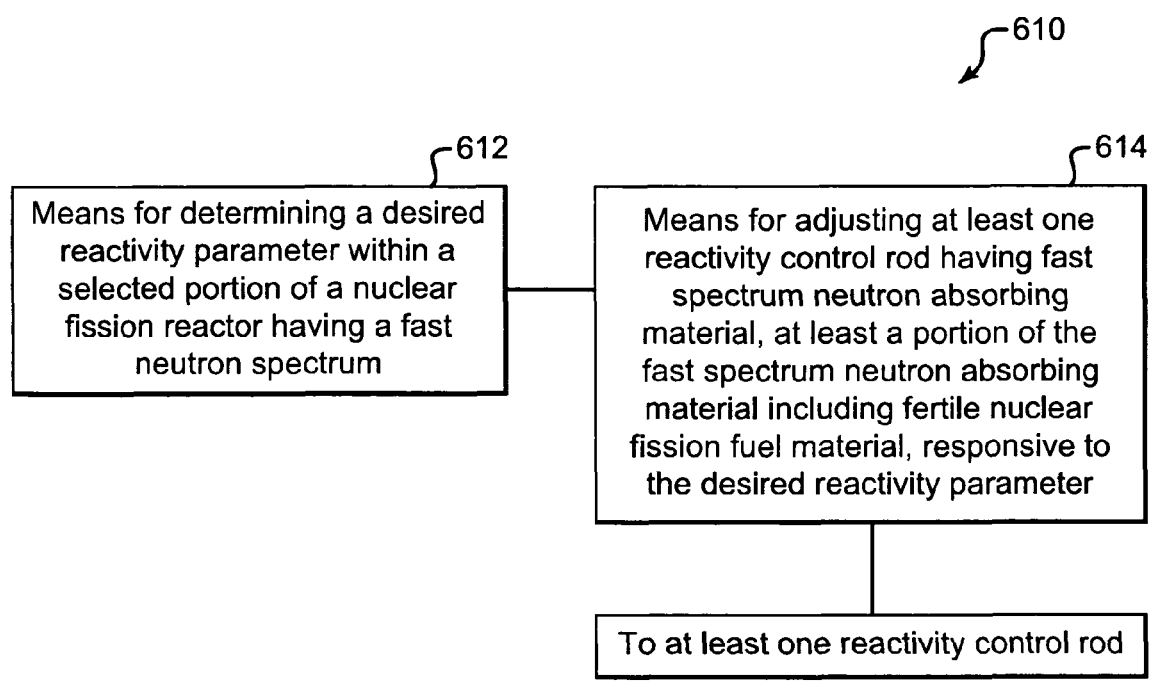
FIG. 6A is a block diagram of an illustrative system for controlling reactivity in a nuclear fission reactor having a fast neutron spectrum.

Referring now to FIG. 6A, an illustrative system 610 is provided for controlling reactivity in a nuclear fission reactor (not shown) having a fast neutron spectrum. The system 610 includes means 612 for determining a desired reactivity parameter within a selected portion of a nuclear fission reactor having a fast neutron spectrum. The system 610 also includes means 614 for adjusting at least one reactivity control rod (not shown) having fast spectrum neutron absorbing material, at least a portion of the fast spectrum neutron absorbing material including fertile nuclear fission fuel material, responsive to the desired reactivity parameter.

In various embodiments the determining means 612 may include suitable electrical circuitry. As discussed above, various aspects described herein (including the means 612 for determining a desired reactivity parameter within a selected portion of a nuclear fission reactor having a fast neutron spectrum) can be implemented, individually and/or collectively, by a wide range of hardware, software, firmware, or any combination thereof that can be viewed as being composed of various types of "electrical circuitry." Consequently, it is emphasized that, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/ or electrical circuitry forming a communications device (e.g., a modem, communications switch, or optical-electrical equipment). Those having skill in the art will recognize that the subject matter described herein may be implemented in an analog or digital fashion or some combination thereof.

In various embodiments the adjusting means 614 may include any suitable electro-mechanical system, such as without limitation an actuator. Given by way of illustration and not limitation, a non-limiting example of an actuator includes a control rod drive mechanism. However, it will be appreciated that, in a general sense, the various embodiments described herein can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In some embodiments the fast spectrum neutrons may be part of a nuclear fission traveling wave. In such cases, the nuclear fission reactor may include a nuclear fission traveling wave reactor. However, it will be appreciated that in other embodiments the fast spectrum neutrons need not be part of a nuclear fission traveling wave. Thus, in some embodiments, the nuclear fission reactor may include any suitable nuclear fission reactor having a fast neutron spectrum.

Figure 6B:
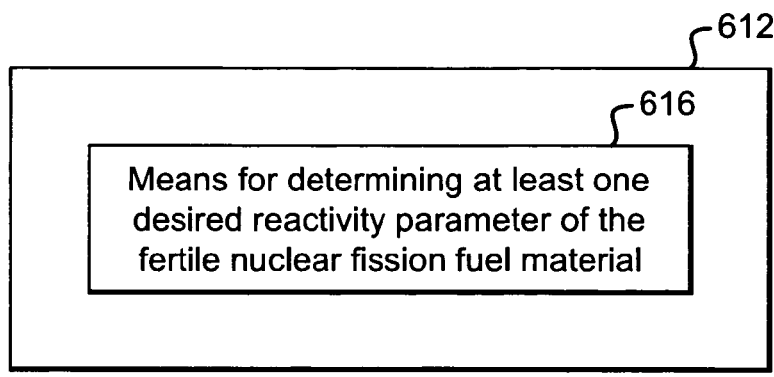
FIGS. 6B-6P are block diagrams of illustrative details of the system of FIG. 6A.
Figure 6C:
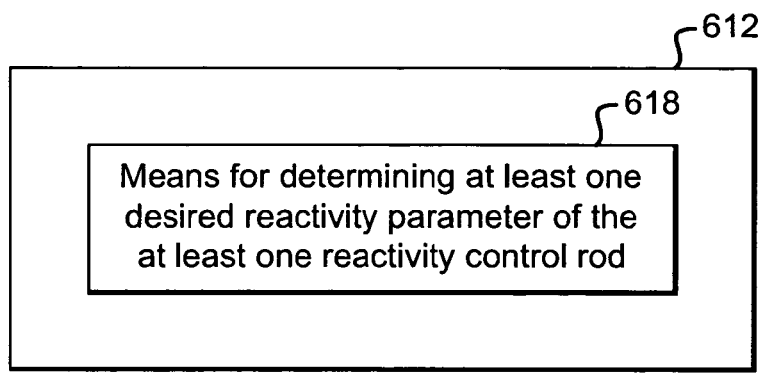
Figure 6D:
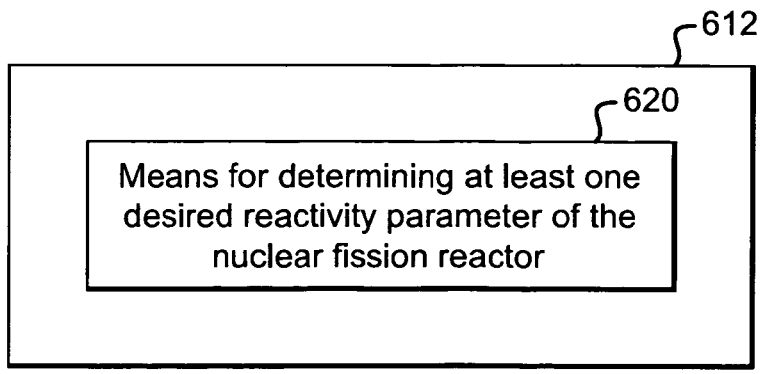

Referring to FIG. 6B, in some embodiments the means 612 for determining a desired reactivity parameter may include means 616 for determining at least one desired reactivity parameter of the fertile nuclear fission fuel material. In some other embodiments and referring to FIG. 6C, the means 612 for determining a desired reactivity parameter may include means 618 for determining at least one desired reactivity parameter of the at least one reactivity control rod. In some other embodiments and referring to FIG. 6D, the means 612 for determining a desired reactivity parameter may include means 620 for determining at least one desired reactivity parameter of the nuclear fission reactor. The means 616, 618, and 620 may include suitable electrical circuitry, as described above.

Figure 6E:
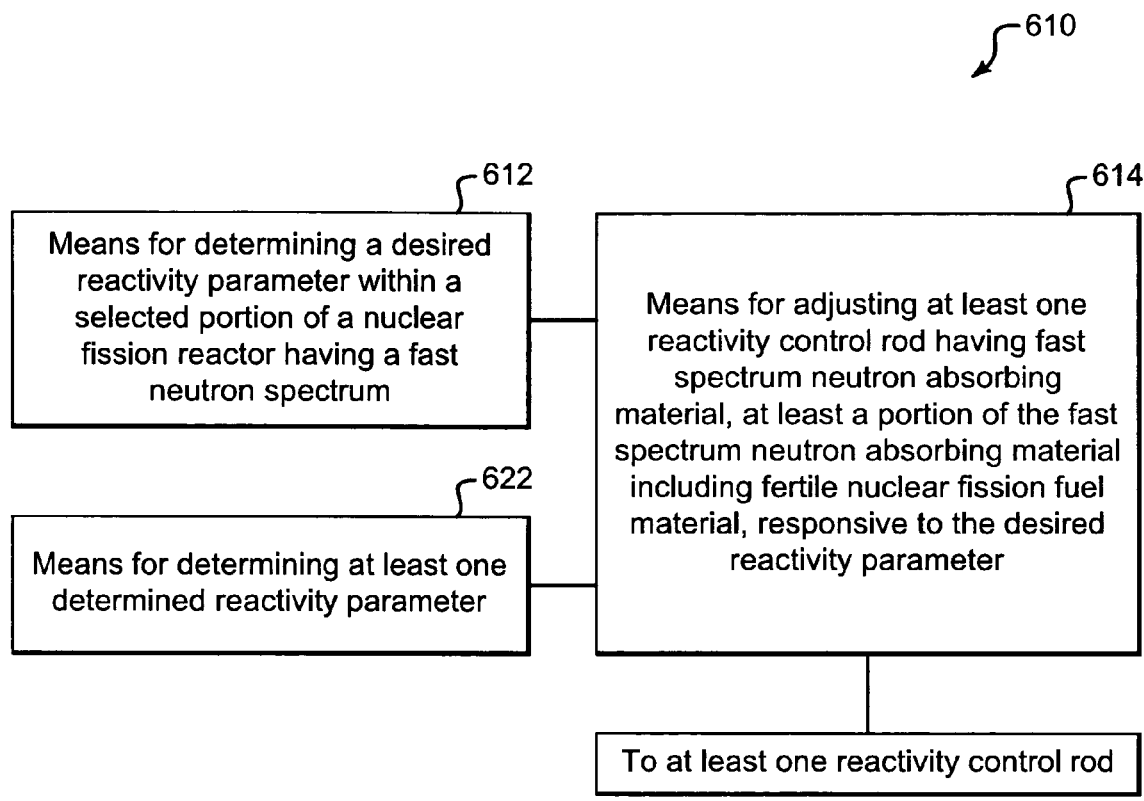

Referring now to FIG. 6E, in some embodiments the system 610 may also include means 622 for determining at least one determined reactivity parameter. In some embodiments the means 622 may include suitable electrical circuitry, as described above. Some other embodiments of the means 622 will be discussed below.

Figure 6F:
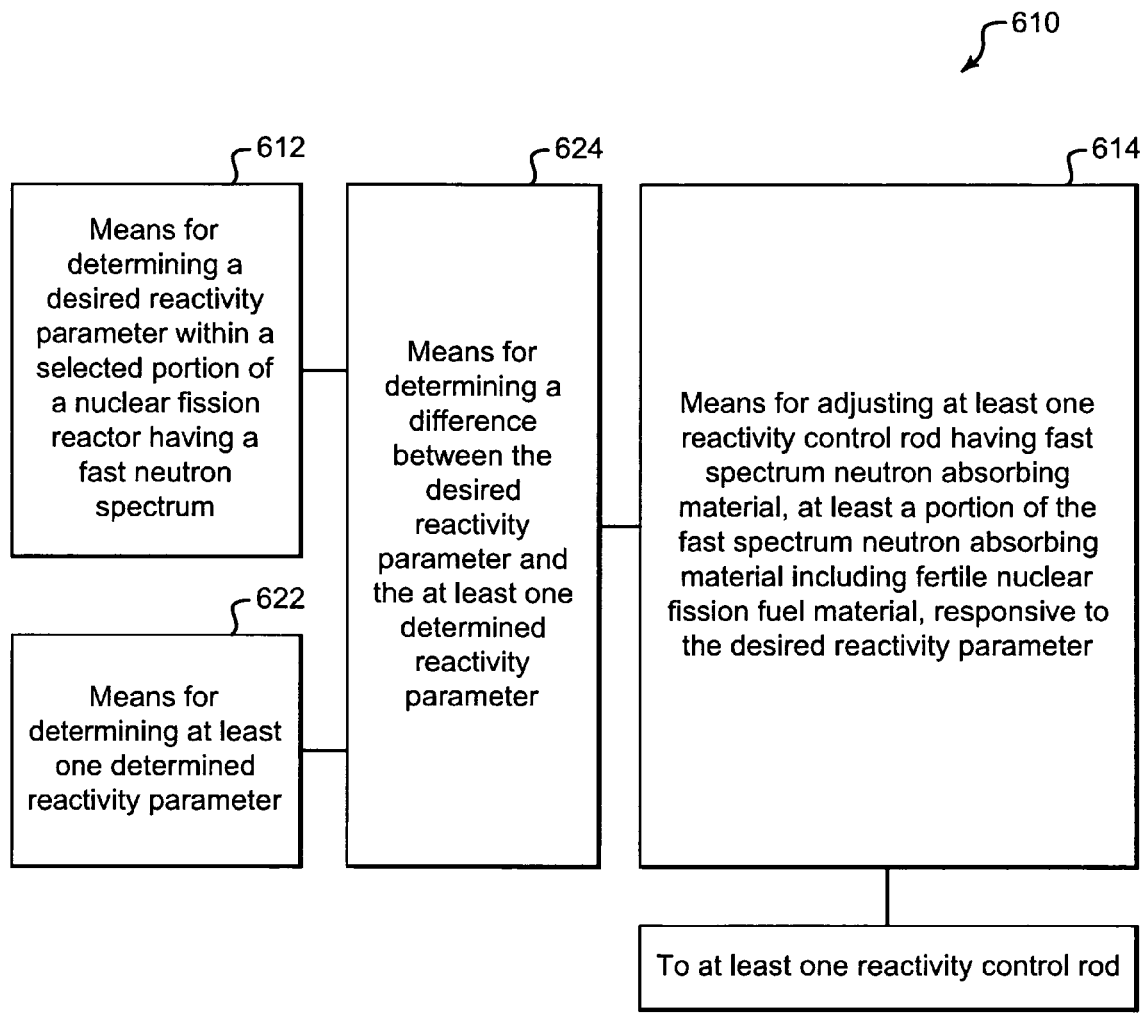

Referring now to FIG. 6F, in some embodiments the system 610 may also include means 624 for determining a difference between the desired reactivity parameter and the at least one determined reactivity parameter. The means 624 may include suitable electrical circuitry, as described above, such as without limitation a comparator.

Figure 6G:
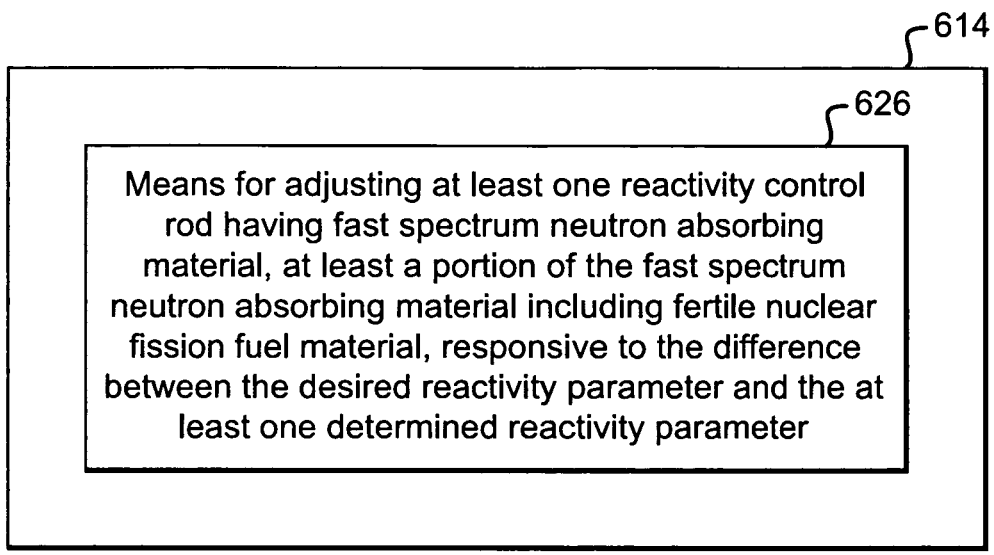

Referring additionally to FIG. 6G, in some embodiments the adjusting means 614 may include means 626 for adjusting at least one reactivity control rod having fast spectrum neutron absorbing material, at least a portion of the fast spectrum neutron absorbing material including fertile nuclear fission fuel material, responsive to the difference between the desired reactivity parameter and the at least one determined reactivity parameter. The means 626 may include any suitable electro-mechanical system as described above, such as without limitation a control rod drive mechanism.

Figure 6H:
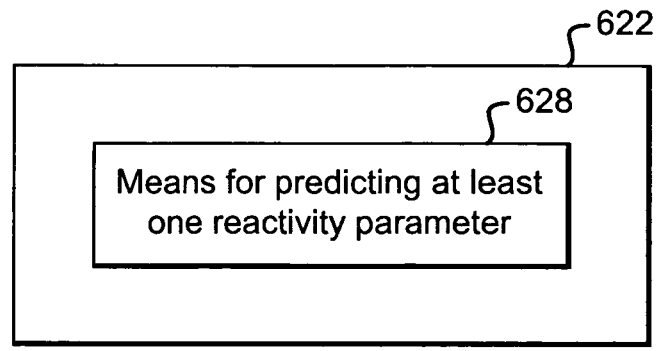

In various embodiments the determining means 622 may determine a determined reactivity parameter in any manner as desired for a particular application. For example and referring to FIG. 6H, in some embodiments the means 622 for determining at least one determined reactivity parameter may include means 628 for predicting at least one reactivity parameter. The means 628 may include suitable electrical circuitry, as described above. Given by way of non-limiting example, the predetermined reactivity parameter may be retrieved from a look-up table using operating parameters, such as temperature, pressure, power level, time in core life (as measured in effective full power hours), and the like, as entering arguments.

Figure 6I:
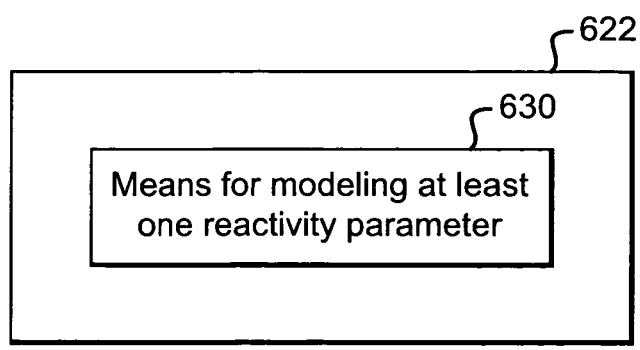

Referring to FIG. 6I, in some other embodiments the means 622 for determining at least one determined reactivity parameter may include means 630 for modeling at least one reactivity parameter. The means 630 may include suitable electrical circuitry, as described above, such as without limitation a suitable computer. The means 630 may also include suitable neutronics modeling software that runs on the electrical circuitry. Given by way of illustration, suitable neutronics modeling software includes MCNP, CINDER, REBUS, and the like.

Figure 6J:
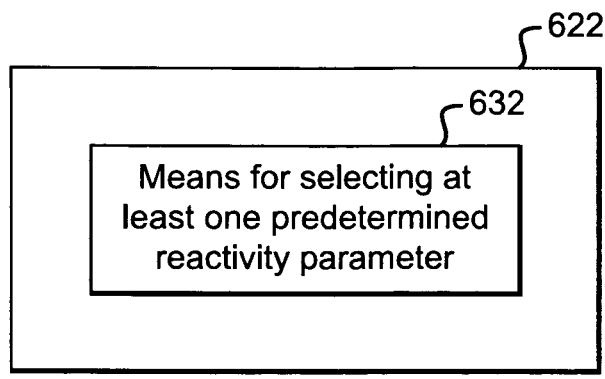

Referring to FIG. 6J, in some embodiments the means 622 for determining at least one determined reactivity parameter may include means 632 for selecting at least one predetermined reactivity parameter. The means 632 may include suitable electrical circuitry, as described above.

Figure 6K:
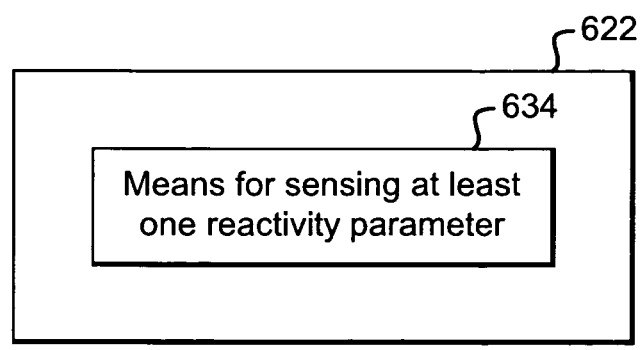

Referring to FIG. 6K, in some embodiments the means 622 for determining at least one determined reactivity parameter may include means 634 for sensing at least one reactivity parameter. In various embodiments, the sensing means 634 may include any one or more of various sensors and detectors as desired for a particular purpose, as will be discussed below.

Figure 6L:
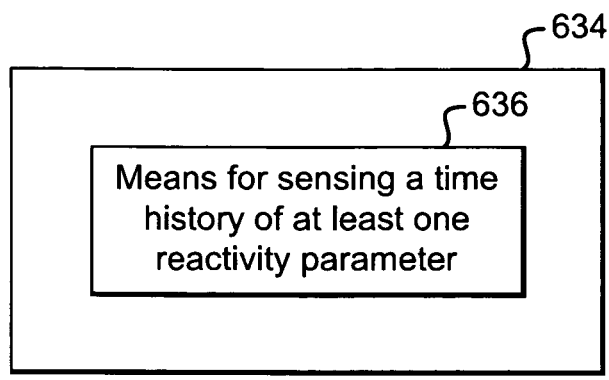

Referring to FIG. 6L, in some embodiments the sensing means 634 may include means 636 for sensing a time history of at least one reactivity parameter. Sensing a time history may be performed as desired, such as by sensing and recording or storing the sensed reactivity parameter more than one time. Given by way of non-limiting examples, a time history of at least one reactivity parameter may include, without limitation, a rate of the reactivity parameter, accumulation of the reactivity parameter, total fissions, or the like. In various embodiments the means 636 may include suitable storage, such as computer memory media or computer memory storage or the like, configured to store values of the reactivity parameter over time.

Figure 6M:
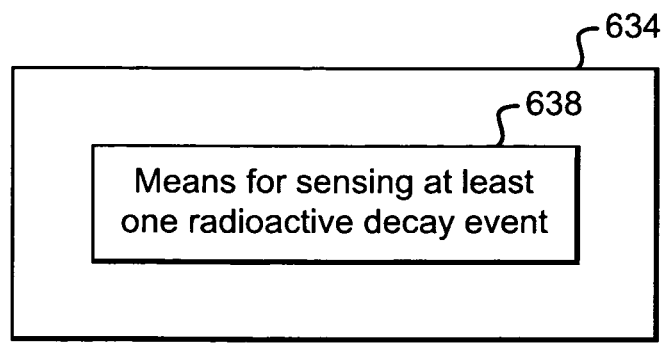

Referring to FIG. 6M, in some other embodiments the sensing means 634 may include 638 means for sensing at least one radioactive decay event. Given by way of non-limiting examples, the means 638 may include any one or more of suitable sensors or detectors for sensing $\alpha$, $\beta$, and/or $\gamma$ radiation as desired.

Referring back to FIG. 6K, in various embodiments the sensing means 634 may include any suitable sensor as desired for a particular application. Given by way of illustrative examples and without limitation, in various embodiments the sensing means 634 may include any one or more sensor, such as at least one fission detector, a neutron flux monitor, a neutron fluence sensor, a fission product detector, a temperature sensor, a pressure sensor, and/or a power level sensor.

Figure 6N:
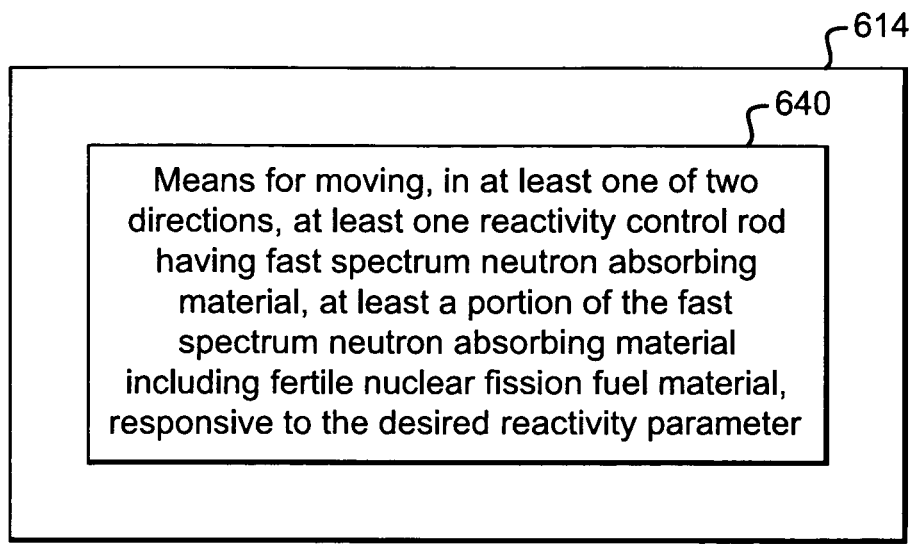

Referring to FIG. 6N, in some embodiments the adjusting means 614 may include means 640 for moving, in at least one of two directions, at least one reactivity control rod having fast spectrum neutron absorbing material, at least a portion of the fast spectrum neutron absorbing material including fertile nuclear fission fuel material, responsive to the desired reactivity parameter. In some embodiments, the means 640 may include an actuator such as a control rod drive mechanism and/or a rod handling system. In various embodiments, the directions may include any one or more of axial directions in the nuclear fission reactor, radial directions in the nuclear fission reactor, and/or lateral directions in the nuclear fission reactor.

Figure 6O:
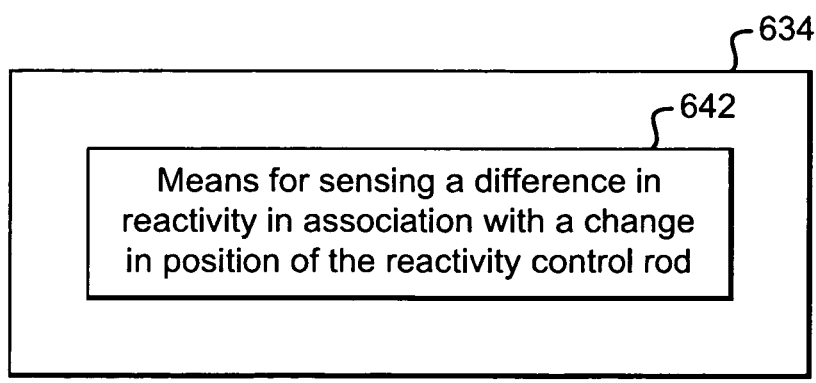

Referring to FIG. 6O, in some embodiments the sensing means 634 may include means 642 for sensing a difference in reactivity in association with a change in position of the reactivity control rod. In various embodiments, the means 642 may include electrical circuitry, as described above. In some embodiments the electrical circuitry may implement a suitable comparator.

Figure 6P:
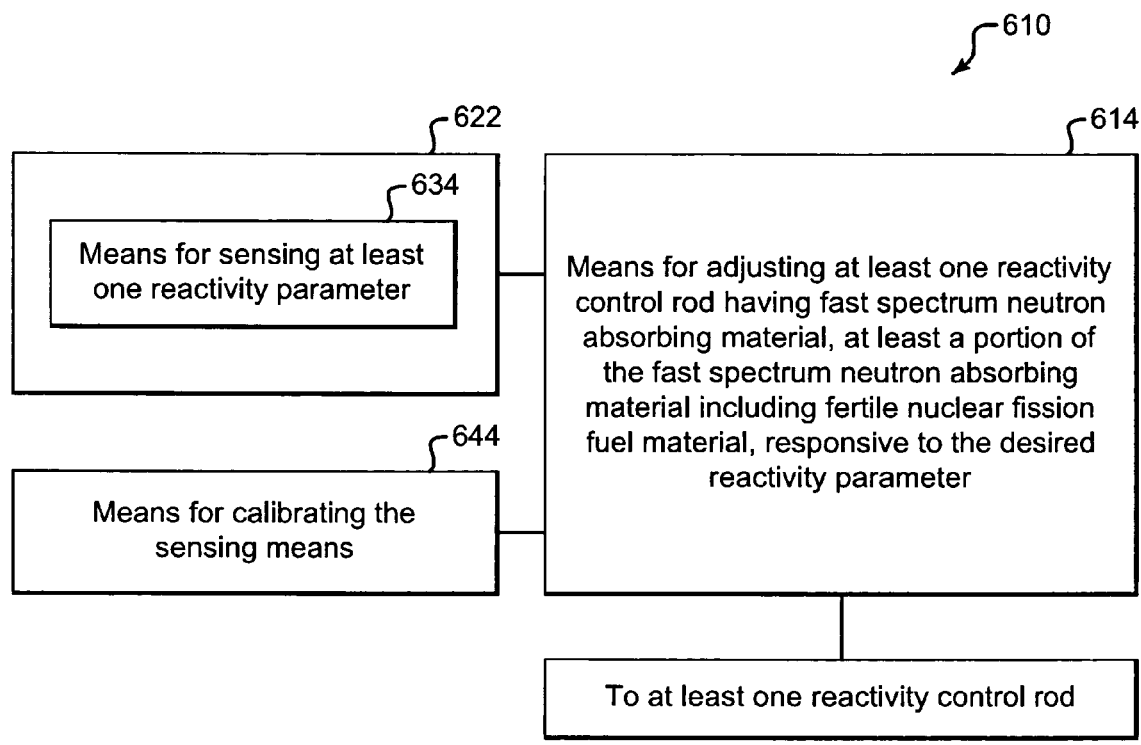

Referring to FIG. 6P, in some embodiments the system 610 may also include means 644 for calibrating the sensing means 634. In various embodiments the calibration means 644 suitably includes a source having known characteristics or attributes of the reactivity parameter, discussed above, that is sensed by the sensing means 634.

Figure 7A:
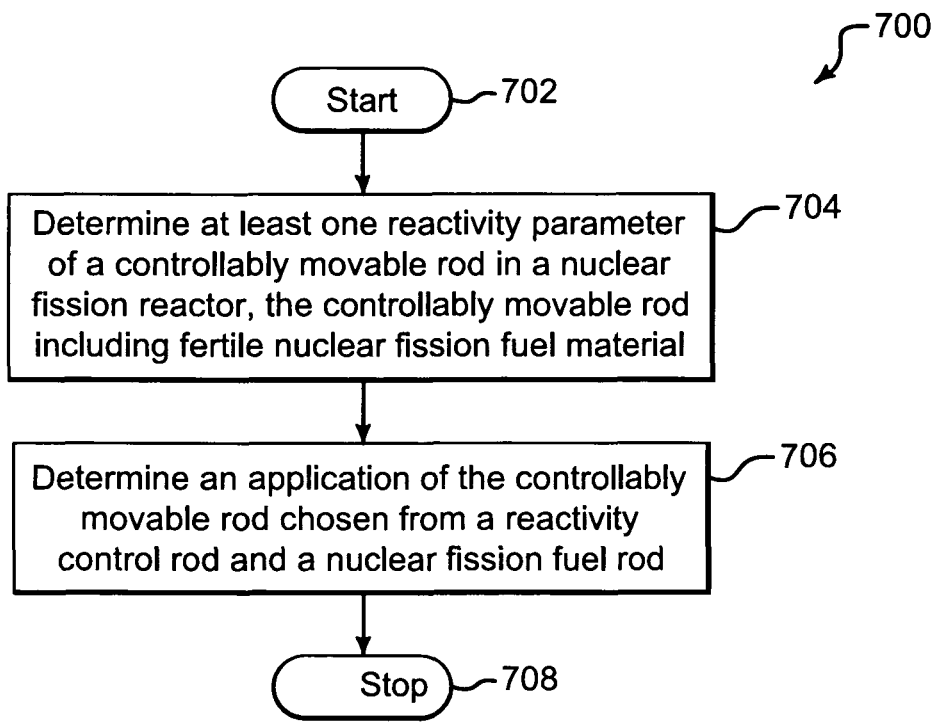
FIG. 7A is a flowchart of an illustrative method of determining an application of a controllably movable rod.

Referring now to FIG. 7A, a method 700 is provided for determining an application of a controllably movable rod. The method 700 starts at a block 702. At a block 704 at least one reactivity parameter of a controllably movable rod in a nuclear fission reactor is determined, the controllably movable rod including fertile nuclear fission fuel material. At a block 706 an application of the controllably movable rod, chosen from a reactivity control rod and a nuclear fission fuel rod, is determined. The method 700 stops at a block 708.

In various embodiments, the application of the controllably movable rod (chosen from a reactivity control rod and a nuclear fission fuel rod) may be determined responsive to the at least one determined reactivity parameter in the controllably movable rod. Non limiting examples given by way of illustration and not of limitation will be described below.

Figure 7B:
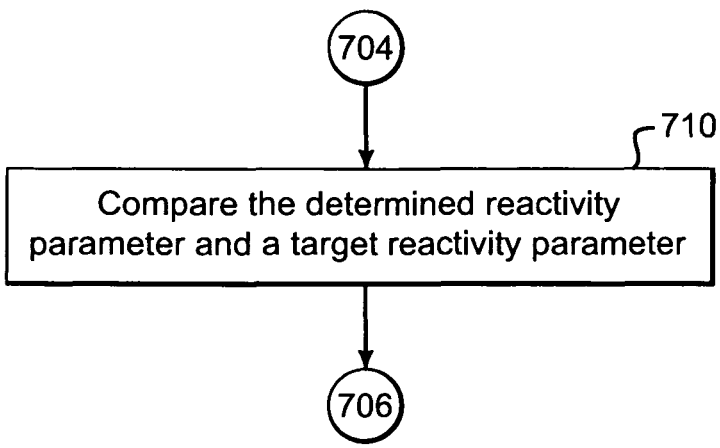
FIGS. 7B-7G are flowcharts of illustrative details of the method of FIG. 7A.

Referring to FIG. 7B, in some embodiments at a block 710 the determined reactivity parameter and a target reactivity parameter may be compared. In some embodiments, an application of the controllably movable rod (chosen from a reactivity control rod and a nuclear fission fuel rod) may be determined responsive to comparison of the determined reactivity parameter and the target reactivity parameter.

Figure 7C:
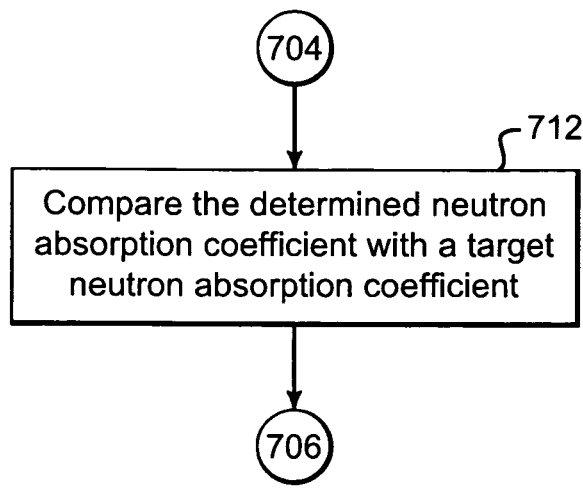

Referring back to FIG. 7A, in some embodiments the at least one reactivity parameter may include a neutron absorption coefficient. Referring to FIG. 7C, in some embodiments at a block 712 the determined neutron absorption coefficient a target neutron absorption coefficient may be compared. In some embodiments, an application of the controllably movable rod (chosen from a reactivity control rod and a nuclear fission fuel rod) may be determined responsive to comparison of the determined neutron absorption coefficient and the target neutron absorption coefficient. For example, a chosen application of the controllably movable rod may include a reactivity control rod when the determined neutron absorption coefficient is at least the target neutron absorption coefficient. As another example, a chosen application of the controllably movable rod may include a nuclear fission fuel rod when the determined neutron absorption coefficient is less than the target neutron absorption coefficient.

Figure 7D:
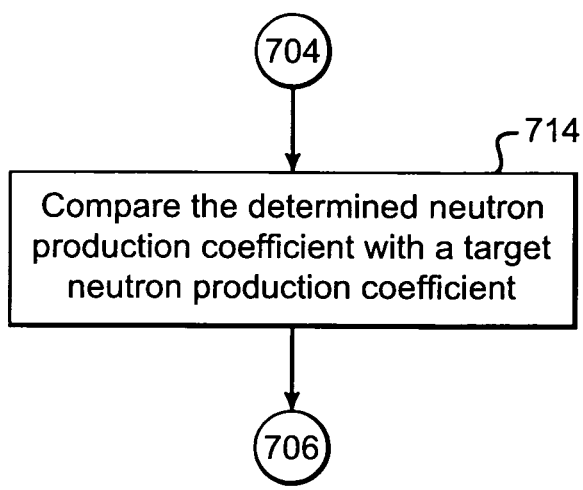

Referring back to FIG. 7A, in some other embodiments the at least one reactivity parameter may include a neutron production coefficient. Referring to FIG. 7D, in some embodiments at a block 714 the determined neutron production coefficient and a target neutron production coefficient may be compared. In some embodiments, an application of the controllably movable rod (chosen from a reactivity control rod and a nuclear fission fuel rod) may be determined responsive to comparison of the determined neutron production coefficient and the target neutron production coefficient. For example, a chosen application of the controllably movable rod may include a nuclear fission fuel rod when the determined neutron production coefficient is at least the target neutron production coefficient. As another example, a chosen application of the controllably movable rod may include a reactivity control rod when the determined neutron production coefficient is less than the target neutron production coefficient.

Referring back to FIG. 7A, the at least one reactivity parameter may be determined in any manner as desired for a particular application. Given by way of non-limiting examples, determining at least one reactivity parameter of a controllably movable rod in a nuclear fission reactor may be based on neutron exposure history of the controllably movable rod, a property of fertile nuclear fission fuel material of the controllably movable rod, a property of fissile nuclear fission fuel material of the controllably movable rod, a property of neutron absorbing poison of the controllably movable rod, and/or a property of fission products of the controllably movable rod.

Figure 7E:
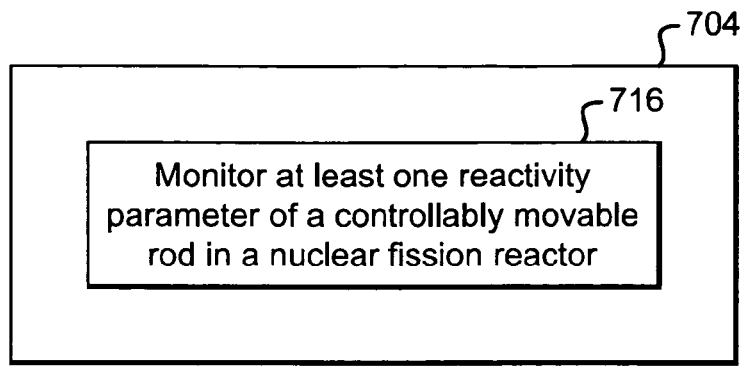

Referring to FIG. 7E, in some embodiments determining at least one reactivity parameter of a controllably movable rod in a nuclear fission reactor at the block 704 may include monitoring at least one reactivity parameter of a controllably movable rod in a nuclear fission reactor at a block 716.

Figure 7F:
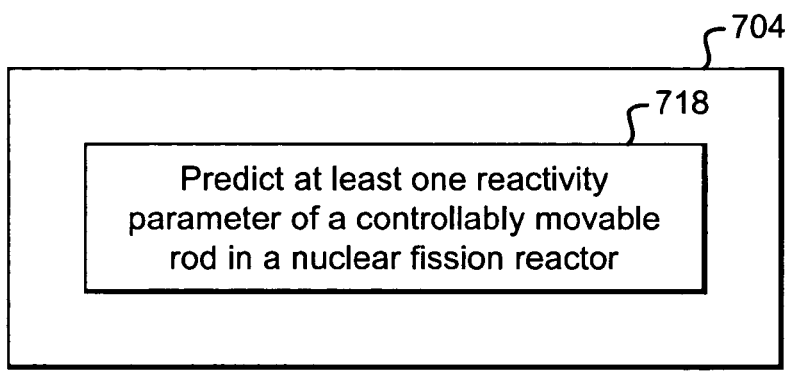
Figure 7G:
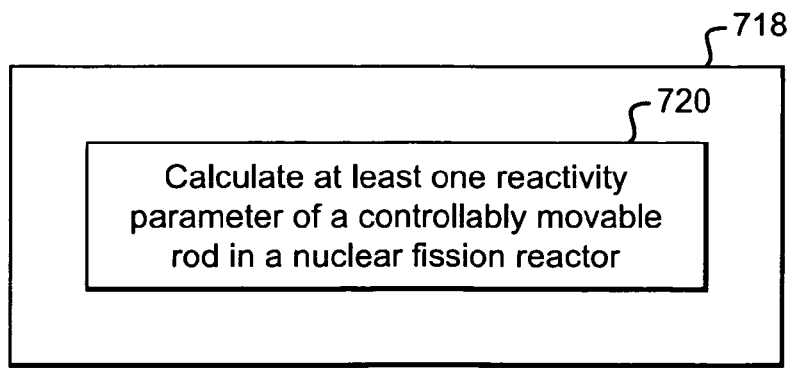

Referring to FIG. 7F, in some other embodiments determining at least one reactivity parameter of a controllably movable rod in a nuclear fission reactor at the block 704 may include predicting at least one reactivity parameter of a controllably movable rod in a nuclear fission reactor at a block 718. Referring to FIG. 7G, in some embodiments predicting at least one reactivity parameter of a controllably movable rod in a nuclear fission reactor at the block 718 may include calculating at least one reactivity parameter of a controllably movable rod in a nuclear fission reactor at a block 720.

Figure 8A:
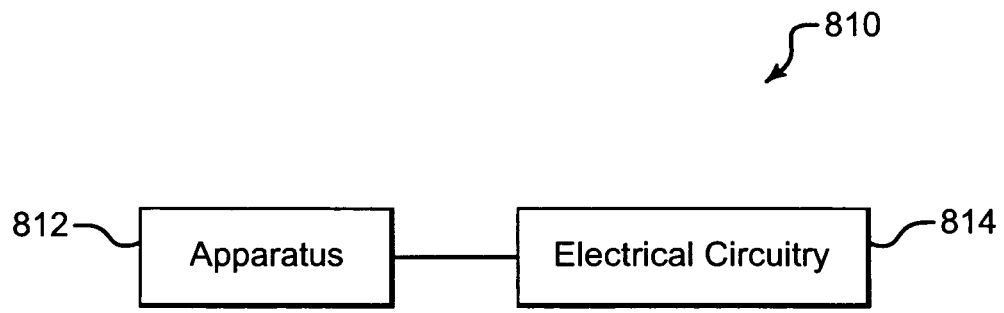
FIG. 8A is a block diagram of an illustrative system for determining an application of a controllably movable rod.

Referring now to FIG. 8A, a system 810 is provided for determining an application of a controllably movable rod. An apparatus 812 is configured to determine at least one reactivity parameter of a controllably movable rod in a nuclear fission reactor, the controllably movable rod including fertile nuclear fission fuel material. Electrical circuitry 814 is configured to determine an application of the controllably movable rod chosen from a reactivity control rod and a nuclear fission fuel rod.

In various embodiments, the application of the controllably movable rod (chosen from a reactivity control rod and a nuclear fission fuel rod) may be determined responsive to the at least one determined reactivity parameter in the controllably movable rod. Non limiting examples given by way of illustration and not of limitation will be described below.

Figure 8B:
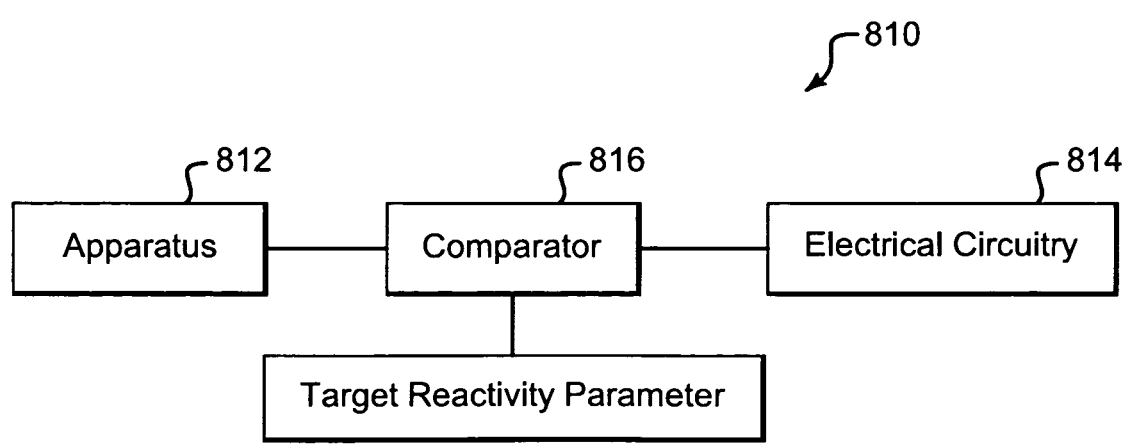
FIGS. 8B-8I are block diagrams of illustrative details of the system of FIG. 8A.

Referring to FIG. 8B, a comparator 816 may be configured to compare the determined reactivity parameter and a target reactivity parameter. In such a case, the electrical circuitry 814 may be responsive to the comparator 816.

Still referring to FIG. 8B, in some embodiments the at least one reactivity parameter may include a neutron absorption coefficient. In such cases, the comparator 816 may be further configured to compare the determined neutron absorption coefficient with a target neutron absorption coefficient. The electrical circuitry 814 may be responsive to comparison of the determined neutron absorption coefficient and the target neutron absorption coefficient by the comparator 816. In some embodiments a chosen application of the controllably movable rod may include a reactivity control rod when the determined neutron absorption coefficient is at least the target neutron absorption coefficient. In some other embodiments a chosen application of the controllably movable rod may include a nuclear fission fuel rod when the determined neutron absorption coefficient is less than the target neutron absorption coefficient.

Still referring to FIG. 8B, in some other embodiments the at least one reactivity parameter may include a neutron production coefficient. In such cases, the comparator 816 may be further configured to compare the determined neutron production coefficient with a target neutron production coefficient. The electrical circuitry 814 may be responsive to comparison of the determined neutron production coefficient and the target neutron production coefficient by the comparator 816. In some embodiments a chosen application of the controllably movable rod may include a nuclear fission fuel rod when the determined neutron production coefficient is at least the target neutron production coefficient. In some other embodiments a chosen application of the controllably movable rod may include a reactivity control rod when the determined neutron production coefficient is less than the target neutron production coefficient.

Figure 8C:
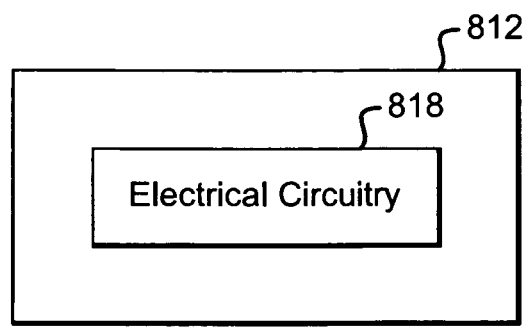

Referring back to FIG. 8A, in various embodiments the apparatus 812 may be configured as desired to determine the reactivity parameter. For example and referring to FIG. 8C, in some embodiments the apparatus 812 may include electrical circuitry 818 that is configured to determine at least one reactivity parameter of a controllably movable rod in a nuclear fission reactor based on neutron exposure history of the controllably movable rod.

Figure 8D:
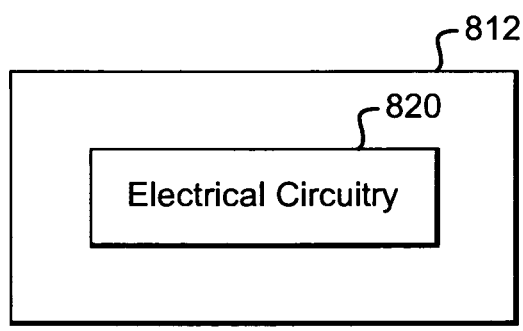
Figure 8E:
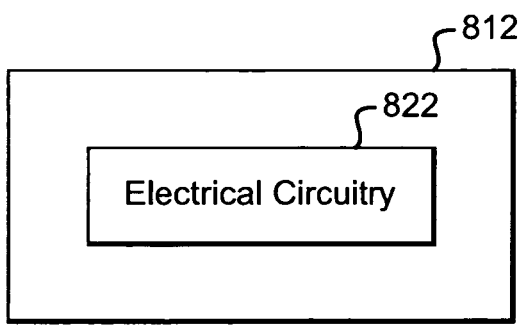

Referring to FIG. 8D, in some other embodiments the apparatus 812 may include electrical circuitry 820 that is configured to determine at least one reactivity parameter of a controllably movable rod in a nuclear fission reactor based on a property of fertile nuclear fission fuel material of the controllably movable rod. Referring to FIG. 8E, in some embodiments the apparatus 812 may include electrical circuitry 822 that is configured to determine at least one reactivity parameter of a controllably movable rod in a nuclear fission reactor based on a property of fissile nuclear fission fuel material of the controllably movable rod.

Figure 8F:
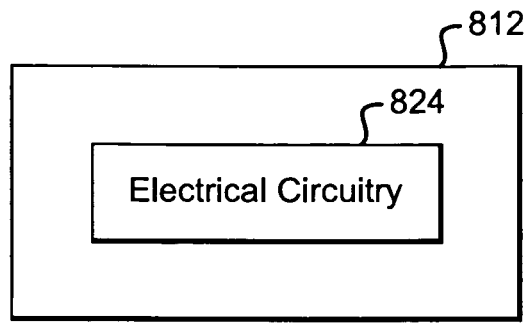
Figure 8G:
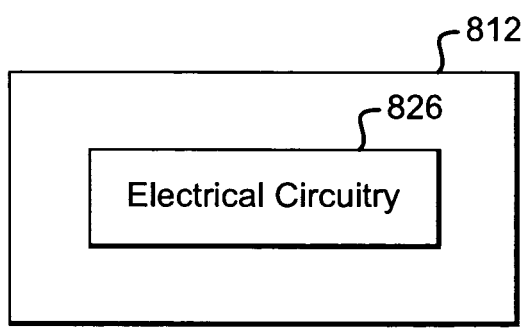

Referring to FIG. 8F, in some embodiments the apparatus 812 may include electrical circuitry 824 that is configured to determine at least one reactivity parameter of a controllably movable rod in a nuclear fission reactor based on a property of neutron absorbing poison of the controllably movable rod. Referring to FIG. 8G, in some embodiments the apparatus 812 may include electrical circuitry 826 that is configured to determine at least one reactivity parameter of a controllably movable rod in a nuclear fission reactor based on a property of fission products of the controllably movable rod.

Figure 8H:
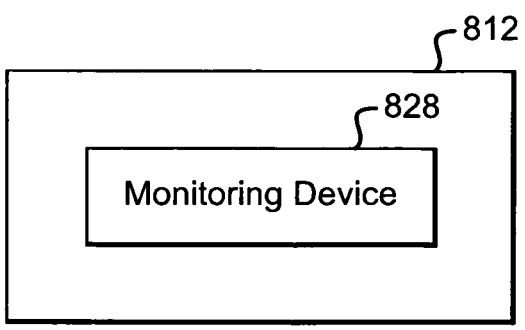

Referring to FIG. 8H, in some embodiments the apparatus 812 may include at least one monitoring device 828 that is configured to monitor at least one reactivity parameter of a controllably movable rod in a nuclear fission reactor. Given by way of non-limiting examples, the monitoring device 828 may include any one or more of the sensors and/or detectors described above.

Figure 8I:
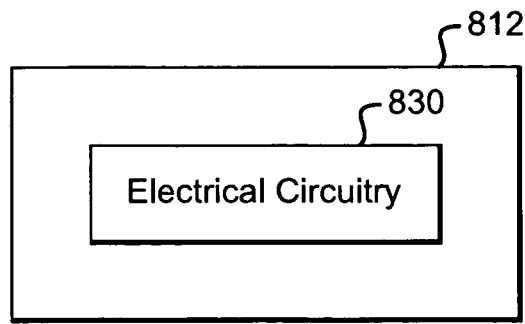

Referring to FIG. 8I, in some embodiments the apparatus 812 may include electrical circuitry 830 that is configured to predict at least one reactivity parameter of a controllably movable rod in a nuclear fission reactor. For example, in some embodiments the electrical circuitry 830 may be further configured to calculate at least one reactivity parameter of a controllably movable rod in a nuclear fission reactor.

Figure 9A:
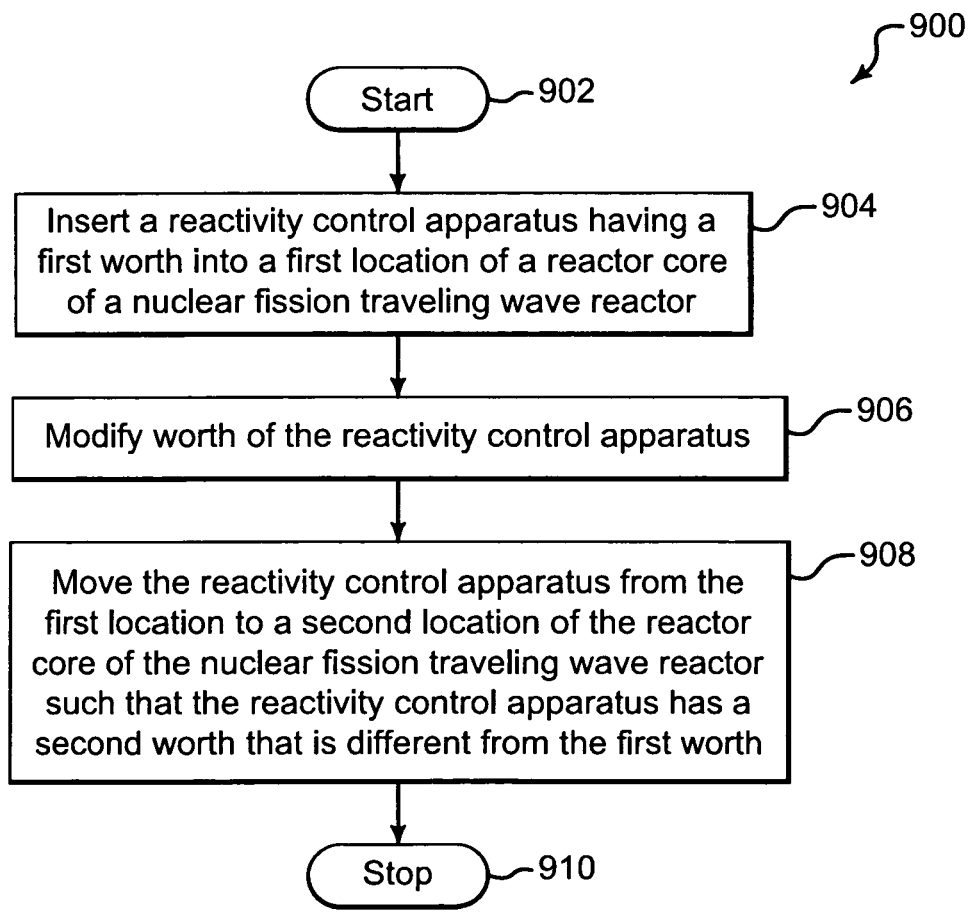
FIG. 9A is a flowchart of an illustrative method of operating a nuclear fission traveling wave reactor.

Referring to FIG. 9A, an illustrative method 900 is provided for operating a nuclear fission traveling wave reactor. The method 900 starts at a block 902. At a block 904 a reactivity control apparatus having a first worth is inserted into a first location of a reactor core of a nuclear fission traveling wave reactor. At a block 906, worth of the reactivity control apparatus is modified. At a block 908 the reactivity control apparatus is moved from the first location to a second location of the reactor core of the nuclear fission traveling wave reactor such that the reactivity control apparatus has a second worth that is different from the first worth. The method 900 stops at a block 910.

Figure 9B:
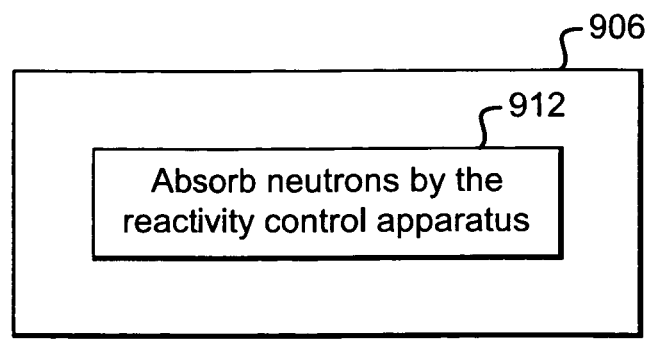
FIGS. 9B-9G are flowcharts of illustrative details of the method of FIG. 9A.
Figure 9C:
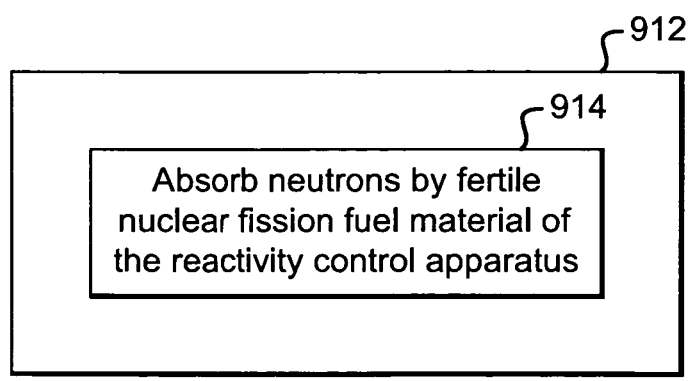

Referring to FIG. 9B, in some embodiments modifying worth of the reactivity control apparatus at the block 906 may include absorbing neutrons by the reactivity control apparatus at a block 912. Referring to FIG. 9C, in some embodiments, absorbing neutrons by the reactivity control apparatus at the block 912 may include absorbing neutrons by fertile nuclear fission fuel material of the reactivity control apparatus at a block 914. In some of the cases, the second worth may be greater than the first worth.

Figure 9D:
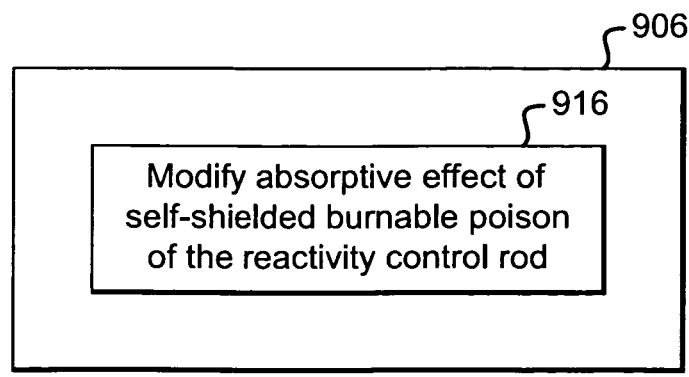
Figure 9E:
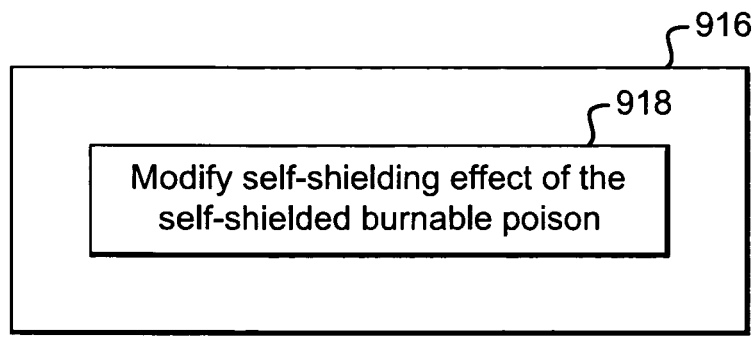
Figure 9F:
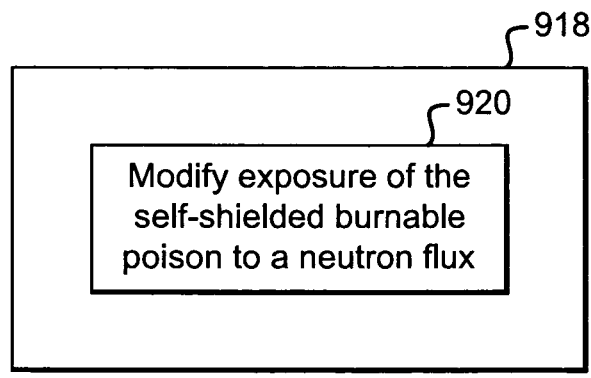
Figure 9G:
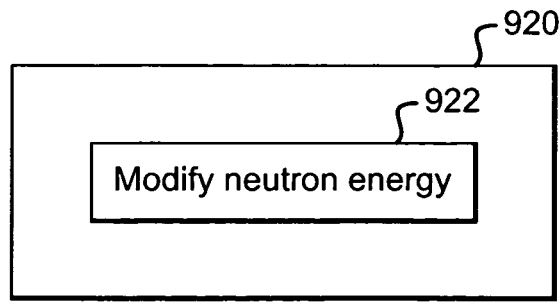

Referring to FIG. 9D, in some other embodiments modifying worth of the reactivity control apparatus at the block 906 may include modifying absorptive effect of self-shielded burnable poison of the reactivity control rod at a block 916. Referring to FIG. 9E, in some embodiments modifying absorptive effect of self-shielded burnable poison of the reactivity control rod at the block 916 may include modifying self-shielding effect of the self-shielded burnable poison at a block 918. Referring to FIG. 9F, in some embodiments modifying self-shielding effect of the self-shielded burnable poison at the block 918 may include modifying exposure of the self-shielded burnable poison to a neutron flux at a block 920. Referring to FIG. 9G, in some embodiments modifying exposure of the self-shielded burnable poison to a neutron flux at the block 920 may include modifying neutron energy at a block 922. In some embodiments the second worth may be less than the first worth. In some other embodiments the second worth may be greater than the first worth.

In a general sense, those skilled in the art will recognize that the various embodiments described herein can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

It will be appreciated that each block of block diagrams and flowcharts, and combinations of blocks in block diagrams and flowcharts, can be implemented by computer program instructions. These computer program instructions may be loaded onto a computer or other programmable apparatus to produce a machine, such that the instructions which execute on the computer or other programmable apparatus create computer-readable media software program code configured to implement the functions specified in the block diagram or flowchart block(s). These computer program instructions may also be stored in a computer-readable memory that can direct a computer or other programmable apparatus to function in a particular manner, such that the instructions stored in the computer-readable memory produce an article of manufacture including computer-readable media software program code instructions which implement the function specified in the block diagram or flowchart block(s). The computer-readable media software program code instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram or flowchart block(s).

Accordingly, blocks of the block diagrams or flowcharts support combinations of means for performing the specified functions, combinations of steps for performing the specified functions, and computer-readable media software program code for performing the specified functions. It will also be understood that each block of the block diagrams or flowcharts, and combinations of blocks in the block diagrams or flowcharts, can be implemented by special purpose hardware-based computer systems which perform the specified functions or steps, or combinations of special purpose hardware and computer instructions.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

In some instances, one or more components may be referred to herein as "configured to." Those skilled in the art will recognize that "configured to" can generally encompass active-state components and/or inactive-state components and/or standby-state components, etc. unless context requires otherwise.

In some instances, one or more components may be referred to herein as "configured to." Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

Those skilled in the art will appreciate that the foregoing specific illustrative processes and/or devices and/or technologies are representative of more general processes and/or devices and/or technologies taught elsewhere herein, such as in the claims filed herewith and/or elsewhere in the present application.

One skilled in the art will recognize that the herein described components (e.g., process blocks), devices, and objects and the discussion accompanying them are used as examples for the sake of conceptual clarity and that various configuration modifications are within the skill of those in the art. Consequently, as used herein, the specific examples set forth and the accompanying discussion are intended to be representative of their more general classes. In general, use of any specific example herein is also intended to be representative of its class, and the non-inclusion of such specific components (e.g., process blocks), devices, and objects herein should not be taken as indicating that limitation is desired.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A reactivity control assembly for a nuclear fission reactor,
   the reactivity control assembly comprising:
   a reactivity control rod including neutron absorbing material configured to absorb neutrons, at least a portion of the neutron absorbing material including fertile nuclear fission fuel material and a neutron absorbing poison, the reactivity control rod has a first region and a second region;
   a first concentration of the neutron absorbing poison and a third concentration of the fertile nuclear fission fuel material are disposed in the first region of the reactivity control rod, and
   a second concentration of the neutron absorbing poison and a fourth concentration of the fertile nuclear fission fuel material are disposed in the second region of the reactivity control rod; and
   wherein a reactivity effect of the first concentration of the neutron absorbing poison is substantially equalized with a reactivity effect of the fourth concentration of the fertile nuclear fission fuel material; and
   at least one sensor associated with the reactivity control rod, the at least one sensor being configured to sense status of at least one reactivity parameter associated with the reactivity control rod.

2. The assembly of claim 1, wherein the neutron absorbing material is configured to absorb fast spectrum neutrons.

3. The assembly of claim 2, wherein the neutron absorbing material is further configured to reduce moderation of neutrons.

4. The assembly of claim 2, wherein the fast spectrum neutrons are part of a nuclear fission traveling wave.

5. The assembly of claim 1, wherein the fertile nuclear fission fuel material includes at least one element chosen from uranium and thorium.

6. The assembly of claim 1, wherein the reactivity control rod further includes neutron moderating material.

7. The assembly of claim 6, wherein the neutron moderating material includes at least one neutron moderator chosen from hydrogen, deuterium, helium, lithium, boron, carbon, graphite, sodium, and lead.

8. The assembly of claim 6, wherein the neutron moderating material is substantially heterogeneously distributed within the reactivity control rod.

9. The assembly of claim 6, wherein the neutron moderating material is substantially homogeneously distributed within the reactivity control rod.

10. The assembly of claim 1, wherein the neutron absorbing poison includes at least one poison chosen from silver, indium, cadmium, gadolinium, hafnium, lithium, $^3$He, fission products, protactinium, neptunium, and boron.

11. The assembly of claim 1, wherein the neutron absorbing poison is substantially heterogeneously distributed within the reactivity control rod.

12. The assembly of claim 1, wherein the neutron absorbing poison is substantially homogeneously distributed within the reactivity control rod.

13. The assembly of claim 1, wherein an effect on reactivity achievable by the fertile nuclear fission fuel material is equalized toward an effect on reactivity achievable by the neutron absorbing poison.

14. The assembly of claim 1, wherein a reactivity effect of the second concentration of the neutron absorbing poison is substantially equalized with a reactivity effect of the third concentration of the fertile nuclear fission fuel material.

15. The assembly of claim 1, wherein a reactivity effect of the second concentration of the neutron absorbing poison is different from a reactivity effect of the third concentration of the fertile nuclear fission fuel material.

16. The assembly of claim 1, wherein a sum of reactivity effects of the first and third concentrations is substantially equalized toward a sum of reactivity effects of the second and fourth concentrations.

17. The assembly of claim 1, wherein reactivity effect is substantially constant between the first region and the second region.

18. The assembly of claim 1, wherein concentration of at least one of the fertile nuclear fission fuel material and the neutron absorbing poison changes along a continuous gradient.

19. The assembly of claim 1, wherein at least one of the fertile nuclear fission fuel material and the neutron absorbing poison are provided in powdered form.

20. The assembly of claim 1, wherein concentration of at least one of the fertile nuclear fission fuel material and the neutron absorbing poison changes along a non-continuous gradient.

21. The assembly of claim 1, wherein at least one of the fertile nuclear fission fuel material and the neutron absorbing poison are provided in discrete particle form.

22. The assembly of claim 1, wherein the fertile nuclear fission fuel material and the neutron absorbing poison are spatially fixed relative to each other.

23. The assembly of claim 1, wherein physical association includes at least one association chosen from being located within an interior of the reactivity control rod and being attached to an exterior of the reactivity control rod.

24. The assembly of claim 1, wherein the reactivity parameter includes at least one parameter chosen from neutron fluence, neutron flux, neutron fissions, fission products, radioactive decay events, temperature, pressure, power, isotopic concentration, burnup, and neutron spectrum.

25. The assembly of claim 1, wherein the sensor includes at least one sensor chosen from a fission detector, a neutron flux monitor, a neutron fluence sensor, a fission product detector, a temperature sensor, a pressure sensor, and a power sensor.

26. The assembly of claim 1, wherein the at least one sensor is replaceable.

27. The assembly of claim 1, wherein the reactivity control rod defines at least one chamber configured to accumulate fission products.

28. The assembly of claim 27, wherein the chamber includes a plenum.

29. The assembly of claim 28, wherein the plenum is located at least one mean free path for fission-inducing neutrons from the fertile nuclear fission fuel material.

30. The assembly of claim 1, further comprising a calibration device configured to calibrate the at least one sensor.

31. The assembly of claim 1, further comprising at least one communications device operatively coupled to the at least one sensor.

32. The reactor of claim 1, wherein the sensor is physically associated with the reactivity control rod.

33. The reactor of claim 32, wherein the sensor is physically attached to the reactivity control rod.

34. The reactor of claim 33, wherein the sensor is physically attached to an interior of the reactivity control rod.

35. The reactor of claim 33, where in the sensor is physically attached to an exterior surface of the reactivity control rod.

* * * * *